United States Patent
Brewer et al.

(10) Patent No.: US 12,016,452 B2
(45) Date of Patent: Jun. 25, 2024

(54) POWERED DENTAL CLEANING DEVICE

(71) Applicant: RYCA International, Inc., Los Angeles, CA (US)

(72) Inventors: Gerald K. Brewer, La Center, WA (US); Caleb Vainikka, Waconia, MN (US); Chris Redinger, Waconia, MN (US); Aaron Poole, Portland, OR (US); Joe Skidmore, Sedona, AZ (US)

(73) Assignee: RYCA INTERNATIONAL, INC., Los Angeles, CA (US)

( * ) Notice: Subject to any disclaimer, the term of this patent is extended or adjusted under 35 U.S.C. 154(b) by 0 days.

(21) Appl. No.: 18/037,311

(22) PCT Filed: Nov. 19, 2021

(86) PCT No.: PCT/US2021/060203
§ 371 (c)(1),
(2) Date: May 16, 2023

(87) PCT Pub. No.: WO2022/109342
PCT Pub. Date: May 27, 2022

(65) Prior Publication Data
US 2023/0413987 A1    Dec. 28, 2023

Related U.S. Application Data

(60) Provisional application No. 63/185,751, filed on May 7, 2021, provisional application No. 63/169,061, filed (Continued)

(51) Int. Cl.
*A46B 9/04*    (2006.01)
*A46B 7/06*    (2006.01)
(Continued)

(52) U.S. Cl.
CPC .............. *A46B 9/045* (2013.01); *A46B 7/06* (2013.01); *A46B 13/06* (2013.01); *A61C 17/228* (2013.01);
(Continued)

(58) Field of Classification Search
CPC ...... A46B 9/045; A61C 17/222; A61C 17/228
See application file for complete search history.

(56) References Cited

U.S. PATENT DOCUMENTS 8,359,692 B2 *  1/2013  Brewer ................. A46B 9/045
                                                           15/201
10,413,050 B2   9/2019  Pierce et al.
(Continued)

FOREIGN PATENT DOCUMENTS

DE    3337054 A1    10/1985
WO    2009137671 A1    11/2009
WO    2011161556 A1    12/2011

OTHER PUBLICATIONS

International Search Report and Written Opinion for PCT/US2021/060203, dated Feb. 23, 2022. 13 pages.
(Continued)

*Primary Examiner* — Laura C Guidotti
(74) *Attorney, Agent, or Firm* — Procopio, Cory, Hargreaves & Savitch LLP

(57) ABSTRACT

Powered toothbrush systems that provide improved bristle positioning and bristle contact with tooth surfaces that reduce the time and effort required for effective brushing. Some embodiments use alternating or oscillating pneumatic pressure and suction to move a toothbrush head. Various configuration of the brush head provide different areas of coverage ranging from individual tooth to quarter mouth (U-cross section), to half (U-cross section or H-cross section) or whole mouth (U-cross section or H-cross section) coverage. Some embodiments include flexible fingers and/or (Continued)

bladders to keep the bristle tips properly engaged with the teeth and gums, providing bristle contact over a wide variety of malocclusion. The shape of the brush heads adapts to conform closely to the shape of the user's dental tray and to any malocclusion that may be present. The powered toothbrush automatically generates motion of the brush head that simulates the Modified Bass Method of brushing.

20 Claims, 32 Drawing Sheets

Related U.S. Application Data on Mar. 31, 2021, provisional application No. 63/116,426, filed on Nov. 20, 2020.

(51) Int. Cl.
| | | |
|---|---|---|
| A46B 13/06 | (2006.01) | |
| A61C 17/22 | (2006.01) | |
| A61C 17/32 | (2006.01) | |

(52) U.S. Cl.
CPC ...... *A61C 17/32* (2013.01); *A46B 2200/1066* (2013.01)

(56) References Cited

U.S. PATENT DOCUMENTS

| | | | |
|---|---|---|---|
| 11,109,951 B1* | 9/2021 | de Gentile | A46B 9/045 |
| 2010/0062397 A1 | 3/2010 | Brewer | |
| 2023/0143045 A1* | 5/2023 | Van Dijk | B29C 65/02 15/21.1 |

OTHER PUBLICATIONS

International Search Report and Written Opinion for PCT/US2021/060208, dated Mar. 3, 2022. 13 pages.

* cited by examiner

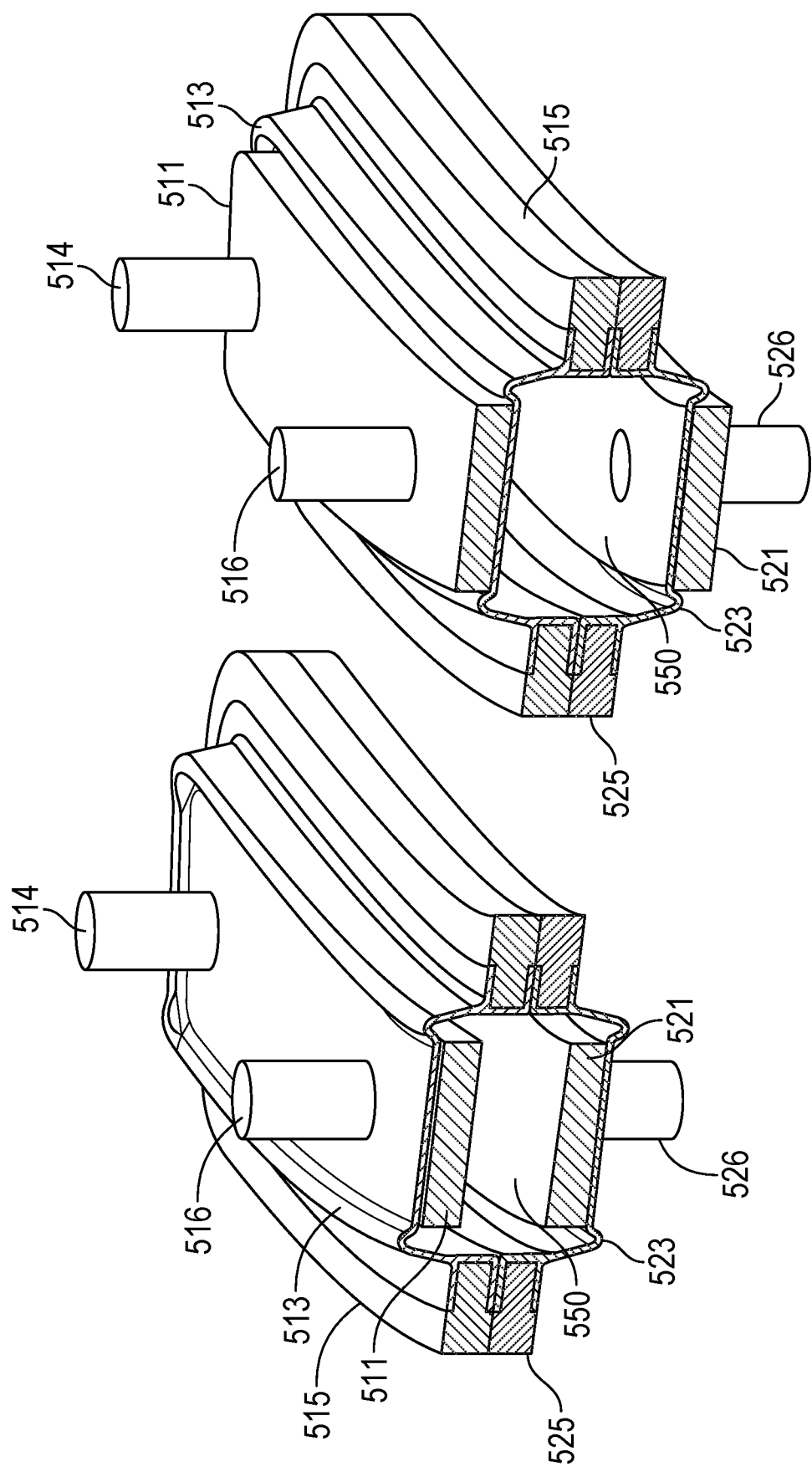

POWERED DENTAL CLEANING DEVICE

CROSS-REFERENCE TO RELATED APPLICATIONS

This application claims priority to U.S. Provisional Patent App. No. 63/116,426, titled "POWERED TOOTHBRUSH", filed on Nov. 20, 2020; U.S. Provisional Patent App. No. 63/169,061, titled "ENCOMPASS POWERED TOOTHBRUSH", filed on Mar. 31, 2021; and U.S. Provisional Patent App. No. 63/185,751, titled "IMPROVED J-ARCH FIT", filed on May 7, 2021, each of which is hereby incorporated herein by reference as if set forth in full in its entirety.

BACKGROUND

Technical Field

The present invention generally relates to the field of dental cleaning and relates to a powered toothbrush that provides a brushing motion that produces improved cleaning of teeth.

Related Art

Cleaning one's teeth is a necessary, yet time consuming chore necessary for good oral health. Various manual and powered dental cleaning products exist for the removal of dental plaque from the teeth. Most manual and powered toothbrushes require two or more minutes of use in order to effectively remove plaque buildup. However, studies have shown the average person only brushes for a mere thirty-seven seconds. Furthermore, nearly eighty-seven percent of the population does not floss daily, which may lead to additional plaque buildup between teeth that can result in poor oral health.

Powered toothbrushes have been shown by clinical studies to more effectively remove plaque. But, less than 30 percent of the population of the United States uses a powered toothbrush. The effectiveness of powered toothbrushes is also very technique dependent. Small brushing heads on typical toothbrushes require precision positioning for the bristles to contact the proper locations on the teeth. Poor technique may result in tooth surfaces being cleaned in a non-uniform fashion, which may lead to plaque buildup that is even more difficult to remove during subsequent cleanings. Poor brushing techniques may also lead to other oral health problems, such as soft-tissue abrasion, gingival recession, cervical wear (wear occurring at the neck of the tooth), and dentinal hypersensitivity.

SUMMARY

Systems for improved dental care devices are provided that address the shortcomings of conventional dental care devices. Embodiments provide a powered toothbrush with improved bristle positioning and bristle contact with tooth surfaces that reduce the time and effort required for effective brushing. Some embodiments use alternating or oscillating pneumatic pressure and suction to move a toothbrush head. The size and orientation of the brush head can vary, providing different areas of coverage with individual coverage areas ranging from individual tooth to quarter mouth (U-cross section), to half (U-cross section or H-cross section) or whole mouth (U-cross section or H-cross section) coverage. Some embodiments include flexible sided wall segments (fingers) and/or bladders (air or fluid) to keep the bristle tips properly engaged with the teeth and gums, providing bristle contact across variations in teeth size, shape, number, and occlusion. The shape of the brush heads adapts to conform closely to the shape of the user's dental arch and to any malocclusion that may be present. The powered toothbrush automatically generates motion of the brush head that simulates the "Modified Bass Method" of brushing that is recommended by dental professionals as being most effective for removal of dental plaque.

According an embodiment of the present invention, a powered toothbrush is provided. The powered toothbrush includes a first dental tray including a first set of cleaning surfaces for simultaneously cleaning multiple tooth surfaces of a first set of teeth; a second dental tray including a second set of cleaning surfaces for simultaneously cleaning multiple tooth surfaces of a second set of teeth, the second set of teeth opposing the first set of teeth; an inflatable bladder disposed between the first and second dental trays; a frame retaining the bladder; a first coupling mechanism which couples the first dental tray to a first side of the bladder; and a second coupling mechanism which couples the second dental tray to a second side of the bladder opposite the first side of the bladder.

The inflatable bladder can include a first membrane spanning and coupled to a first side of the frame and a second membrane spanning and coupled to a second side of the frame opposite the first membrane.

The first coupling mechanism can include one or more attachment members coupled to the first membrane and one or more corresponding interface openings in the first dental tray and the second coupling mechanism comprises one or more attachment members coupled to the second membrane and one or more corresponding interface openings in the second dental arch.

The power toothbrush can further include a first paddle interposed between the first dental tray and the inflatable bladder, the first paddle attached to the first membrane and having the one or more attachment members extending therefrom away from the bladder; and a second paddle interposed between the second dental tray and the inflatable bladder, the second paddle attached to the second membrane and having the one or more attachment members extending therefrom away from the bladder.

Further, the first set of cleaning surfaces and the second set of cleaning surfaces can each comprise a fabric; and a plurality of yarn segments woven through the fabric, wherein each of the plurality of yarn segments comprises a plurality of filaments that form bristles on a first side of the fabric.

The power toothbrush can include a handle portion; and a pneumatic device disposed within the handle portion and coupled to the bladder.

The power toothbrush can include a neck extending from the frame and having a conical opening in an end opposite the frame and a first interlocking component located within the conical opening.

The power toothbrush can include a handle portion having a base, a nose cone opposite from the base and a second interlocking component on the nose cone and interlocked with the first interlocking component; and a pneumatic device disposed within the handle portion and coupled to the bladder via the nose cone.

These and other features, aspects, and embodiments are described below in the section entitled "Detailed Description."

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 13 and 14 illustrate cross sectional views of different examples of the driving mechanisms according to embodiments disclosed herein;

DETAILED DESCRIPTION

Figure 1:
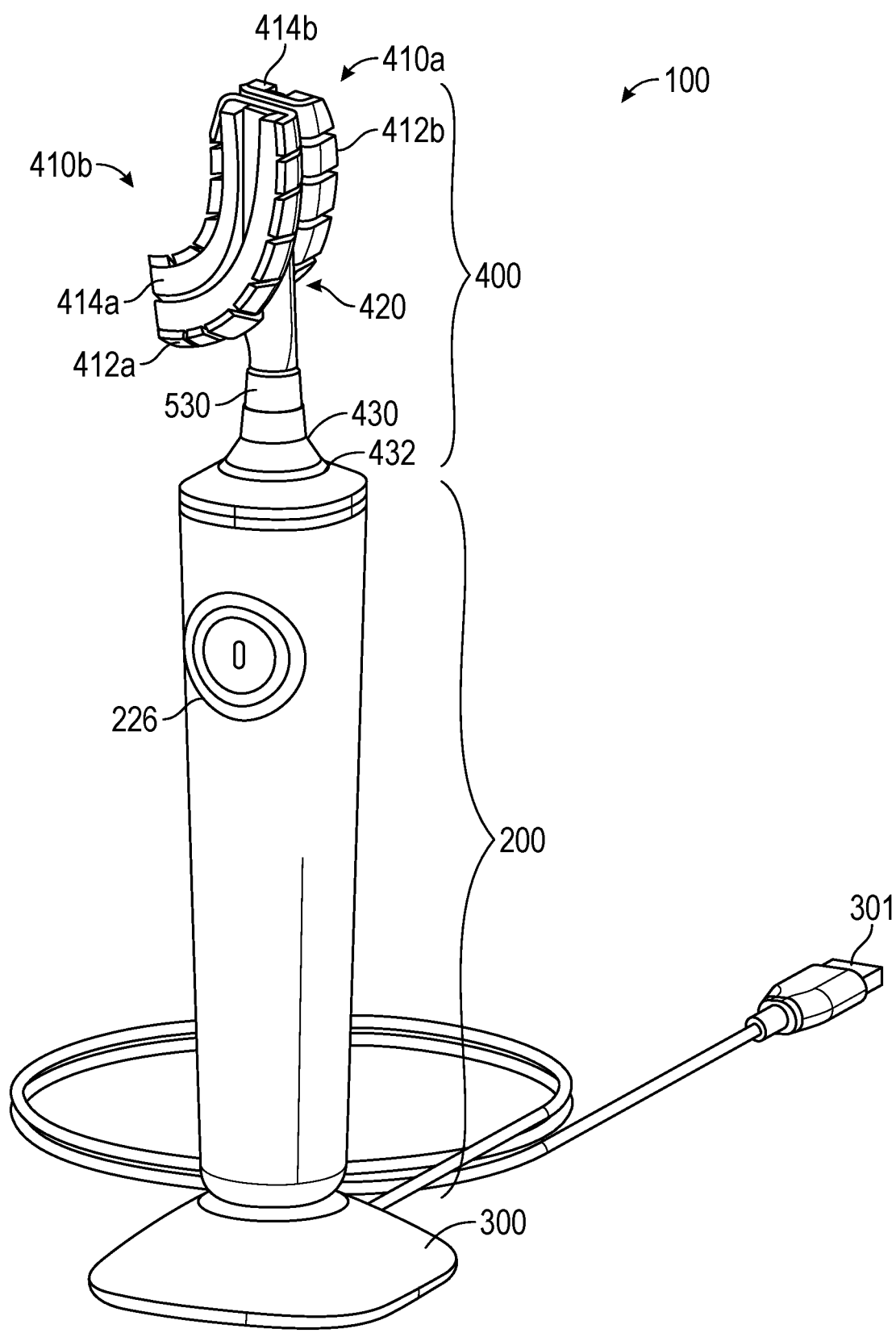
FIG. 1 illustrates a perspective view of a powered toothbrush according to embodiments disclosed herein.

Various embodiments of powered toothbrushes are disclosed herein. It will be understood that while various steps, components, parties, etc., are disclosed in the description of the embodiments below, the embodiments are by way of example and should not be seen as limiting the systems and methods described to only those steps, components, parties, etc., disclosed.

Systems and methods for a powered toothbrush are provided. Embodiments of the powered toothbrush can provide advantages over conventional tooth cleaning systems: compliance, conformity, and comfort. Compliance with a proper brushing regime includes two factors: technique and time. Many people do not execute a proper brushing technique, and even if the technique used were correct, the length of time that most people brush is far less than is recommended to effectively remove dental plaque. Both of these factors can result in missed dental plaque that can lead to poor oral health.

Embodiments of the powered toothbrush enable users to easily execute a compliant brushing technique in a much shorter period of time than is required using conventional toothbrushing systems and methods. The time and dexterity required for effective brushing is also reduced, and the effectiveness of toothbrushing can also be increased for persons having limited dexterity, such as the elderly, the handicapped, and small children. Embodiments of the present invention also provide brush heads that decrease the amount of time required to execute a compliant brushing regime by brushing multiple teeth simultaneously. For example, some embodiments include brush heads that can brush all of the teeth in the mouth at once, half of the teeth in the mouth at once (all of the mandibular arch of teeth, all of the maxillary arch of teeth, or one half of the teeth of the mandibular arch and on half of the teeth of an opposing half of the maxillary arch simultaneously). Other configurations are also possible based upon the disclosure provided below.

Embodiments of the powered toothbrush provide effective cleaning of the teeth by providing the benefits of the "Bass Method" and the "Modified Bass Method" of brushing. These techniques are preferred by many dental professionals as being most effective for removing bacterial plaque removal adjacent to and directly beneath the gingival margin. Removal of dental plaque from the gingival margin provides a significant contribution to controlling gingival and periodontal disease. In the Bass Method, a manual toothbrush with a flat brushing plane and rounded nylon filaments is directed toward the gums at approximately a forty-five degree angle and an up and down motion is used to clean the teeth. The Modified Bass Method adds a slight circular motion to the up and down motion of the Bass Method. While the Bass Method of brushing is quite effective at cleaning the teeth and removing plaque, people often find the technique too difficult to execute correctly. Therefore, some dental professionals recommend the Modified Bass Method over the Bass Method of brushing. The Modified Bass Method is believed by some dental professionals to be more easily accomplished using a manual toothbrush, but the Bass Method provides more effective interproximal cleaning. Since relatively few people floss regularly, deep interproximal cleaning may significantly reduce the accumulation of calculus on the teeth, resulting in improved oral health. Embodiments of the powered toothbrush automatically move the brush heads to mimic the Bass Method of cleaning, enabling users to benefit from the more effective cleaning of the Bass Method without being limited by the manual dexterity of the users. Embodiments of the powered toothbrush provide the effective cleaning of the tooth surfaces and interproximal areas while removing the burden of mastering and executing challenging brushing techniques.

The powered toothbrush also provides conformity. People have a wide variety of dental arch shapes and sizes as well as a variety of tooth widths. Furthermore, the position of teeth can vary widely due to malocclusion where teeth are out of alignment. Embodiments of the powered toothbrush include adjustable brush heads that enable the brush head to conform to the specific parameters of users' mouths regardless of the size and shape of the users' dental arches, the users' tooth widths, and any malocclusion or misalignment of the users' teeth. Embodiments of the powered toothbrush provide improved bristle positioning that result in improved contact of the bristles with the tooth surfaces to provide more uniform cleaning of the teeth.

The powered toothbrush also provides a comfortable brushing experience. Users are not likely to use a system that is not comfortable to use. The brush heads of the powered toothbrush system are formed from flexible materials that adjust to the shape of the user's mouth, and include thinner softer bristles than conventional toothbrush systems that are less likely to irritate sensitive teeth and/or gums.

Based upon expanded worldwide ethnic studies, it is evident that the main embodiments set forth herein provide more adjustability and user-friendly fits; upper vs lower jaw adjustments, tooth angle to jaw adjustments, length of upper to lower jaw adjustments and the ability for the brush to gimbal as it rests on the drive plates of the bladder than was previously known. The approaches set forth herein provide improved and new ways of size and shape flexibility to reduce the size offerings necessary to accommodate a large percent of the world population from many to just a few. This allows a greater population and greater use by all ethnic groups worldwide. The improved shape adjusting brushes described herein provide improved brush contact with a wider variety of mouth sizes and shapes resulting in improved plaque removal. Early tests indicate that plaque removal for the embodiment herein is greater than 3X better than a manual toothbrush.

Embodiments of Powered Toothbrush

FIG. 1 illustrates a perspective view of a powered toothbrush 100 according to embodiments disclosed herein. FIG. 1 illustrates a powered toothbrush 100 having a multi-tooth and/or multi-dental tray brush head assembly 400 (FIGS. 5A-14). The most common method of removing dental plaque is to generate a shearing force by the movement of toothbrush filaments 414 via dental trays 412, of the brush head 400 over the exterior surfaces of the teeth. According to some embodiments, the powered toothbrush 100 is configured to generate brush motions that mimic the brush motions of the Bass Method of brushing recommended by dental professionals.

Figure 2:
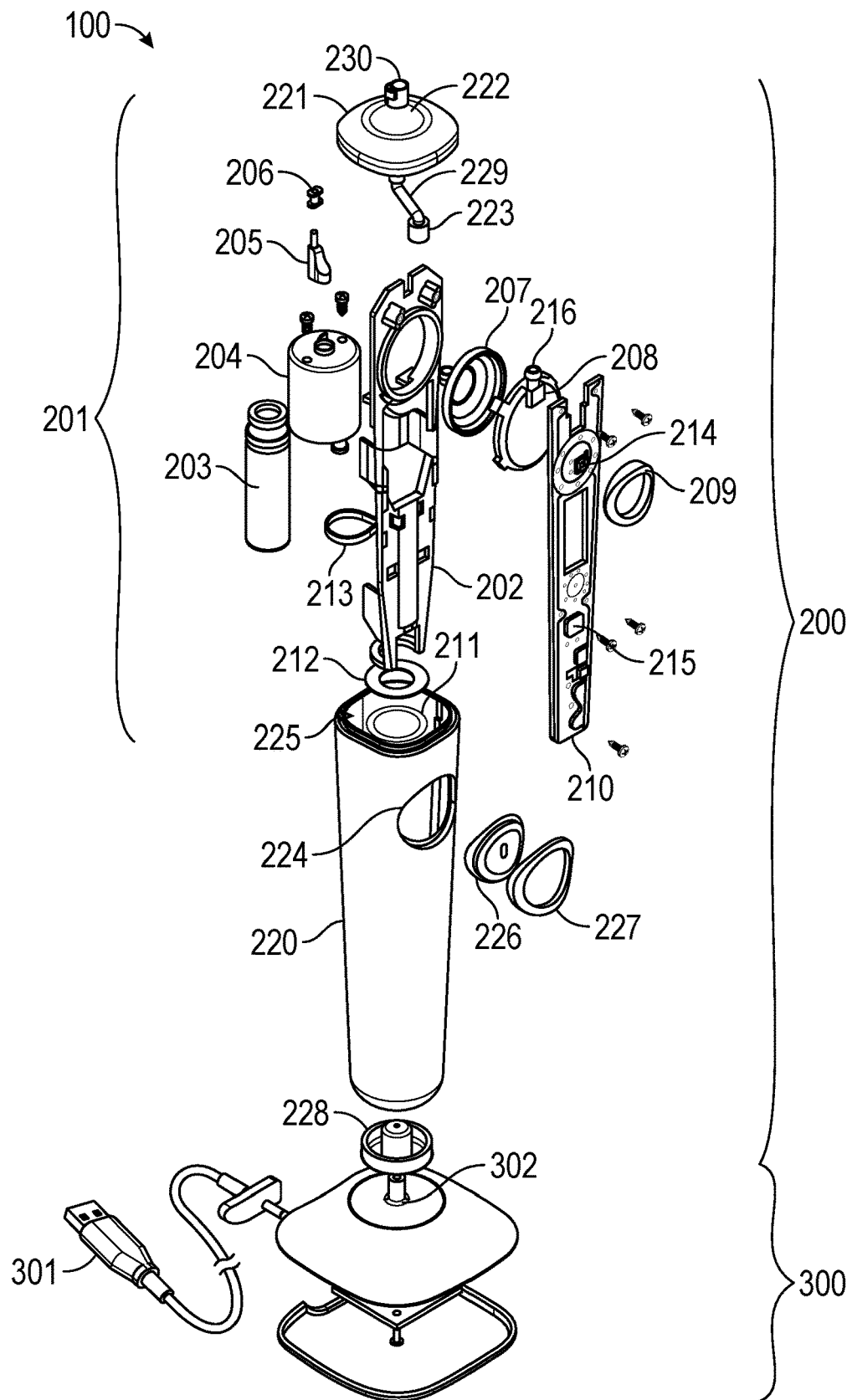
FIG. 2 illustrates an exploded view of the powered toothbrush of FIG. 1, with the brush head removed.

FIG. 2 illustrates an exploded view of the powered toothbrush 100 of FIG. 1, with the brush head 400 removed. The removable brush head assembly 400 may be removably coupled to a handle portion 200 via an interlocking system (FIGS. 17-20) included in neck 430. FIG. 2 illustrates the internal components of handle portion 200. Handle portion 200 comprises a handle housing 220, an upper cover 221, and a lower cover 228. The handle housing 220 comprises a cavity 225 that houses an internal chassis 201.

Handle housing 220 also includes an opening 224 that receives an input mechanism 226 coupled to switch 214 that enables a user to power on or power off powered toothbrush 100. A seal 226 may be provided between the input mechanism 226 and housing 220 to hermetically seal the housing 220. The input mechanism 226 may be a button that deflects in response to user input to operate the switch 214. As another example, the input mechanism may be a capacitive or other touch sensitive surface that is configured to operate switch 214 responsive to user input.

Figure 3C:
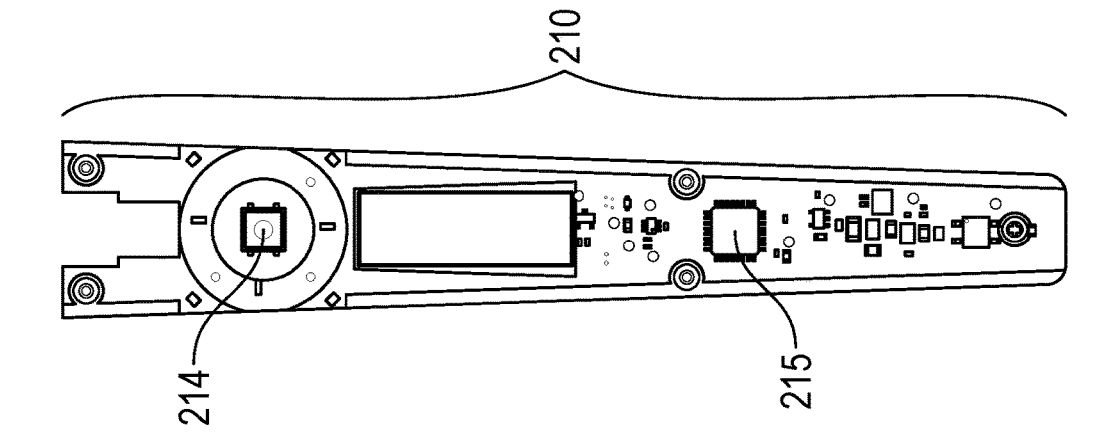
FIGS. 3A-3C illustrate various views of an example internal chassis of the powered toothbrush of FIG. 1, according to embodiments disclosed herein.
Figure 3B:
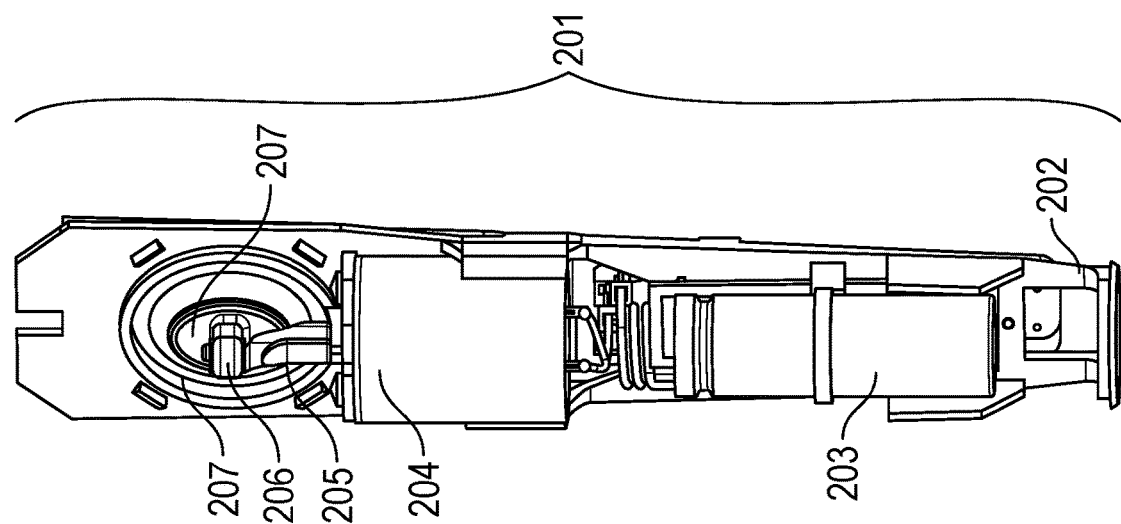
Figure 3A:
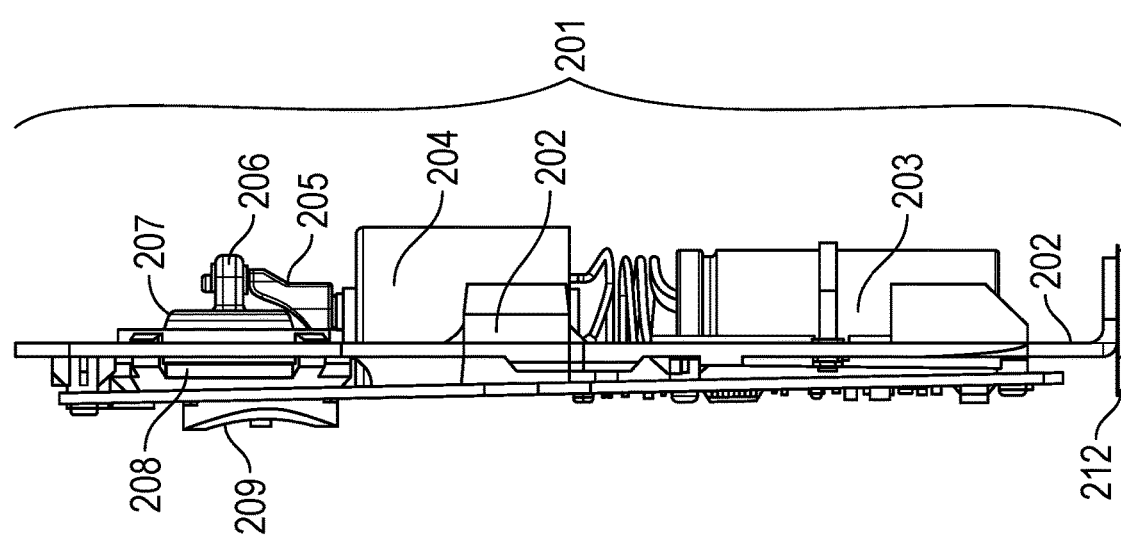

FIGS. 3A-3C illustrate various views of the internal chassis 201 of the powered toothbrush 100. FIG. 3A illustrates a side view of the internal chassis 201, FIG. 3B illustrates a perspective view of the internal chassis 201 at an angle opposite of the perspective shown in FIG. 2. The internal chassis 201 includes a carrier 202 on to which components of FIGS. 2-3C may be attached via fastener components (e.g., set screws, bolts, and the like).

The internal chassis comprises a bushing 206 coupled to an eccentric 205 that is driving by a motor 204 (e.g., a DC motor or the like). The bushing 206 may be attached is a diaphragm 207 affixed to the carrier 202 via a chassis lower 208 that is sandwiched between the body 201 and a print circuit board assembly (PCBA) 210. The motor 204 is electrically coupled to battery 203 (e.g., a lithium-ion battery or the like) via power leads and the battery 203 is attached to the carrier 202, for example, by a fastener component 213 (e.g., a zip tie in this example, but any fastener may be used). The PCBA 210 may comprise a switch 214 that receives input via input mechanism 226 for activating/deactivating the toothbrush 100. A seal 209 may be provided around the input device 214. The PCBA 210 may also comprise a processor device 215 for controlling operation of the toothbrush 100 according instructions stored in a memory. The processor device 215 may be implemented, for example, as processing device xxx The upper cover 221 includes a nosecone 222 configured to couple to the brush head 400 via an interlocking system. For example, the nosecone 222 may comprise a first interlocking component for interfacing with a second interlocking component included in the brush head assembly 400 (as described in greater detail below in connection to FIGS. 17-20). The upper cover 221 may also include an inlet port 223 at an end of tube 229. The inlet port 223 is configured to mate with an outlet port 216 of diaphragm 206 via a coupling or male/female mating to supply fluid (e.g., gaseous or liquid) to the brush head assembly 400 via a channel in the nosecone 222 between the inlet port 223 and an outlet 230. For example, operation of the motor 204 pulsates the diaphragm 207, and fluid flow due to pulsating is supplied into the inlet port 223 and to the brush head assembly 400 via outlet 230. One or more of the inlet port 223, tube 229, outlet port 216, diaphragm 206, and outlet 230 may be considered as part of a fluid pathway between the pneumatic system and the driving mechanism 420.

According to some embodiments, the battery 203 is recharged using an external power source via charging coil 212 electrically coupled to the battery 203. The handle portion 200 may be held by or rest on a docking station 300. For example, the docking station 300 may have an upper housing having a protrusion extending from the upper housing and a lower housing, the combination of which forms a cavity holding a charring coil. The lower cover 228 may comprise a recessed opening extending inward into cavity 225 that is configured to receive the protrusion of the docking station. In some embodiments, charging coil 212 receives power from docking station 300, electrically coupled to the external power supply via cable 301, that holds powered toothbrush 100 while the toothbrush not in use. For example, when the toothbrush 100 rests on the docking station 300, charging coil 212 receives inductance from the charging coil of the docking station to supply charge the battery 203. Cable 301 may include a plug interface that enables powered toothbrush 100 to be plugged into mains power. Some embodiments may use disposable batteries, yet other embodiments may be powered by a high energy capacitor.

The powered toothbrush 100 includes a pneumatic system for conversion of electrical energy to filament motion. With reference to FIG. 1, the brush head assembly 400 includes a driving mechanism 420, disposed between an upper brush component 410a and a lower brush component 410b (collectively referred to as brush component 410b). The upper brush component includes dental tray 412a (e.g., a mandibular arch) and brush filament 414a, and lower brush component 400b includes dental tray 412b (e.g., a maxillary arch) and brush filament 414b. The driving mechanism 420 alternatively drives the dental trays 412a and 412b apart and brings the dental trays 412a and 412b together to create a brushing motion. Additional details describing an example head brush assembly 400 and an example driving mechanism 420 are provided below with respect to FIGS. 5A-14. According to other embodiments, other driving mechanisms can be used, such as a driving a double bladder or a bladder having multiple chambers, a bladder in the form of a plurality of inflatable actuator domes, or other mechanical mechanisms, such as a motor with wobble weights to induce motion into the brush plates.

The driving mechanism 420 may extend from a sheath 530 to the first and second brush components 410. The sheath 530 is attached to neck 430, which may include an optional identification band 432 at an edge of the neck 430 opposite the sheath 530. The sheath 530 may surround an inlet 532 for supplying fluid from outlet 230 into a channel within the driving mechanism 420 (see FIGS. 4A, 4B, and 10A-12). The sheath 530 may be provided to prevent the fluid pathway therein from becoming obstructed, crushed, or twisted. The inlet 532 may be considered as part of the fluid pathway between the pneumatic system and the driving mechanism 420.

The powered toothbrush 100 includes a pneumatic system to provide alternating or oscillating pneumatic pressure, such as the motor 204 drives the diaphragm 207 according to electrical energy supplied by battery 203 to deliver pneumatic pressure to the driving mechanism 420 via coupling to tube 229. Tube 229 provides a portion of a fluid conduit or pathway from the diaphragm to driving mechanism 420. The fluid conduit may comprise the tube 229, inlet 223, outlet 230, inlet 532, a channel in the nosecone 22 between outlet 230 and inlet 223, and a channel extending from the inlet 532 (e.g., channel 535) into the driving mechanism 420. According to some embodiments, pneumatic system is closed. Additional details describing the interaction of the pneumatic system and driving mechanism are provided below with respect to FIGS. 15-16C. According to some embodiments, the pneumatic system may be closed, except for a small amount of air intake used to make up for air leakage from the system. According to some alternative embodiments, the pneumatic system need not be closed, but instead, may include at least one pressure relief valve for releasing pressure from the system.

Various pump designs may be used to provide the pneumatic pressure to the pneumatic system of the powered toothbrush. For example, according to some embodiments, the motor 204 may be a rotary motor with a pump section (e.g., pump 207) is used, while in other embodiments motor 204 may be a linear motor with a cam, like a wobble weight, pushing on a bellows or a diaphragm (e.g., pump 207) is used to generate pneumatic pressure. In yet other embodiments, motor 204 may be a linear motor with a piston pump (e.g., pump 207) is used. In some embodiments, a piezo device may be implemented as motor 204 pushing a bellows (e.g., pump 207) may be used to generate pressure.

According to some embodiments, the pneumatic system of the powered toothbrush 100 is configured to not store a supply reservoir of fluid (e.g., air) at a set pressure, as described below in connection with FIGS. 15-16C, unlike most conventional pneumatic systems. Instead, the pressure in the system is dynamic. Each stroke of pump 207 has a compression stroke and a suction stroke. Valves are used to direct air toward the bladder during the compression stroke to cause the driving mechanism to inflate. The valves also direct suction toward the driving mechanism in an out-of-phase relationship. When both pressure and suction are joined in a common fluid pathway, the resulting pressure differential oscillates the driving mechanism, for example, inflates and deflates a bladder or bladders included therein. The suction initiates a rapid deflation, more rapid than just letting the dental trays 102 and 104 fall as pressure decreases in the bladder or bladders.

In various embodiments, positive and negative cycling pressure scenarios may be achieved in the driving mechanism during each pump stroke. The fluid from pump 207 is allowed to flow into or out of the driving mechanism as the pump 207 performs compression thereby pushing fluid into the driving mechanism via the fluid pathway or suction thereby pulling the fluid from the driving mechanism. In this embodiment the effect of keeping the dental trays in motion through either mechanical resonance or pneumatic volume tuning of the air cavity results in optimal motion. By selecting a drive frequency that is slightly higher frequency than the resonant frequency, when the whole brushing system is loaded the amplitude or apparent brushing power is increased. In this embodiment an increase in mass can actually be easier to move and stay in motion with less applied energy.

According to some alternative embodiments, flapper valves may not be used to direct the flow of air and build pressure in the pneumatic system.

While the above example provides a pneumatic system implemented using a motor and diaphragm, other implementations are possible. For example, the pneumatic system may include a miniature piston air compressor, an air delivery system coupled to the miniature piston air compressor, and a flexible, elastic bladder in fluid communication with air compressor via a manifold, for example as described in connection with U.S. Pat. No. 8,359,692, the disclosure of which is incorporated herein as though set forth in full. The air compressor may reside in handle portion 200, and the bladder may be layered between the mandibular arch (dental tray 412a) and the maxillary arch (dental tray 412b) of brush head 400. Air delivery manifold connects the air compressor to the bladder via a coupling. Coupling provides an air conduit from the air compressor to bladder.

Figure 4A:
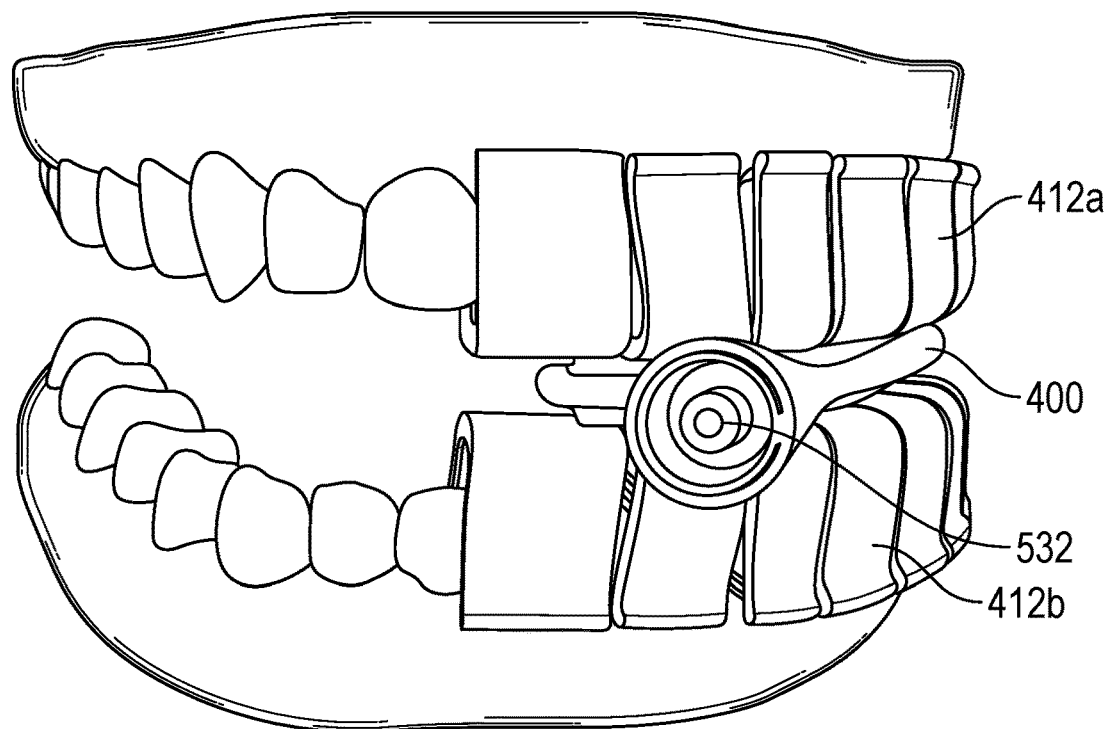
FIGS. 4A and 4B illustrate an example brush head assembly of the powered toothbrush of FIG. 1 engaged with a set of teeth.
Figure 4B:
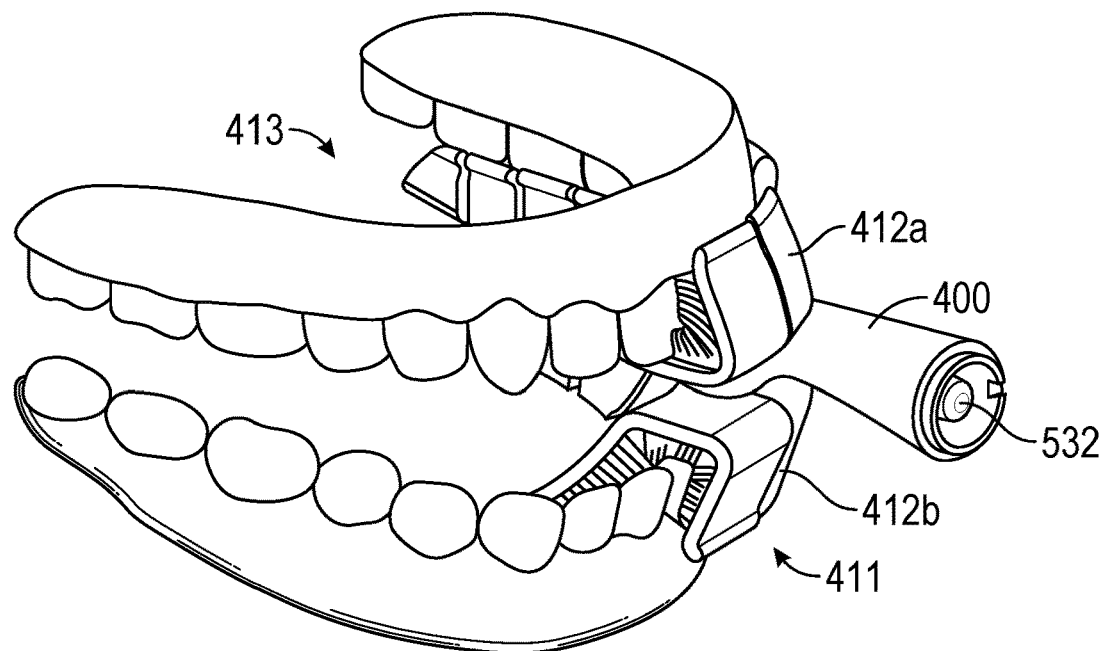

With reference to FIG. 1, dental tray 412a and dental tray 412b are illustratively depicted as J-shaped arches that enables right or left sagittal plane brushing of the mandibular dental arch and maxillary dental arch simultaneously (both the upper and lower teeth on one side of the mouth), as shown in FIGS. 4A and 4B. Brush head 400 can be used to brush either side of the mouth and the gimbal of the dental trays (side-to side tilt) and front to back tilt to help accommodate different bite angles, jaw shapes, lengths and jaw shapes and tooth angles. For example, a user can simply flip the brush over to brush the teeth on the other side of the mouth. According to some embodiments, dental trays 412a and 412b may be U-shaped arches that enable brushing of the full mandibular dental arch and maxillary dental arches. According to some embodiments, dental trays 412a and 412b include soft tips along the edges of the dental trays that massage the user's gum line while the brush head assembly 400 is cleaning the teeth.

Inflation and deflation of driving mechanism 420 may be accomplished by alternatively applying pressure and suction by diaphragm 207 via motor 204. According to some embodiments, as described in U.S. Pat. No. 8,359,692, a driving mechanism may be provided in the form of one or more dome-shaped activators, e.g., air bladders, is used instead of a single large air bladder. According to another embodiment, the driving mechanism may be provided in the form of a speaker cone having a rigid frame surrounding a flexible, speak cone structure attached to a circumference of a central rigid portion. A detailed description of an embodiment using a speaker cone activator is described below with respect to FIGS. 13-18.

Filaments 414a is coupled to dental tray 412a, and filament 414b is coupled to dental tray 412b. The filaments 414a and 414b (collectively referred to as filaments 414) comprise a cleaning surface that may contact the surface of the teeth for cleaning. Each cleaning surface may comprise one or more cleaning members, such as, but not limited to bristles or any other structure that contact the surface of the teeth for cleaning. The dental trays 412a and 412b (collectively referred to as dental trays 412) apply pressure on the respective filament 414 that cause a corresponding cleaning surface of the filament to contact the surface of a user's teeth. The filaments 414 can conform to the tooth surfaces even where malocclusions are present. Because the pressure from the dental trays 412 helps to keep the cleaning surface of the filaments 414 in contact with the surface of the teeth, the length of cleaning members (e.g., bristles or other element that contact the surface of the teeth for cleaning) used can be much shorter than a length that may have been required if the cleaning members alone were used to conform to the dental arch of the user's teeth. According to an embodiment, the cleaning members are bristles that are set at a perpendicular to acute angle to the surface of the teeth with the distal end of the bristles being directed toward the gingival sulcus in order to remove bacterial plaque adjacent to and directly beneath the gingival margin. According to another embodiment, the bristles may be angled relative to the surface of the teeth, for example, the bristles may be angled at approximately 45 degrees to the surface of the teeth. In another embodiment, a subset of the bristles may be angled relative to the surface of the teeth, while another subset are set perpendicular to the surface of the teeth (see, for example, FIGS. 25A and 25B). In yet other embodiments, multiple subsets of bristles may each be angled at different angles relatively to the surface of the teeth. For example, bristles may comprise one or more of a first subset of bristles angled at positive 45 degrees (e.g., such that the distal end extends downward from the proximal end), a second subset of bristles angled at negative 45 degrees (e.g., such that the distal end extends upward from the proximal end), a third subset of bristles angled at 35 degrees, a fourth subset of bristles angled at perpendicular, etc. Any number of subsets and angles may be included to achieve desired cleaning performance.

According to some embodiments, the filaments 414 are attached to the dental trays 412 using an adhesive. According other embodiments, the filaments 414 include a rigid backing that may be snapped or locked into place on the dental trays 412. According to some embodiments, the filaments 414 may be removable and replaceable to allow a user to replace the filaments 414 without having to replace the entire brush head. Various techniques may be used to snap or lock the filaments 414 into place. According to some embodiments, heat staking or ultrasonic staking may be used to attach the filaments 414 to the dental trays. For example, the filaments 414 may have one or more posts extending from a rigid backing that are fused to a dental arch. According to other embodiments, stretch snaps may be used to attach the filaments 414 to the dental trays 412. For example, the filaments 414 may include one or more rubber tips that are stretched, inserted through an opening in the dental tray and released, and the rubber tip unstretches and expands wide enough that the tip cannot escape from the opening and holds the brush pad in place. According to another embodiment, a "pop bead" or pop beads may be used to hold the filaments 414 in place. The pop beads comprise a molded round feature that is molded onto the rigid backer of the filaments 414 and is snapped into a corresponding opening on the dental arch. The pop beads enable the rigid backing of the filaments 414 to rotate around the axis of the pop bead, which can help to align the brush heads with the teeth during use. According to yet another embodiment, ultrasonic welds may be used to affix the filaments 414 to the dental arch. For example, the filaments 414 may be formed from a plastic material that is compatible with the plastic of the dental trays, and the filaments 414 may be ultrasonically welded to the dental trays.

According to an embodiment, filaments 414 comprise bristles, each bristle having a diameter of approximately 0.001 to 0.003 inch. Soft small diameter bristles of ≤0.005 inch diameter aid in deep penetration into hard to clean areas of the mouth, such as interproximal gaps and occlusal grooves. The smaller the diameter of the bristles, the shorter a tuft may be and maintain relative stiffness of the bristles. According to some embodiments, the bristle diameters are approximately 0.003 to 0.005 inch with a length of approximately 1 to 5 mm. The filaments 414 should provide nearly full coverage of the tooth surfaces. Thus, even minimal movement of the brush head in the mouth should provide full cleaning of the tooth surfaces including interproximal areas and occlusal grooves.

In some embodiments, the filaments 414 may comprise nylon (e.g., Nylon 6, 6-6, 6-10, 6-12 and other polyamides), bristles, similar to conventional toothbrush designs. In a conventional toothbrush design, nylon bristles are typically attached using a staple set, molding, or fusing technique. Conventional staple set bristling technology can result in brushes with lower bristle density than may be achieved using the bristle pads disclosed herein. Thus, conventional brush heads using staple set technology may result in less plaque removal due to the lower bristle density.

According to some embodiments, the filaments 414 used by the powered toothbrush 100 may be fabricated using a textile fabrication process. According to some embodiments, bristles may be manufactured as part of the bristle pad fabric, while in yet other embodiments, the bristles may be attached to the surface of the fabric or inserted through the fabric. According to various embodiments, the fabric comprises various types of materials, such as a film (e.g., Mylar), a polymer or elastomer. The dental trays 412 enable the bristles to be flat while providing efficacious brushing pressure to the tooth surfaces. According to some embodiments, a driving mechanism is included between the dental trays 420 used in place of dental trays 412 to apply pressure to the brush pad. The driving mechanism may be configured to push the bristles of the filaments 414 against the teeth so that the brush pad conforms to the teeth.

In an embodiment, toothbrush filaments 414 may comprise or consist of woven brush pads. In this case, each of toothbrush filaments 414a and 414b may be formed as a single woven brush pad for each dental tray 412a and 412b, or may be formed as separate woven brush pads for each flexible finger 401 and 402.

Figure 29A:
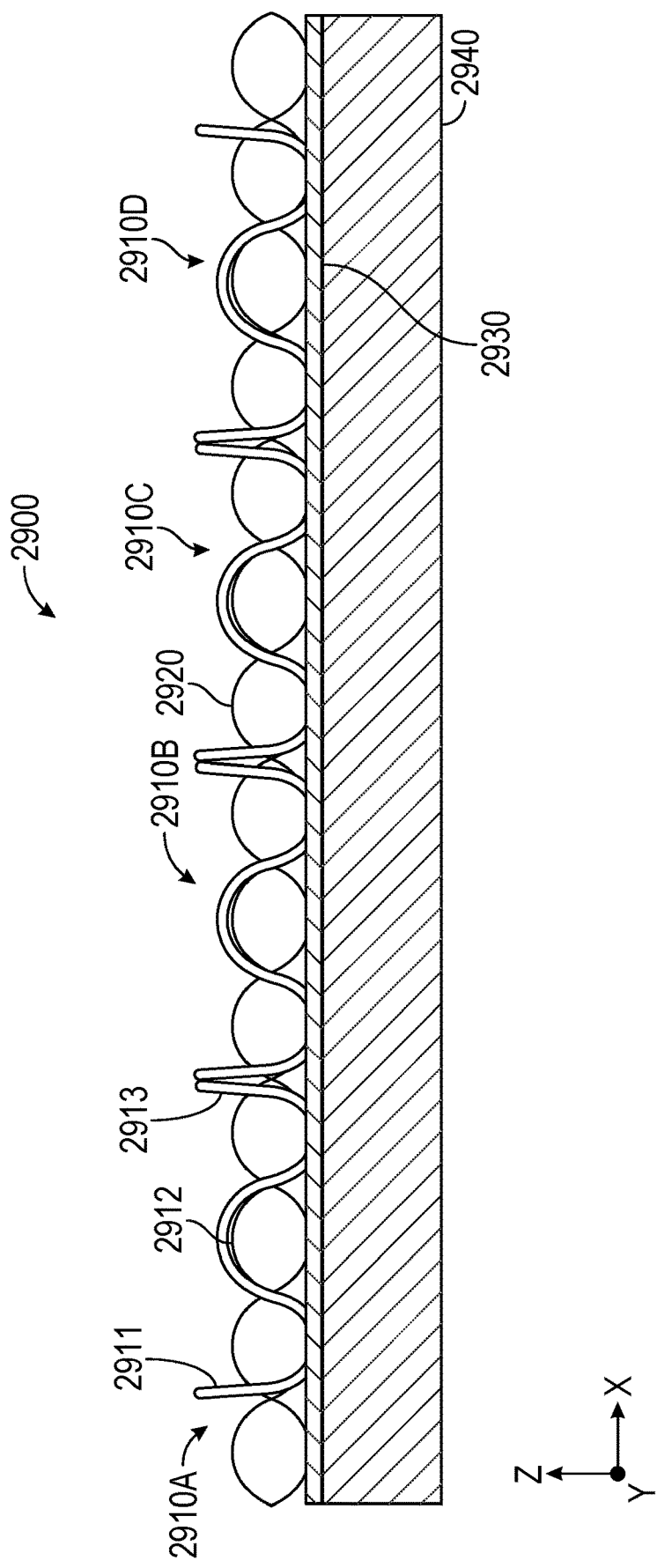
FIGS. 29A-29C are various views of woven brush pads.

FIG. 29A illustrates a cross-sectional view of a portion of a woven brush pad 2900 that may be used for toothbrush filaments 414, according to an embodiment. As illustrated, a plurality of yarn segments 2910 (e.g., 2910A, 2910B, 2910C, and 2910D) are woven into a backer, referred to herein as "fabric" 2920. Fabric 2920 may comprise a polyester, such as polybutylene terephthalate (PBT), or may comprise nylon (polyamide). However, it should be understood that fabric 120 may be made of any material that is capable of being woven.

Each yarn segment 2910 may comprise a plurality of filaments. The plurality of filaments may be twisted together, for example, in the same or similar manner by which yarn for clothing or carpet is made. In an embodiment, the filaments comprise nylon (polyamide) or a polyester, such as PBT. However, it should be understood that the filaments may be formed from other materials, such as spun organic cellulose material (e.g., silk, bamboo, seaweed, etc.) for improved biodegradability. The filaments may be made from the same material as fabric 2920 or different material than fabric 2920.

Figure 29B:
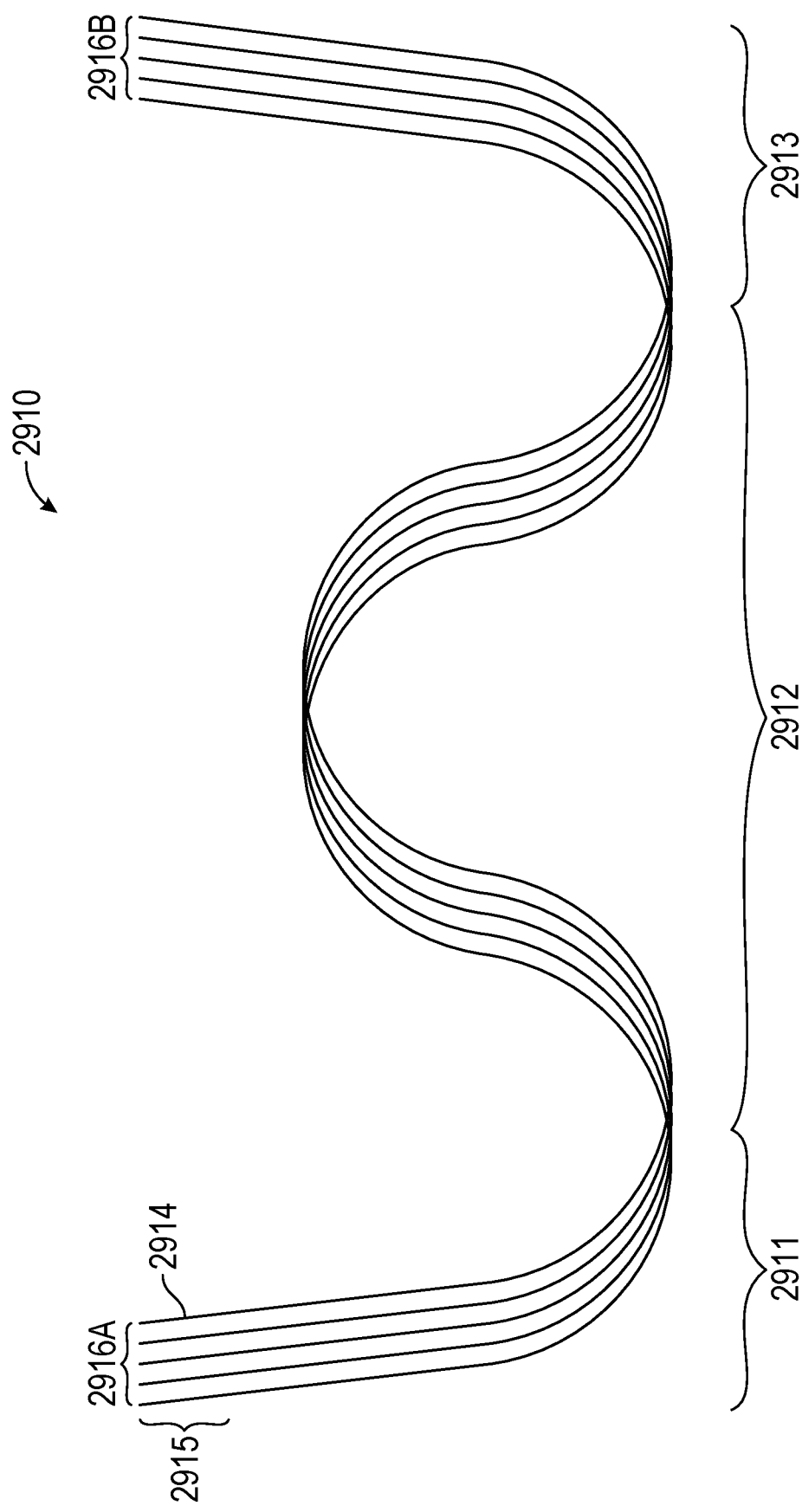

As illustrated, each yarn segment 2910 may be formed substantially in the shape of a "W" when viewed in the X-Z plane. In particular, each yarn segment 2910 may comprise a first leg 2911, a second leg 2913, and a middle portion 2912 extending between and connected to first leg 2911 and second leg 2913. FIG. 29B illustrates a single yarn segment 2910, according to an embodiment. Yarn segment 2910 comprises a plurality of filaments 2914. Yarn segment 2910 may be cut from a yarn comprising a plurality of filaments 2914 twisted together in a helical or spiral pattern. The opposing ends of each filament 2914, within first leg 2911 and second leg 2913, that extend above fabric 2920 form bristles 2915. The bundle of bristles 2915 at the end of first leg 2911 forms a first tuft 2916A, and the bundle of bristles 2915 at the end of second leg 2913 form a second tuft 2916B. It should be understood that each tuft 2916 represents a set of bristles 2915 to be used for brushing teeth.

Yarn segments 2910 may consist of filaments 2914 that all have identical characteristics or may comprise a mixture of filaments 2914 having different characteristics. These characteristics that may be the same or different include, without limitation, the material (e.g., polyester, polyamide, etc.), the diameter, the color (e.g., natural or translucent), the length, the number of twists, and/or the like.

While a W shape is illustrated, each yarn segment 2910 or one or more yarn segments 2910 may be formed in a different shape (e.g., a V shape without a middle portion 2912). Regardless of the particular shape, legs 2911 and 2913 may be oriented along the Z-axis, substantially perpendicular to the X-Y plane of fabric 2920, or may be angled with respect to the Z-axis, such that they are splayed out (e.g., away from their respective middle portions 2912).

In an embodiment, the backside of fabric 2920, which is opposite the side of fabric 2920 from which tufts 2916 extend, is sealed with a sealing layer 2930. For example, sealing layer 2930 may comprise an acrylic coating. However, it should be understood that other sealants may be used. In any case, sealing layer 2930 may prevent yarn segments 2910 from unraveling and add stability to woven brush pad 2900. Sealing layer 2930 may also provide a barrier to prevent the penetration of moisture and/or debris through fabric 2920. In an alternative embodiment, sealing layer 2930 may be omitted.

In an embodiment, woven brush pad 2900 may comprise a backing 2940. In this case, sealing layer 2930 may comprise an adhesive that seals fabric 2920, with woven yarn segments 2910, to backing 2940. In an alternative embodiment, backing 2940 may be omitted, in which case fabric 2920 may be sealed directly to dental tray 412 (e.g., by sealing layer 2930).

In an embodiment with backing 2940, backing 2940 may comprise foam, sponge, stiff polymer, and/or other material. The foam or sponge may be either closed-cell or open-cell. A closed-cell foam or sponge can prevent the absorption of fluids passing through fabric 2920, whereas an open-cell foam or sponge could carry additives, such as toothpaste, fluoride, or other dental or oral treatments. In either case, foam and sponge also provide an additional element of tooth fit and compliance. In particular, the elasticity of the foam or sponge provides a trampoline effect that enables woven brush pad 2900, including bristles 2915, to flex and better conform to and follow the profile of the teeth.

Notably, due to the orientation of yarn segments 2910, bristles 2915 may flex more easily along the X-axis than the Y-axis. In other words, filaments 2914 may be stiffer when moved along the Y-axis than when moved along the X-axis. This difference in stiffness may result in better cleaning results when teeth are brushed by movement along the Y-axis than with movement along the X-axis of woven brush pad 2900. Accordingly, in an embodiment, woven brush pad 2900 may be oriented at an angle (e.g., 45° angle) with respect to the two primary cleaning axes (e.g., side to side and up and down) of dental trays 412. In this case, the level of stiffness in tufts 2916 may be more even between the two primary cleaning axes.

In an embodiment, yarn segments 2910 may be woven according to a velvet weaving technique. However, it should be understood that other weaving techniques may instead be used, such as a crepe waving technique, a cordroi weaving technique, or the like. The appropriate weaving technique will depend on the particular weaving pattern that is desired.

Advantageously, the use of a weaving process to create woven brush pad 2900 enables narrower filaments 2914 to be used in yarn segments 2910 than in conventional toothbrushes. For example, the diameters of filaments 2914 may be between 0.03683 millimeters (0.00145 inches) and 0.0762 millimeters (0.003 inches), whereas most conventional manual toothbrushes utilize nylon filaments with diameters between 0.127 millimeters (0.005 inches) and 0.2286 millimeters (0.009 inches). As one example, the diameters of filaments 2914 may be about 0.04572 millimeters (0.0018 inches) or less than 0.0508 millimeters (0.002 inches).

Advantageously, the use of a weaving process also enables shorter bristles 2915 to be incorporated into woven brush pad 2900 than in conventional toothbrushes. For example, the lengths of bristles 2915 may each be between 3 millimeters (0.11811 inches) and 5 millimeters (0.19685 inches). These shorter bristle heights may improve the removal of young plaque from teeth by increasing the stiffness of bristles 2915. In particular, the increased stiffness improves the delivery of forces, applied to bristles 2915, to the areas to be cleaned. For a toothbrushing apparatus that is designed to polish teeth, the lengths of bristles 2915 may be even shorter (e.g., less than 3 millimeters).

In an embodiment, each filament 2914 is between 500 to 1,500 denier (for smaller diameter filaments 2914) or between 500 to 2,000 denier (for larger diameter filaments 2914). Denier is a unit of measure for the linear mass density of fibers that represents the mass in grams per 9,000 meters of fiber, based on a single strand of silk as a reference representing approximately one denier (i.e., a 9,000-meter strand of silk weighs about one gram). Filaments 2914 having different denier measures may be used in the yarn to produce yarn segments 2910 with filaments 2914 of different denier measures.

In an embodiment, additives may be added to filaments 2914 and/or to fabric 2920. For example, antimicrobial additives (e.g., silver zeolite or an equivalent) can be added to neutralize nidus growth resulting from the intake of water into woven brush pad 2900. Other potential additives that may be added to filaments 2914 and/or fabric 2920 include seaweed, fluoride, and/or other beneficial dental or oral additives.

In an embodiment, the yarn used to create yarn segments 2910 may comprise or consist of between 28 and 120 filaments 2914. It should be understood that each yarn segment 2910 will have the same number of filaments 2914 as the yarn used to create it, assuming that no filaments 2914 are lost during the weaving and cutting process. The yarn may comprise filaments 2914 twisted together, with about 3.5 twists per foot of yarn.

Figure 29C:
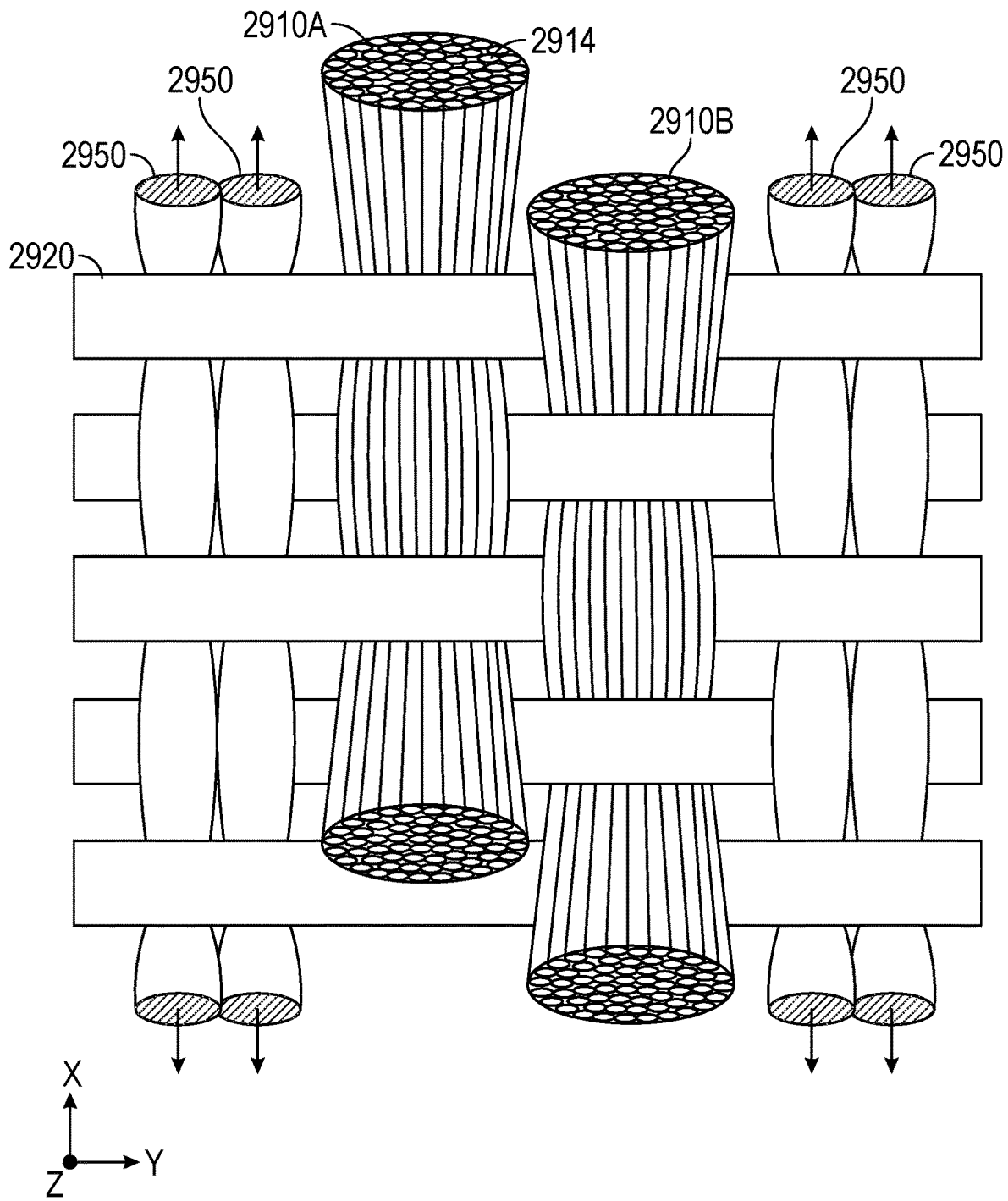

FIG. 29C illustrates a top-down view of a portion of a woven brush pad 2900, according to an embodiment. In the illustrated embodiment, woven brush pad 2900 comprises overlapping or offset W-shaped yarn segments 2910. Yarn segments 2910 are woven into fabric 2920. Additional yarn 2950 may also be woven into fabric 2920. However, in an embodiment, unlike the yarn used to create yarn segments 2910, yarn 2950 is not cut into segments and may, instead, extend the entire length of fabric 2920 (e.g., in the same dimension as yarn segments 2910, which is the X-axis in the illustrated embodiment). Yarn 2950 may divide sets of one, two, or more rows of yarn segments 2910 along a dimension (e.g., the Y-axis in the illustrated embodiment). Alternatively or additionally, yarn 2950 may form selvage at the edges of fabric 2920 to prevent unraveling and fraying.

According to some embodiments, a combination of conventional bristling and bristled fabric is used. A combination of conventional bristling with the bristled fabric provides a very high bristle density that may provide improved removal of dental plaque. According to some embodiments, groupings of bristle strands are coupled to the bristled fabric of the filaments 414, and in some embodiments, the lengths of the bristles included in the bristle strands may vary to shape the bristle strands.

According to some embodiments, the filaments 414 may comprise bristles fabricated from elastomeric materials (e.g., such as, but not limited to, silicone rubber, thermoplastic elastomers (TPE) also referred to as thermoplastic rubber, thermoplastic polyurethane (TPU)), polymers (e.g., polyimide, polyester (PBT), polyester, polyethylene, Tynex, polypropylene, cellulose, etc.) For example, each bristle may be a elastomeric bristle extending from the dental tray toward the cleaning surface of the teeth. The cleaning ends of each bristle may be a flat end that is perpendicular to the length of the bristle, rounded, triangular (e.g., the entire bristle is conical or pyramid shaped), and the like. Some embodiments may comprise bristles having a wiper blade shape (e.g., the bristle may be elongated in a direction parallel to the cleaning surface). In some embodiments, the tip of each bristle may be flocked, whereby the tip of each bristle comprises a plurality of small bristles extending in all directions from the tip. In another example, each tip may be flagged (e.g., mechanical flagging techniques) or feathered (e.g., chemical etching techniques), for example, each tip may be split to provide fine, gentile tips. The flagged or feathered bristles of a tip may be small (e.g., less than 0.001 inches in diameter) and may be ideally suited for removal of interproximal debris between teeth, sulcus gumline and occlusal surfaces. According to some embodiments, filaments 414 may include a finger like filament, for example, a scrub pad or flat surface similar to a squeegee or polishing cloth.

According to some embodiments, a combination of two or more of the above embodiments may be combined for use on a single brush head. For example, a single filament may include segments or portions, each having a different material and/or structure to the filament.

The filaments 414 used of the powered toothbrush described herein may require significantly lower efficacious brushing pressures to be applied to the tooth surfaces during brushing. Conventional toothbrushing methods require higher levels of pressure to be applied to the tooth surfaces. For example, the efficacious brushing bristle pressure for a sweeping sonic brush is approximately 75 to 150 grams of force applied to the whole brush plate surface, typically 2 cm 2 pressure, with a pressure of approximately 150 grams of force or ore typically being applied to the tooth surfaces of one to two teeth. The bristles of the sweeping sonic brush often vary between 0.005 and 0.007 inches in diameter and are typically comprised of Nylon 6-6 (e.g., DUPONT TYNEX filaments or equivalent) and have a bristle length of approximately 10 mm. Clinical Studies show that 2 Newtons generally is very efficacious for plaque removal. Other studies say that more brushing force removes more plaque, say even over 5 Newons on a brush. There may also be a consequence of high brushing pressures, it tends to manifest itself in greater potential for gum fissures, bleeding gums and even premature loss of dentin. This concern is addressed in embodiments described herein. The typical brushing pressure for another type of conventional brush, oscillating scrubbers is approximately 148 to 200 grams force with the pressure typically being applied to the one tooth. The typical brushing pressure for a manual brush is approximately 350 to 750 grams with a nominal pressure of approximately 500 grams. Most manual brushes include 0.007 to 0.009 inch Nylon 6-6 bristles (e.g., DUPONT TYNEX filaments or equivalent). Another manual brush made for brushing tender gums, includes 0.004 to 0.005 inch diameter Nylon bristles.

The brush head 400 may be engineered to provide a wide range of brushing pressures. For example, the dental trays 412 may be designed to provide approximately 26 grams of pressure per millimeter of flex finger displacement by the tooth surfaces. In some embodiments, the brush head 400 may be designed to provide up to 5 Newtons of force. While embodiments herein may provide more than 5 Newtons of force, such force may result in erosion of gums and dentin. The amount of force designed may be based on an amount necessary to clean while avoiding damage to the gums and dentine. In some embodiments, 2 newtons for force may be all that is necessary to remove dental plaque (e.g., embodiments utilizing filaments fabricated using textile fabrication processes, such as woven textile pads as described above). Such implementations may be able to remove dental plaque using less pressure on the cleaning surfaces, thereby reducing potential loss of dentin and/or soft tissue erosion.

Oscillation of the pneumatic system—switching between pressure and suction—rapidly pulsates driving mechanism 420 to drive the dental trays 412*a* and 412*b* up and down relative to the surface of the teeth to create the brushing motion of powered toothbrush 100. Driving mechanism 420 is disposed between dental trays 412*a* and 412*b*, and driving the diaphragm 207 causes the driving mechanism 420 to pulsate, which causes dental trays 412*a* and 412*b* to, alternatively, move apart from one another and move back toward one another. For example, air is alternatively pressed into and sucked out of a space within the driving mechanism, between the dental trays 412*a* and 412*b*, causing the space to alternatively inflate and deflate, thereby causing the dental trays 412*a* and 412*b* to move apart in an upward and downward motion that causes filaments 414*a* and 414*b* to brush along the tooth surface.

The up and down motion created by driving mechanism 420 results in a motion that mimics the brushing motions of the Bass Method. According to some embodiments, the driving mechanism 420 also impart a side-to-side motion to the dental trays, mimicking the semi-circular brushing motion of the Modified Bass Method. Thus, the powered toothbrush 100 automatically provides a compliant brushing technique by mimicking the brushing motions of the Bass Method or the Modified Bass Method recommended by dental professionals without requiring that the user master complex brushing motion.

Neck 430 interfaces with upper cover 222 and provides for coupling of the brush head assembly 400 to pneumatic tube 229. The interlocking component of the neck 430 enables brush head assembly 400 to be removed from the handle portion 200 in order to clean and/or replace the brush head assembly 420. For example, multiple users may share the same toothbrush base by decoupling their brush head from the handle portion 200 or the brush head assembly 400 may be disposable. The neck 430 may be allowed to rotate which will help assure a comfortable grip and a well-positioned brush head.

Embodiments of Brush Head Assemblies

Figure 5A:
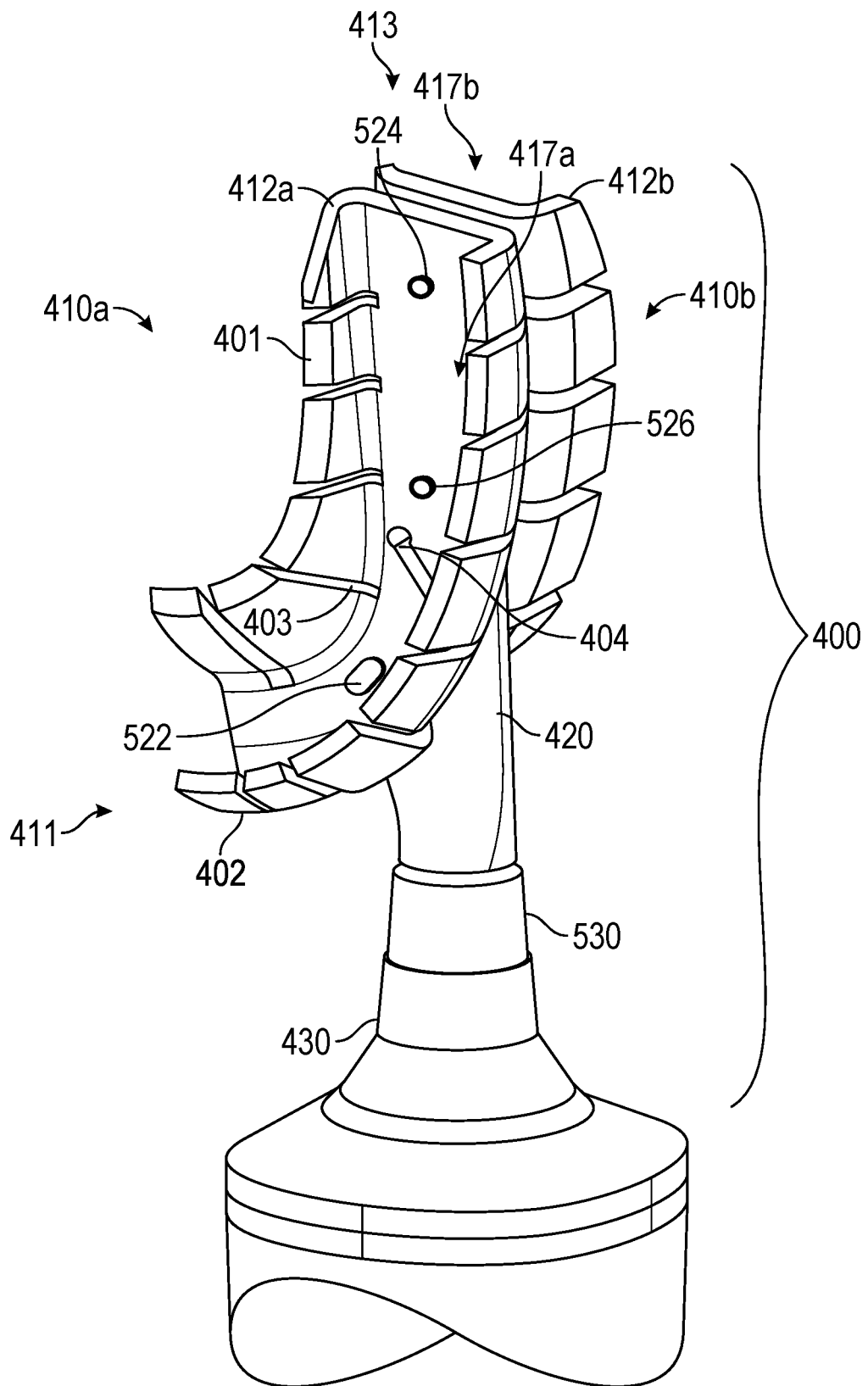
FIGS. 5A-5E illustrate various views of an example brush head assembly that may be used with the powered toothbrush of FIG. 1, with the filament removed, according to embodiments disclosed herein.
Figure 5B:
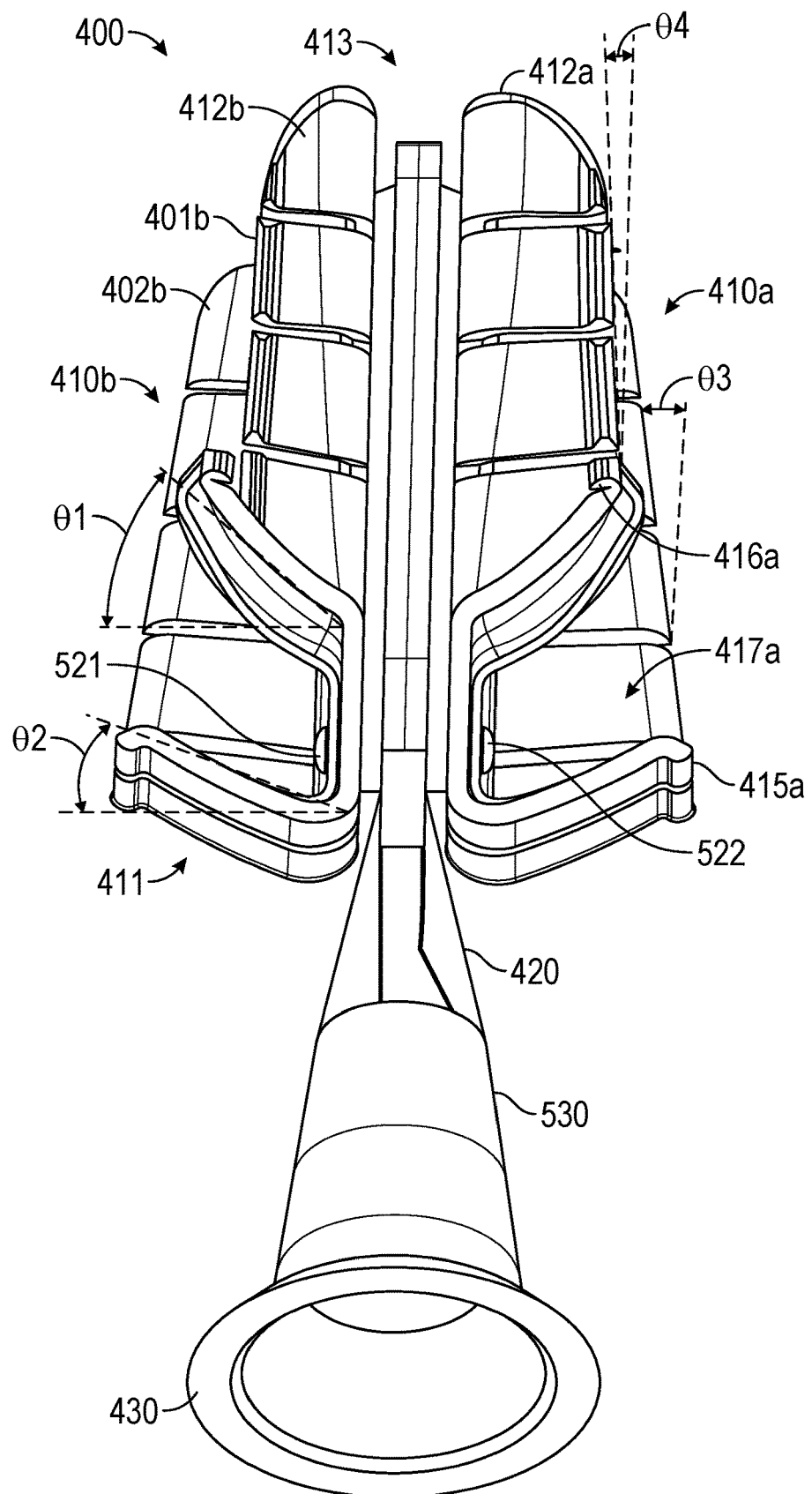
Figure 5C:
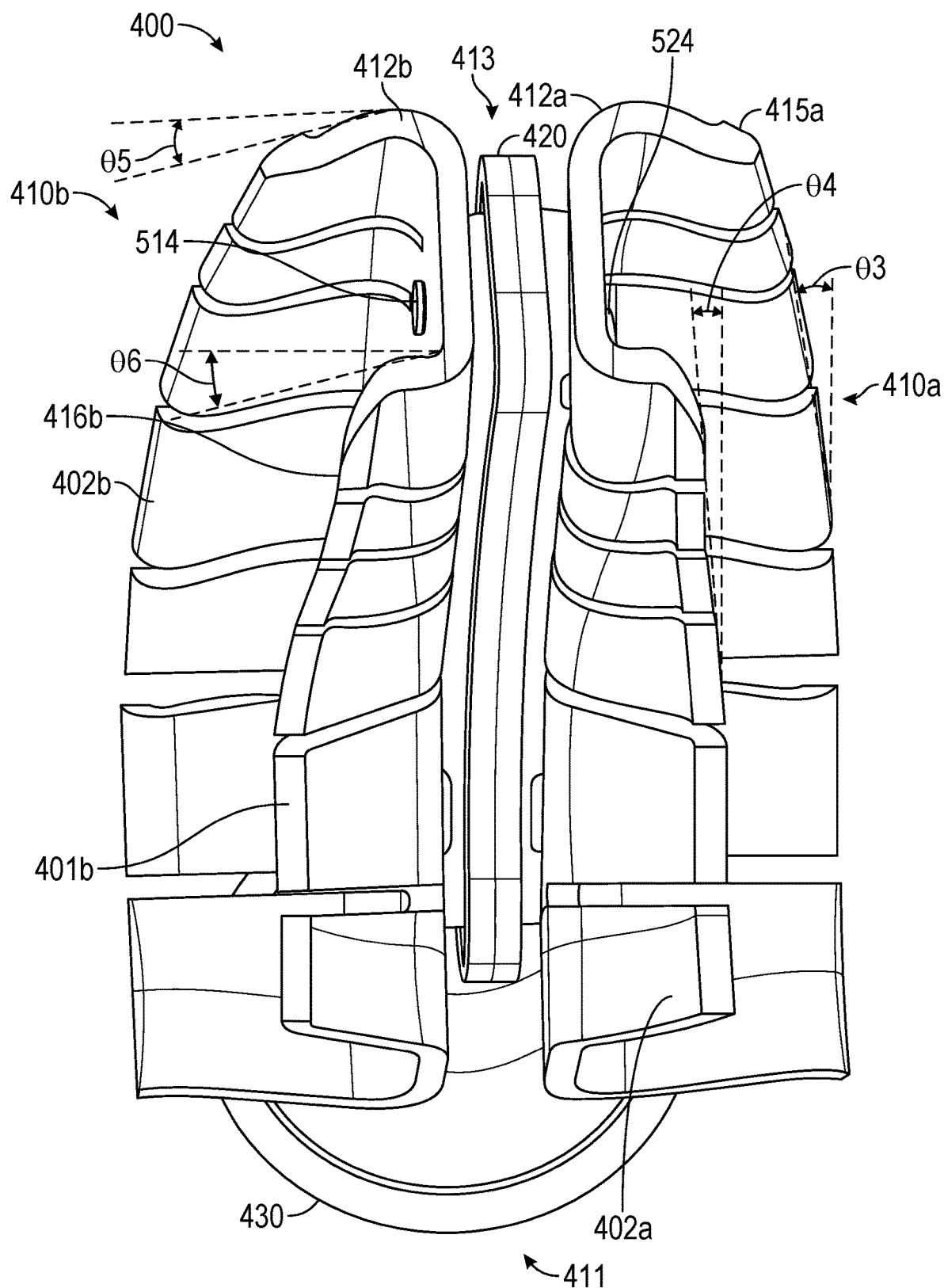
Figure 5D:
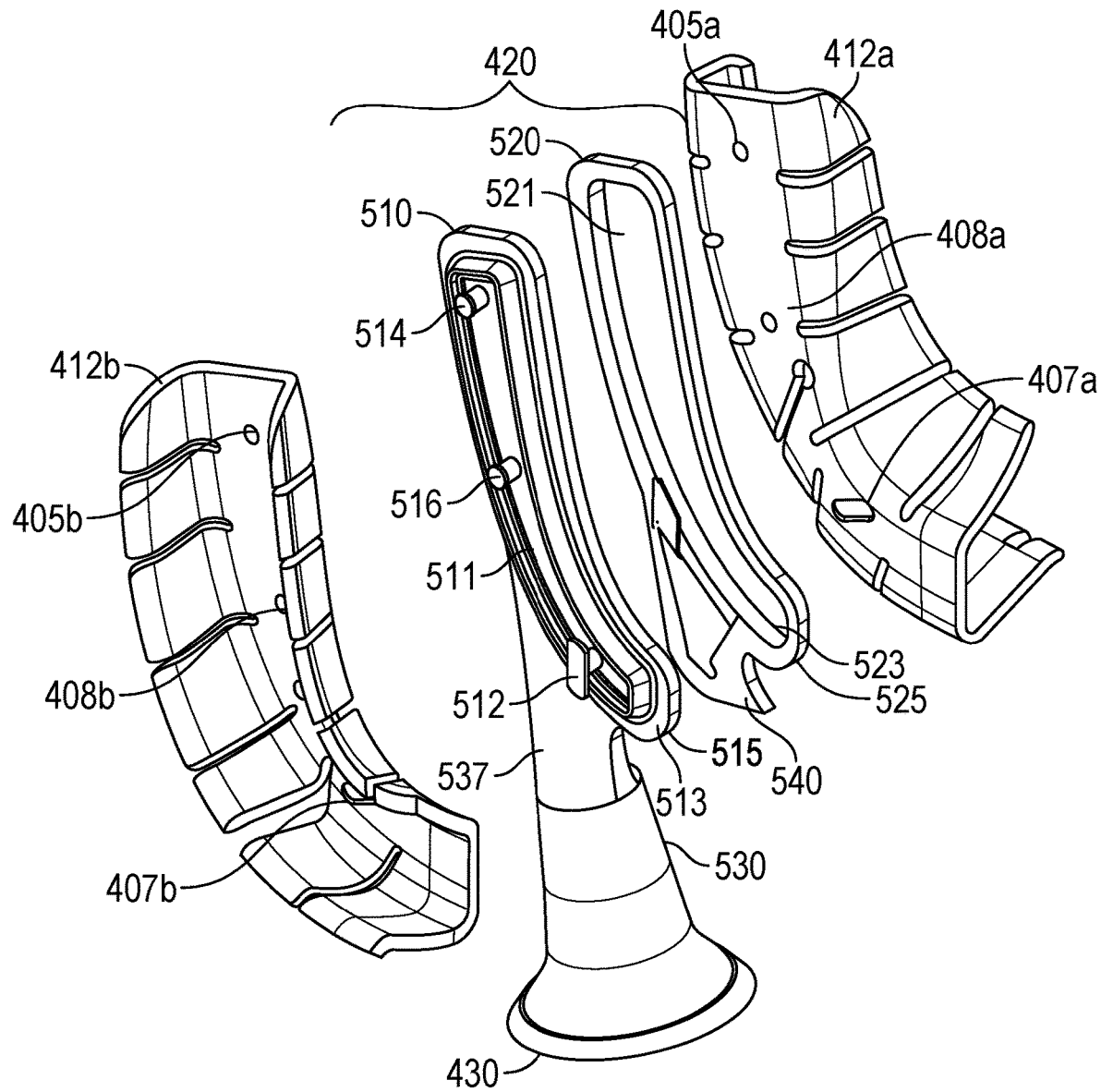
Figure 5E:
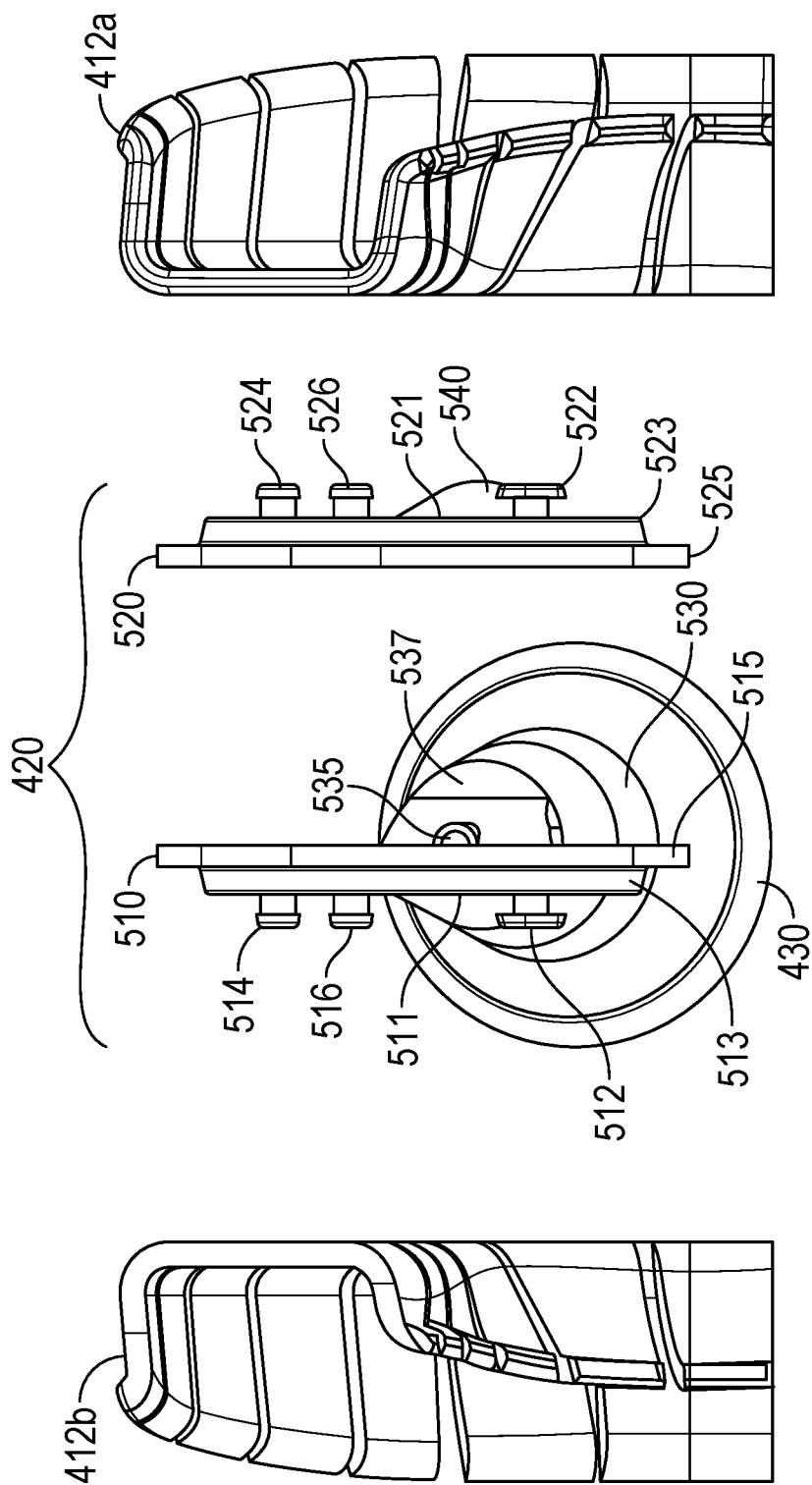
Figure 5F:
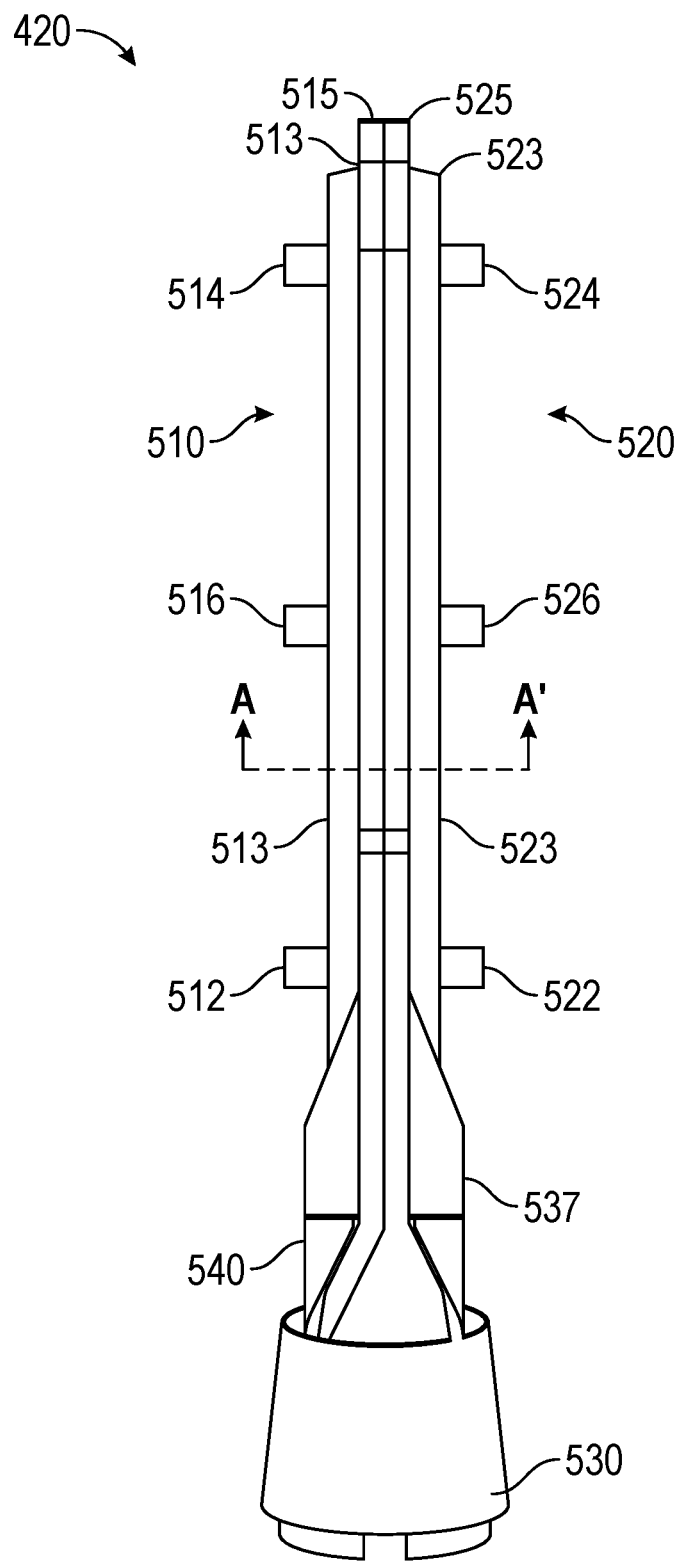
FIG. 5F illustrates a front view of an example driving mechanism that may be used with the head brush assembly of FIGS. 5A-5E according to embodiments disclosed herein.

FIGS. 5A-5F illustrate various views of an example brush head assembly 400 that may be used with the powered toothbrush 100, with the filament removed, according to embodiments disclosed herein. FIG. 5A illustrates a perspective view of the brush head assembly 400 having a neck 430 configured to couple to the handle portion 200 and a driving mechanism 420 attached to the neck 430, via sheath 530. The driving mechanism 420 being disposed between upper brush component 410*a* and lower brush component 410*b*. FIG. 5B illustrates a front view of the brush head assembly 400 and FIG. 5C illustrates a top down view of the brush head assembly 400. FIGS. 5D and 5E illustrate views of an exploded representation of the brush head assembly 400, with FIG. 5D illustrating a perspective view exploded view and FIG. 5E illustrating a top down view similar to FIG. 5C. As described above, the upper brush component 410*a* comprises dental tray 412*a* and filament 414*a* and the lower brush component 410*b* comprises dental tray 412*b* and filament 414*b*. For illustrative purposes, the filaments 414*a* and 414*b* are removed in FIGS. 5A-5E. FIG. 5F illustrates a front view of the driving mechanism 420 that may be used with the brush head assembly 400.

In various embodiments, upper brush component 410*a* and lower brush component 410*b* are symmetrical mirror images of the other. Accordingly, unless otherwise stated, reference the brush components will be collectively referred to as brush components 410. Similarly, reference to elements using numerical values without alphabetical values (e.g., "a" or "b") will be understood to refer to elements having common properties between the two brush components. That is, for example, reference to dental tray 412 refers to either dental tray 412*a* or dental tray 412*b*, while reference to dental trays 412 will be understood to refer to both dental trays.

Each dental tray 412*a* and 412*b* includes a first plurality of flexible fingers on a first side and a second plurality of flexible fingers on a second side opposite the first side. For example, as shown in FIG. 5A, dental tray 412*a* has a first plurality of flexible fingers 401 and a second plurality of flexible fingers 402. Flexible fingers 401 and 402 are coupled to dental tray 412*a* and hold filament 414*a* in place and provide pressure to filament 414*a* so that a cleaning surface of the filament 414*a* contacts the tooth surfaces of a user's tooth inserted into a tooth channel 417*a* (e.g., a channel formed between the filament 414*a* and the bottom section of the dental tray) of the dental tray 412*a*. Similarly, a plurality of flexible fingers are couple to dental tray 412*b* and hold filament 414*b* in place and provide pressure to filament 414*b* so that a cleaning surface of filament 414*b* contacts tooth surfaces of a user's tooth inserted into the tooth channel 417*b* of the dental tray 412*b*. The flexible fingers provide a predictable spring force. For example, when a dental tray is not yet fitted to teeth, the flexible fingers may be in an uncompressed state and, when the dental tray is fitted to teeth (see FIGS. 4A and 4B), may transition to a compressed state due to force of the teeth pushing the flexible fingers outward from the dental arch. The basic width variations of the dental tray and the flexible fingers could be adjusted to optimize the fit to as large a portion of the populous as possible. For example, the flexible fingers provide approximately 26 grams of pressure per 1 mm of flex required for tooth fit. Target deflection of the flex fingers in the molar portion is about 2 mm to 3 mm, or close to 50 to 75 gram force.

In some embodiments, each filament 414*a* and 414*b* may comprise a plurality of filament segments, including a segment along the teeth channel and a plurality of segments, each disposed on a flexible finger. In some embodiments, each filament 414*a* and 414*b* may comprise a first filament segment along the teeth channel, a second filament segment that is a single body extending continuously along the first plurality of flexible fingers, and a third filament segment that is a single body extending continuously along the second plurality of flexible fingers. In another embodiment, each filament 414*a* and 414*b* maybe a single continuous filament positioned within each dental tray 412*a* and 412*b*.

When the inserted into one's mouth for brushing, a first end 411 of the dental trays 412 may brush incisors and a second end 413 brushes molars, as shown in FIGS. 4A and 4B. For example, as shown in FIGS. 4A and 4B, ones of the first and second plurality of flexible fingers 401a of dental tray 412a, at the first end 411, may receive one or more incisors of the mandibular teeth for brushing and ones of the first and second plurality of flexible fingers 401b and 402b of dental tray 412b, at the first end 411, may receive one or more incisors of the maxillary teeth. Simultaneously, ones of the first and second plurality of flexible fingers 401a of dental tray 412a, at the second end 413, may receive one or more molars of the mandibular teeth for brushing and ones of the first and second plurality of flexible fingers 401b and 402b of dental tray 412b, at the second end 413, may receive one or more molars of the maxillary teeth.

Each dental tray 412a and 412b includes one or more flex gaps (also referred to as flex hinges) that allow the dental trays to bend longitudinally (relative to a longitudinal axis generally extending along the longest length of the arch) to conform with the arch of a user's teeth. The dental arches of people can vary significantly due to physical differences in the size and shape of individual mouths and due to tooth alignment problems (malocclusions). Therefore, according to some embodiments, dental trays 412a and 412b include at least one flex gap that enables the dental trays 412a and 412b to flex in order to adjust to the shape of a user's mouth. Flex gaps provide significant longitudinal flex that allows the dental trays 412a and 412b to conform to the dental arches of the user while simultaneously providing brushing pressure to the teeth, even where there is wide variation in tooth width and alignment. In the illustrative example of FIG. 5A, multiple flex hinges 404 and 403, formed as gaps, extend from an outer edge of the dental tray 412a into the tooth channel 417a at selected angles so to provide improved flexibility over prior toothbrushes. It will be appreciated that dental tray 412b also may include multiple flex gaps that are mirror images of flex gaps 404 and 403.

Each dental tray 412a and 412b also includes a plurality of interfacing openings each configured to receive an attachment member of the driving mechanism 420. FIGS. 5A-5C illustrate attachment members 524, 526, and 522 of the driving mechanism 420 (see, e.g., FIGS. 5D and 5E) extending through respective interfacing openings of the dental tray 412a. The attachment members 524, 526, and 522 couple the dental tray 412a to the driving mechanism 420. Similarly, dental tray 412b may be coupled to the driving mechanism via attachment members 512, 514, and 516 (see, e.g., FIGS. 5D and 5E). Examples of attachment members may include, but are not limited to, T-shaped post heads, pop bead post heads (as described above), slots and pins, C-shaped receivers on the dental trays and O-shaped extensions from the paddle on the bladder and the like. In some embodiments, the interfacing openings and attachment members may be configured to allow the dental trays to shift in directions parallel to the occlusal plane of the user's teeth and pivot (e.g., rotational movement in pitch, roll, and/or yaw directions) about a center point so to conform with the arch of a user's teeth, as described below in connection with FIGS. 7 and 8.

According to some embodiments, dental trays 412a and 412b are formed from a flexible material, such as, rubber or elastomer (e.g., TPE, TPU, PP, etc.), which enables the dental trays to bend longitudinally. In some embodiments, the flexible material may have a hardness between Shore 30A and Shore 85A. In some embodiments, dental trays 412a and 412b is formed from a heat setting elastomer, where the user heats the brush head in hot water to soften the elastomer of the dental trays. The user then places the heated brush head into their mouth to cause the softened dental trays to conform to the arch of the user's teeth. As the elastomer cools, the dental trays harden and retain the shape of the user's mouth.

Turning to FIGS. 5B and 5C, the dental trays 412a and 412b are shaped to provide improved comfort during brush experience. As set forth above, the dental trays 412a and 412b, including flexible fingers, are formed of flexible material selected to provide proper pressure to ensure surface cleaning while contacting the tooth surface, but flexibility such that the dental trays 412a and 412b do n of the first and second plurality of flexible fingers 401a of dental tray 412a may receive one or more incisors to impart painful pressure points or pinching during use. Furthermore, dental trays 412a and 412b are shaped to comfortably enter the users mouth without unwanted contact and/or pressure applied to the upper and lower regions of the mouth and/or tongue.

For example, as shown in FIGS. 5A and 5B, the first set of plurality of flexible fingers 401 are inclined, away from the tooth channel 417, at an angle θ1 from a direction perpendicular to the tooth channel 417 at a first end 411. At the second end 413, the flexible fingers 401 may be inclined, away from the tooth channel 417, at an angle θ6 from the direction perpendicular to the tooth channel 417. Angle θ1 and θ6 may be the same or different. In some embodiments, the angle of inclination of each of the first set of flexible fingers incrementally varies for each flexible finger. For example, the angle of inclination may incremental decrease from the first end 411 to the second end 413 or, alternatively, the angle of inclination may increase. The selection of the angles is driven by a desire to keep the U-channel side to run parallel to the surface of the teeth. The flex in the fingers helps adjust to variations in shape. Teeth grow and such odd angles and spacing along the jaw is not regular. Therefore, the angles and flex finger width cannot be reliably the same exact on every human.

Similarly, the second set of plurality of flexible fingers 402 are inclined, toward the tooth channel 417, at an angle θ2 from a direction perpendicular to the tooth channel 417 at a first end 411. At the second end 413, the flexible fingers 402 may be inclined, toward the tooth channel 417, at an angle θ5 from the direction perpendicular to the tooth channel 417. Angle θ2 and θ5 may be the same or different. In some embodiments, the angle of inclination of each of the second set of flexible fingers incrementally varies for each flexible finger. For example, the angle of inclination may incremental decrease from the first end 411 to the second end 413 or, alternatively, the angle of inclination may increase.

In some embodiments, one or more flexible fingers of the first and second plurality of flexible fingers 401 and 402 may comprise a curvature configured to contribute to structural integrity and flexibility. For example, each flexible finger may be curved so to apply adequate pressure to the teeth during brushing, while also permitting flexibility in each finger for improved comfort.

In some embodiments, the first plurality of flexible fingers 401 may also comprise a lip 416 and the second plurality of flexible fingers 402 may comprise a lip 415, both extending away from tooth channel 417. The lips 416 and 415 may provide curved surfaces that, in the event contacts a user's mouth, does not scratch, pinch, or otherwise exert harmful force to the user.

In some embodiments, height of each of the first plurality of flexible fingers 401 may be decreased from a first height at the first end 411 to a second, shorter height at the second end 413. The height may be decreased gradually at, for example, a slope having an angle θ4 or the height may be stepped such that each flexible finger has a constant height that changes from each finger to the next. Similarly, height of each of the second plurality of flexible fingers 402 may be decreased from a first height at the first end 411 to a second, shorter height at the second end 413. The height may be decreased gradually at, for example, an slope having an angle θ3 or the height may be stepped such that each flexible finger has a constant height that changes from each finger to the next. Further still, one or more of the first plurality of flexible fingers 401 may have the same height and one or more of the second plurality of flexible fingers 402 may have the same height (e.g., as shown at the first end 411 in FIG. 5B). Decrease of the height of the flexible fingers may provide for improved comfort and ease of insertion in to the mouth of the user.

Furthermore, in some embodiments, the height of the first plurality of flexible fingers 401 may be shorter than the height of the second plurality of flexible fingers 402. For example, as shown in FIGS. 5A and 5B, the height of the tallest finger of the second plurality of flexible fingers 402 may be shorter than the shortest finger of the first plurality of flexible fingers. However, embodiments herein may not be so limited. For example, one or more of the second plurality of flexible fingers 402 may be shorter than one or more of the first plurality of flexible fingers 401.

Turning to FIGS. 5D and 5E, the brush head assembly 400 comprises the driving mechanism 420 positioned between the dental trays 412a and 412b. In the example shown in FIGS. 5D and 5E, the driving mechanism 420 comprises two components, a base 510 and a cover 520. The base 510 includes a J-shaped assembly having a first channel member 537 extending therefrom that is attached to the neck 430 via a sheath 530, which is bonded to the J-shaped assembly. Sheath 530 may be configured to prevent the fluid pathway 535 of pneumatic system (e.g., pathway 535 from handle portion 200 to driving device 420) from becoming obstructed, crushed, or twisted. The cover 520 also includes a J-shaped assembly that is substantially identical to the J-shaped assembly of the base 510 and a second channel member 540. The first and second channel members 537 and 540 may each comprise a half-piped shaped portion of a channel, where the portions correspond to form a full tubular channel that extends from the sheath 530 to into the J-shaped assembly. For example, the second channel member 540 may be bonded to the first channel member 537 to form an enclosure constituting a full sheath housing a full channel 535. The channel extends from the inlet 532 to J-shaped assembly of the driving mechanism 420 and may be considered part of the fluid conduit or pathway.

Each J-shaped assembly comprises a rigid outer frame, a flexible diaphragm, and a rigid paddle. The rigidity of the outer frame is relative to the flexibility of the diaphragm. The rigidity can be sufficient to retain the diaphragm and for the assembly to operate properly as a dental cleaning device.

In the depicted embodiment, base 510 includes outer frame 515, diaphragm 513, and paddle 511 and cover 520 includes outer frame 525, diaphragm 523, and paddle 521. Collectively, outer frames 515 and 525 can be collectively be referred to as the frame or outer frame. Disposed on the paddle are a plurality of attachment members. For example, paddle 511 comprises attachment members 514, 516, and 512 and paddle 521 comprises attachment members 524, 526, and 522. As described above, attachment members may be provided as pop bead post heads, T-shaped post heads, and the like. The attachment members of each J-shaped assembly may be received by corresponding interfacing openings of a corresponding dental tray to couple the dental to the driving mechanism. For example, interface openings 405b, 408b, and 407b may receive attachment members 514, 516, and 512, respectively, thereby coupling the dental tray 412b to base 510. The combination of the interface openings and their corresponding attachment members can be referred to as gimbals which allow the dental trays to move relative to the rest of the assembly. Interface openings can have different shapes. For example a slot like shape as is depicted for interface openings 407a and b allow the associated dental tray 412 a and b to move relative to its associated base 510/520. More specifically, the dental tray can ride or move along the attachment member in the slot. In that way the dental tray is coupled to the associated base and can also flex or bend to be able to accommodate variations among users' dental arches. Round interface openings allow the dental trays to rotate about the associated attachment member. Dental tray 412a may be similarly coupled to cover 520. The combination of the attachment members and their corresponding interface openings provides first and second coupling mechanisms between each of the dental trays and the diaphragms or bladder. The coupling mechanisms allow for limited flexing of the dental trays relative to the frame.

As described above in connection with FIG. 1, filaments 414 are attached to the dental trays 412. In the illustrative examples of FIGS. 5A-5E, the filaments 414 for cleaning the tooth surfaces, as described above, are attached to the flexible fingers 401 and 402, and the flexible fingers apply pressure on the filaments 414 that cause a cleaning surface of the brush pad to contact the surface of a user's teeth. For example, the filament 414a may be attached to the first and second plurality of fingers 401a and 402. Optionally, the filament 414a may also be positioned within the tooth channel 417a. In some embodiments, the filament 414a may comprise a plurality of segments. For example, a first segment of the filament 414a may be attached to the first plurality of flexible fingers 401a, a second segment attached to the second plurality of flexible fingers 402, and (optionally) a third segment attached to the tooth channel 417a. In another example, the filament 414a may comprise a plurality of filaments, each filament attached to a flexible finger, for example, each individual flexible finger 401a and 402 comprises a distinct filament attached thereto. While embodiments are described with reference to component 410a, component 410b (e.g., dental tray 412b and filament 414b) will be understood to be similarly constructed.

Accordingly, the filaments 414 can conform to the tooth surfaces even where malocclusions are present. Because the pressure from the flexible fingers 401 and 402 helps to keep the cleaning surface of the filaments 414 in contact with the surface of the teeth, the length of the cleaning members used on the filaments 414 can be much shorter than a length that may have been required if the cleaning members alone were used to conform to the dental arch of the user's teeth.

As set forth above, according to an embodiment where provided the cleaning members are bristles, the bristles may be set from the flexible fingers so to be perpendicular to acute to the surface of the teeth with the distal end of the bristles being directed toward the gingival sulcus in order to remove bacterial plaque adjacent to and directly beneath the gingival margin. According to another embodiment, the bristles may be angled relative to the surface of the teeth, for example, as described above in connection with FIG. 1. In some embodiments, where the plurality of filament segments are provided for each dental arch, the bristles of each segment may extend at the same or different angles, for example, a first segment attached to the flexible fingers 401 may be angled at 45 degrees, a second segment attached to the flexible fingers 402 may be angled at 45 degrees, and a third segment in the dental tray may be perpendicular to the surface of the teeth. Any configuration of angles may be used to achieve desired cleaning properties. In another example, where each flexible finger comprises a distinct filament, bristles of each filament may be angled at the same or different angles, for example, each finger 401 may have a separate portion of filament 414a that is independent for other portions of filament 414a and the bristles of a first portion may be extend perpendicularly while a second portion may extend at 45 degrees, or any desired angle as set forth here.

According to some embodiments, the filaments 414 may be attached to the flexible fingers 401 and 402 using an adhesive. According other embodiments, the filaments 414 include a rigid backing that may be snapped or locked into place on the flexible fingers 401 and 402. According to some embodiments, the filaments 414 may be removable and replaceable to allow a user to replace the filaments 414 without having to replace the entire brush head. Various techniques may be used to snap or lock the filaments 414 into place on the flexible fingers 401 and 402. According to some embodiments, heat staking or ultrasonic staking may be used to attach the filaments 414 to the dental trays. For example, the filaments 414 may have one or more posts extending from a rigid backing that are fused to a dental arch. According to other embodiments, stretch snaps may be used to attach the filaments 414 to the dental trays. For example, the filaments 414 may include one or more rubber tips that are stretched, inserted through an opening in the dental tray and released, and the rubber tip unstretches and expands wide enough that the tip cannot escape from the opening and holds the brush pad in place. According to another embodiment, a "pop bead" or pop beads may be used to hold the filaments 414 in place. The pop beads comprise a molded round feature that is molded onto the rigid backer of the brush pad and is snapped into a corresponding opening on the dental arch. The pop beads enable the rigid backing of the filaments 414 to rotate around the axis of the pop bead, which can help to align the brush heads with the teeth during use. According to yet another embodiment, ultrasonic welds may be used to affix the brush heads to the dental arch. For example, the brush pad may be formed from a plastic material that is compatible with the plastic of the dental trays, and the filaments 414 may be ultrasonically welded to the dental trays.

As described above, in some embodiments, the filaments 414 may be fabricated using conventional toothbrush design, for example, nylon bristles attached using a staple set, molding, or fusing technique. In some embodiments, the filaments 414 may be fabricated using a textile fabrication process. According to some embodiments, the bristles are manufactured as part of the bristle pad fabric, while in yet other embodiments, the bristles may be attached to the surface of the fabric or inserted through the fabric. According to various embodiments, the fabric comprises various types of materials, such as a film (e.g., Mylar), a polymer or elastomer. Flexible fingers 401 and 402 enable the bristles to be flat while providing efficacious brushing pressure to the tooth surfaces.

According to some embodiments, a combination of conventional bristling and bristled fabric is used. A combination of conventional bristling with the bristled fabric provides a very high bristle density that may provide improved removal of dental plaque. According to some embodiments, groupings of bristle strands are coupled to the bristled fabric of the filaments 414, and in some embodiments, the lengths of the bristles included in the bristle strands may vary to shape the bristle strands.

The flexible fingers 401 and 402 may be engineered to provide a wide range of brushing pressures. For example, according to a preferred embodiment, the pressure fingers are engineered to provide approximately 50-75 grams of pressure to the tooth surfaces.

Figure 6:
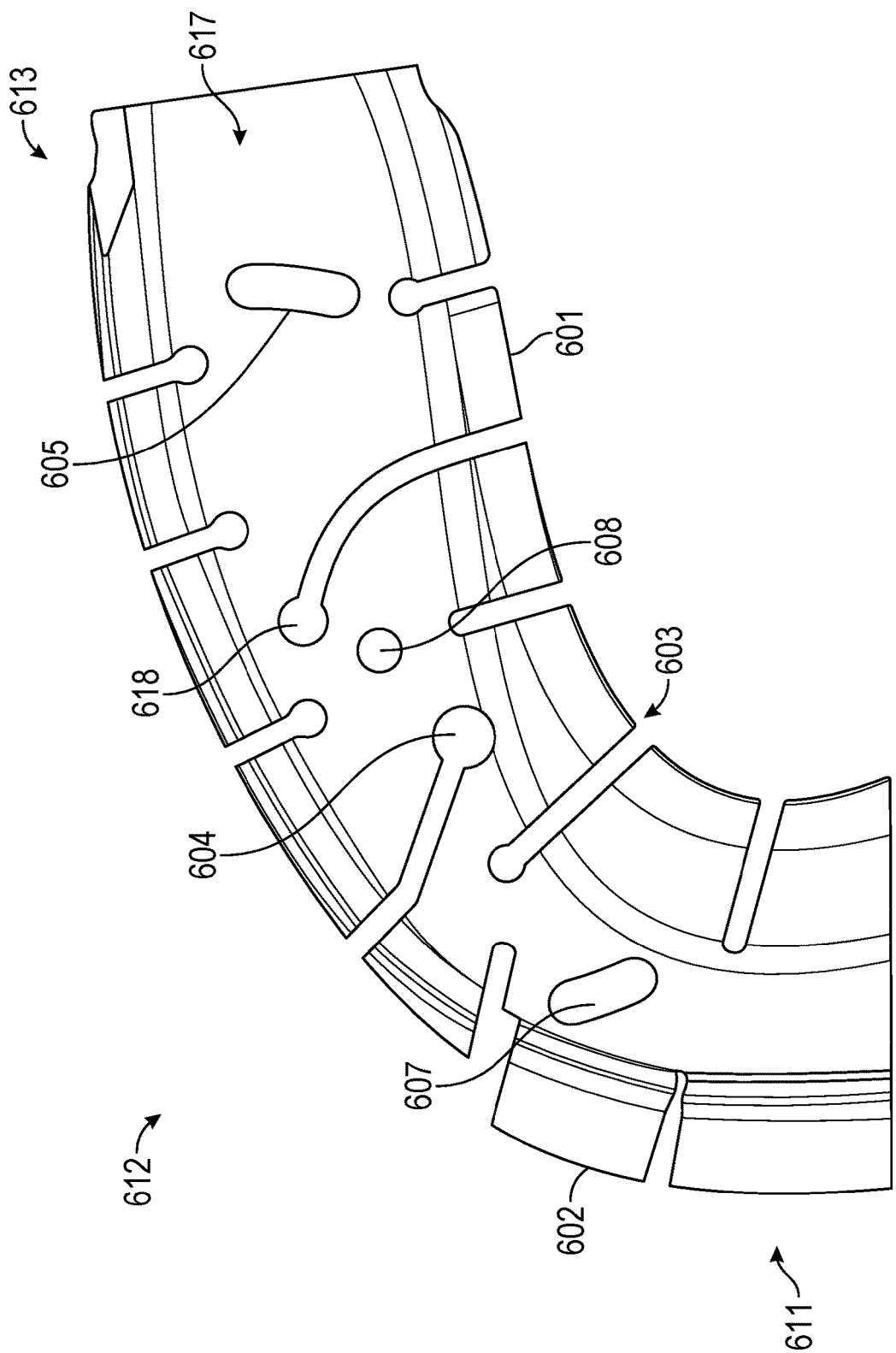
FIG. 6 illustrates an example dental tray that may be used with the brush head assembly of FIG. 5A according to embodiments disclosed herein.

FIG. 6 illustrates a top down view of an example dental tray that may be used with the brush head assembly of FIG. 4 according to embodiments disclosed herein. FIG. 6 illustrates dental tray 612, which may be used as the dental tray of the brush head assembly 400. For example, dental tray 412a and/or dental tray 412b may be implemented as dental tray 612. Dental tray 612 is substantially similar to dental trays 412a and 412b, except for as provided herein. Accordingly, similar reference numbers are used in FIG. 6 to refer to similar elements from dental trays 412a and 412b above. For example, similar to dental trays 412a and 412b, dental tray 612 is illustratively depicted as a J-shaped arch that enables right or left sagittal plane brushing of the mandibular dental arch and maxillary dental arch simultaneously. Dental tray 612 includes a first plurality of flexible fingers 601 and second plurality of flexible fingers 602, similar to flexible fingers 401 and 402 above. The flexible fingers encompass a tooth channel 617. Accordingly, aspects and features provided above with respect to either dental tray 412a or dental tray 412b apply equally to dental tray 612.

As described above, the flexible fingers 601 are inclined away from tooth channel 617 and flexible fingers 602 are include toward the tooth channel. Due to the varying angles of inclination as set forth above, the width of the tooth channel 617 may be varied along the length of the dental tray 612 to more comfortably accommodate differently sized teeth. For example, the width of the channel 617 at the second end 613 is wider (e.g., to more comfortably accept molars) than the width at the first end 611 (e.g., to accept incisors).

In some embodiments, one or more of the flexible fingers may be larger than other flexible fingers. For example, FIG. 6 illustrates two flexible fingers of the second plurality of flexible fingers 602, at the first end 611, may extend further from the tooth channel 417 and then curved back to the tooth channel 417.

Dental tray 612 also includes a plurality of flex hinges that are similar to flex hinges 403 and 404. For example, gaps are formed between adjacent flexible fingers pf the first and second set of flexible fingers 601 and 602, thereby forming independently flexing fingers. At one or more of these gaps a flex hinge may be formed by extending a respective gap into the tooth channel 617, as shown in FIG. 6. By extending the gap further into the tooth channel 617, each flex hinge provides flexibility to the dental tray 612 that enables the dental tray 612 to bend in and flex longitudinally (e.g., in a direction perpendicular to the top down viewing direction shown in FIG. 6) along an occlusal plane of a user's mouth and thereby conform to differently shaped mouths and/or various malocclusions.

In the illustrative example of FIG. 6, the dental tray 612 includes a first flex hinge 603 and second flex hinge 618 formed between flexible fingers of the first set of flexible fingers 601. In the illustrative example, flex hinge 603 is a linear flex hinge extending into the tooth channel 617 and ending at a first circular point of bending. Flex hinge 618 comprises a gap that extends into the tooth channel 617, curves toward the first end 611, and ends at a second circular point of bending. Dental the dental tray 612 also includes a third flex hinge 604 formed between flexible fingers of the second set of flexible fingers 602. In the example of FIG. 6, the third flex hinge 604 extends into the tooth channel 617, angled toward the second end 613, and ends at a third circular point of bending. In the illustrative embodiment, first flex hinge 603 may allow the dental tray 612 to bend about the first point of bending. That is, the second end 613 may flex toward the inner portion of the mount relative to first end 611, or the first end 611 may flex away from the inner portion relative to the second end 613. Similarly, the second flex hinge 618 may allow bending of the dental tray 612 about the second point of bending and the third flex hinge 604 allows bending of the dental tray about the third point of bending. In the illustrative example shown in FIG. 6, The circular holes provide strain relief. The widths of the slots that radiate from those holes are one method of providing some range of flex restriction in one direction. The slots 605 and 607 control the range of allowed motion in the other direction. The range of U-channel flex can be varied by changing these relationships.

Due, at least in part, to the flexibility of the dental trays and the flex in the flexible fingers that hold the filaments in place, the filaments can be much shorter in length and yield a smaller brush head than is possible if the bristles provided the entire bristle tip fit to the mouth. Furthermore, due to the plurality of flex hinges having selected shapes as set forth above, the dental trays may conform to a greater number of differently shaped mouths than otherwise achieved. Thus, the number of differently sized brush head assemblies required to be manufactured to cover all variations of mouth shapes in the general population can be reduced to a few different sizes that each flex and bend to conform with overlapping ranges of mouth shapes and sizes.

While specific examples and numbers of flex hinges are shown in FIG. 6, embodiments herein are not limited to only the depicted number and shapes. Any number of flex hinges (e.g., 1, 2, 3, 4, 5, etc.) may be included to achieve desired flexibility while also maintaining structural integrity of the toothbrush. Similar, the shape of each flex hinge may be modified as desired to target different flex properties and degrees of flex. Thus, any desired shape may be used.

The dental tray of FIG. 6 also comprises a plurality of interfacing openings (e.g., a first interfacing opening 605, a second interfacing opening 608, and a third interfacing opening 607) that are similar to the interfacing openings described in connection with FIGS. 5A-5E. As described above, the interfacing openings are configured to receive attachment members of the driving mechanism 420 (see, e.g., FIGS. 5D-5E) for coupling the dental tray 612 to the driving mechanism 420.

Figure 7:
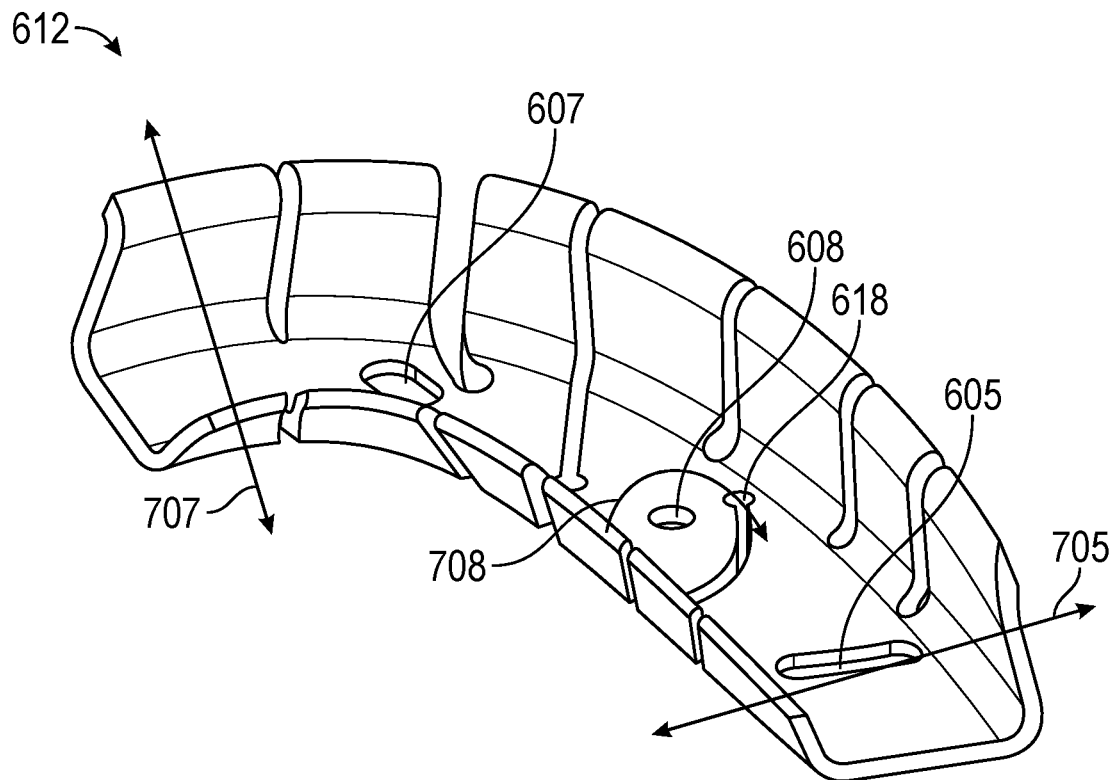
FIGS. 7 and 8 illustrates schematic views of fit adjustments of the dental tray of FIG. 8 according to embodiments disclosed herein.

In some embodiments, the interfacing openings may be configured to allow shifting longitudinally along the occlusal plane and pivoting of the dental tray relative to the coupled driving mechanism 420, thereby further improving the ability to conform to differently shaped mouths and/or various malocclusions. For example, as shown in FIG. 6, first interfacing opening 605 may a slotted opening (also referred to as a t-slot opening) extending generally in the longitudinal direction across the tooth channel 617. For example, FIG. 7 illustrates longitudinal arrow 705 illustrating the direction of movement afforded by slotted opening 605. Slotted opening 605 may be curved in the longitudinal direction to permit a corresponding attachment member of the driving mechanism to slide within the slot, for example, when the dental tray flexes.

Similarly, third interfacing opening 607 may be a slotted opening (also referred to as a T-slot opening) extending generally in the longitudinal direction across the tooth channel 617. For example, FIG. 7 illustrates longitudinal arrow 707 illustrating the direction of movement afforded by slotted opening 607. As with slotted opening 605, opening 607 may be curved to permit shifting of a corresponding attachment member of the driving mechanism. Opening 605 and 607 may have a similar curvature, one having a concave curvature and the other a convex curvature. In another example, opening 605 and 607 may be curved in the same direction.

In various embodiments, the use of a t-head pop bead snapped into a slotted opening, such as one or more of opening 607 and/or 605, may provide additional support to retain a corresponding end of the dental tray from flexing up and down (e.g., toward/away from the roof of the mouth during brushing). For example, a t-head pop bead snapped into opening 607 may assist to retain the end 611 of dental tray 612 from unintended bending of the dental tray into or out of the roof of the mouth. Similarly, opening 605 may receive a t-head pop bead that retains end 613. The use of t-shaped pop beads for retaining a respective end is not limited to the embodiment of FIG. 6, and may be used in any dental tray disclosed here having a slotted interfacing opening as described herein. It may be important to retain ends of the dental tray to prevent vertical motion loss and/or loss of brushing force in the respective area. An alternative to reduce such bending may be the use of a retainer clip or nose hook, which may be similar to the bit retainer described below in connection with FIGS. 21a and B. The retainer clip may be used in conjunction with the t-head pop bead to provide increased flex resistance.

The dimensions of the slotted opening (and thusly the t-head pop bead received therein) may be designed to achieve a desired flex in the dental tray 612. For example, a larger slot in either length or width may permit more flex in the corresponding area. In some embodiments the slot 607 may be larger than slot 605 to permit more flex near the front of the mouth.

Figure 8:
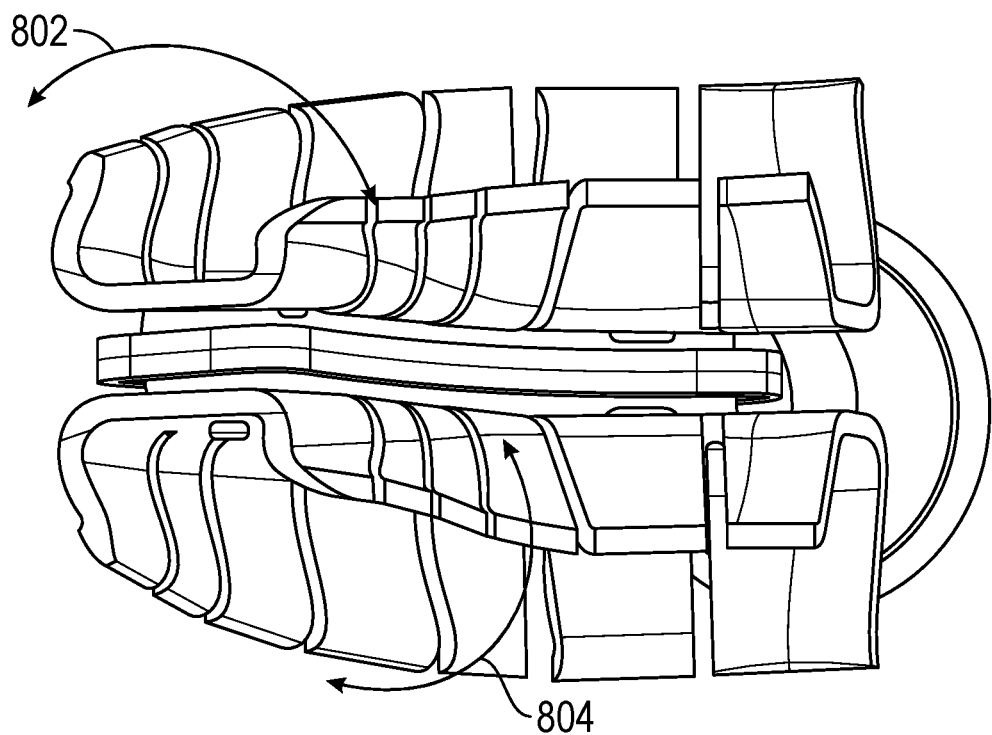

Dental tray 612 also includes second interfacing opening 608 as post opening that receives a pop bead post head attachment member of the driving mechanism. The pop bead post head may be permitted to pivot in pitch, yaw, and roll directions within the post opening 608, where the pop bead post head is a center of rotation. For example, FIG. 7 illustrates rotational arrow 708 illustrating the yaw rotational movement afforded by post opening 608 and FIG. 8 illustrate roll rotational movement afforded by post opening 608. Because the upper arch and the lower arch can move in that manner, it allows the device to adjust to differences between a user's upper and lower jaw.

While dental tray 612 is shown with specific types of interfacing openings, embodiments herein are not limited to only those types or only the illustrated configuration. For example, all interfacing openings may be slotted or post opening. In another example, interfacing opening 608 may be slotted while one or more of interfacing openings 605 and 607 are not slotted (e.g., post opening). Furthermore, the openings may be disposed anywhere within the tooth channel 617, not only the locations illustrated in FIG. 6.

Due, at least in part, to the interfacing openings permitting shift and pivot of the dental arch, the filaments may be shorter in length and yield a smaller brush head than possible if the bristles provided the entire bristle tip fit to the mouth. Furthermore, the shifting and pivoting of the dental trays, as set forth above, may facilitate conforming a greater number of differently shaped mouths than otherwise achieved. Thus, the number of differently sized brush head assemblies required to be manufactured to cover all variations of mouth shapes in the general population can be reduced to a few different sizes that each move and shift to conform with overlapping ranges of mouth shapes and sizes.

In example of dental tray shown in FIG. 6, even greater comfort and conformance with greater ranges of mouth shapes and malocclusions may be achieved through the combination of flex hinges and interfacing openings. For example, individually, flex hinges and interfacing openings on the dental tray 612 may provide for conforming with a number of differently shaped mouths and/or various malocclusions. By using both flex hinges and interfacing openings in combination may provide for conforming with an event greater number of mouth shapes and/or malocclusions. Thus, a single size brush head assembly 400 may be made to conform with a wide range of mouth shapes and malocclusions, thereby reducing the number of separately shaped brush head assemblies required to be constructed.

Figure 9:
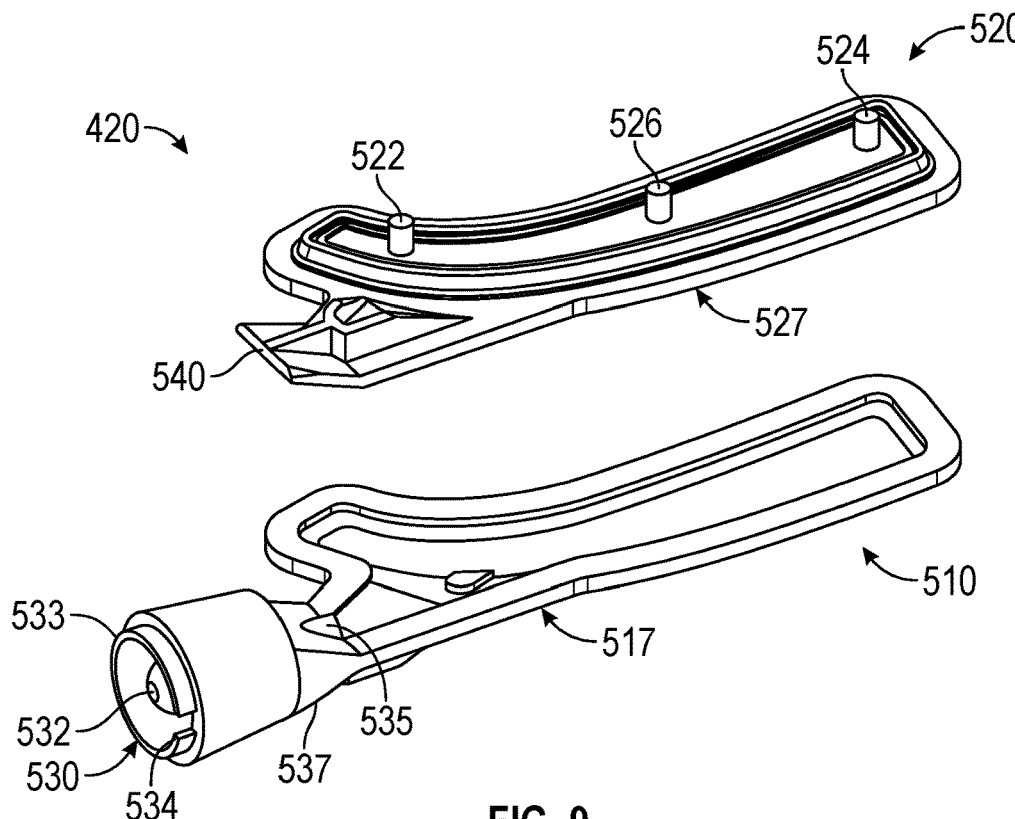
FIGS. 9-12 illustrate exploded views of the driving mechanism of FIG. 13.
Figure 10:
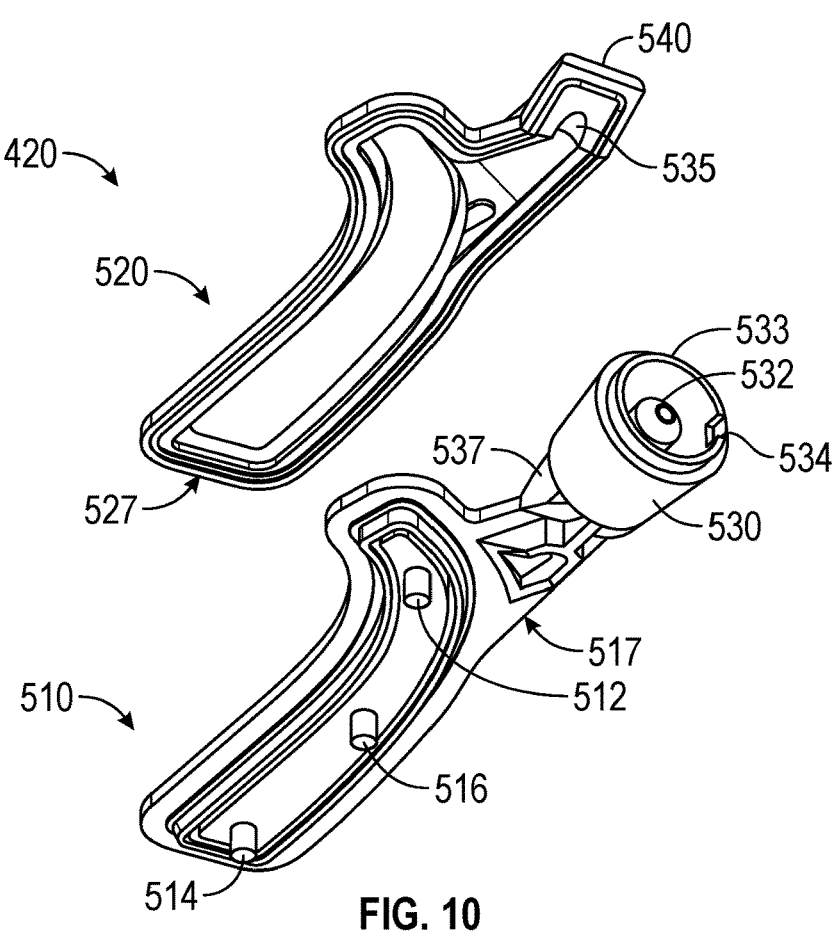
Figure 11:
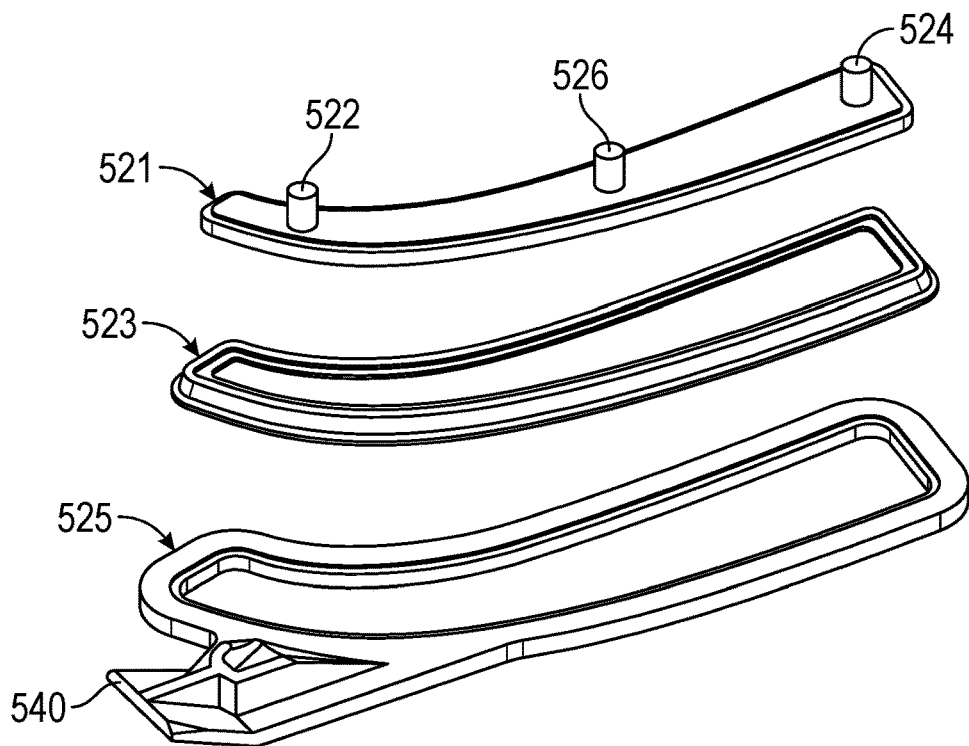
Figure 12:
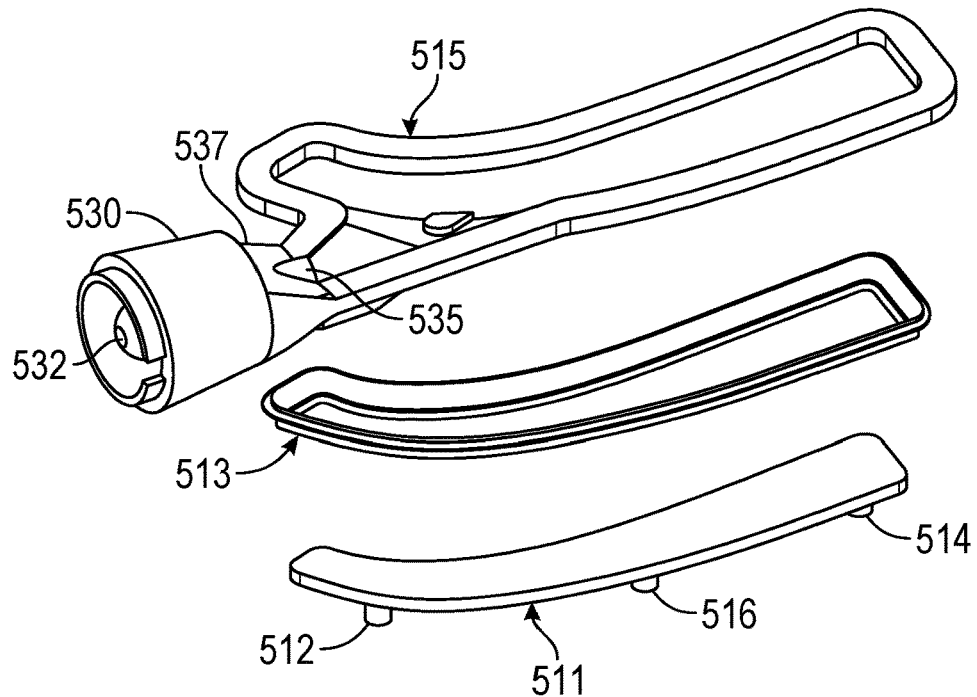

FIGS. 9-12 illustrate exploded views of the driving mechanism 420. FIG. 9 illustrates a perspective view of an exploded diagram of the driving mechanism 420 and FIG. 10 illustrates the exploded diagram from a perspective view that is opposite from that of FIG. 9 so to illustrate the features not shown in FIG. 9. FIG. 11 illustrates an exploded perspective view of the cover 520 and FIG. 12 illustrates an exploded perspective view of the base 510.

As described above, the driving mechanism 420 is comprises two components, a base 510 and a cover 520 that is attached to the cover 510. The cover 520 may be bonded via adhesive or any bonding technique known in the art to bring to bodies together. The base 510 includes J-shaped assembly 517 attached to a sheath 530. Sheath 530 houses a fluid pathway inlet 532 configured to removeably couple to the pneumatic system of the handle portion 200, as described above in connection with FIGS. 1 and 2. The sheath 530 may be configured to prevent the fluid pathway from becoming obstructed, crushed, or twisted. The cover 520 also includes a J-shaped assembly 527 that is substantially identical to the J-shaped assembly of the base 510 and a sheath portion 540. The sheath portion 540 may be bonded to an open portion along the neck of sheath 530 between the J-shaped assembly and neck 430 to form an enclosure constituting a full sheath to protect the fluid pathway 535.

As shown in FIGS. 11 and 12, base 510 includes outer frame 515, diaphragm 513, and paddle 511 and cover 520 includes outer frame 525, diaphragm 523, and paddle 521. Paddle 511 comprises attachment members 514, 516, and 512 and paddle 521 comprises attachment members 524, 526, and 522. As described above, attachment members may be provided as pop bead post heads, T-shaped post heads, and the like. The attachment members of each J-shaped assembly may be received by corresponding interfacing openings of a corresponding dental tray to couple the dental tray to the driving mechanism. For example, interfacing openings 405b, 408b, and 407b may receive attachment members 514, 516, and 512, respectively, thereby coupling the dental tray 412b to base 510. Dental tray 412a may be similarly coupled to cover 520.

In some embodiments, each diaphragm may be coupled to a respective outer frame and a respective paddle attached to the diaphragm. Then the outer frames may be attached (e.g., via adhesive or bonding techniques known in the art), thereby forming a space within the driving mechanism enclosed between the diaphragms. Alternatively, the two outer frames 515 and 525 may be formed as a single piece and referred to as a frame retaining the two diaphragms or a bladder.

For example, FIGS. 13 and 14 illustrate cross sectional views, taken along A-A' of FIG. 5F, of example configurations of the driving mechanism. Alternatively, the two outer frames 515 and 525 may be formed as a single piece and referred to as a frame.

In the illustrative example of FIG. 13, space 550 is formed between diaphragm 523 and diaphragm 513. Collectively, diaphragms 513 and 523 and the space 550 therebetween may be referred to as a bladder according to embodiments herein. In the example of FIG. 13, the paddles 511 and 521 are disposed within space 550, with the attachment members 526, 524, 516, and 514 protruding through the respective diaphragm 513 and 523. FIG. 14 depicts another configuration that is similar to that of FIG. 13, except that the paddles 511 and 521 are disposed on a side of the diaphragms opposite the space 550. As shown in FIGS. 13 and 14, the diaphragms may comprise one or more opposing bends (e.g., generally "S" shaped) and be shaped in a manner similar to a speaker cone, thereby providing flexibility to expand and contract similar to a speaker cone. Other variations in construction include having 521 and 511 injection molded and bonded directly to 523 and 513 in the molding process. One common pair of materials that allow such strong adhesion is polycarbonate and silicone. Other compatible flexible and rigid or semi-rigid materials can also be used.

According to various embodiments herein, oscillation of the pneumatic system—switching between pressure and suction—rapidly pulsates diaphragms 523 and 513, which alternatively pulsates the space 550, thereby driving dental trays 412a and 412b, attached via attachment members, up and down relative to the surface of the teeth to create the brushing motion of powered toothbrush 100. That is, the paddles 511 and 521 are alternatively moved apart from one another and back toward one another as fluid (e.g., air) is alternatively pressed into and sucked out of a space 550, causing the space to alternatively inflate and deflate. Thus, the dental trays 412a and 412b to move apart in an upward and downward motion that causes filaments 414a and 414b to brush along the tooth surface.

Embodiments herein provide for a composite design for the driving mechanism 420. For example, diaphragms 523 and 513 may be formed of a sterile flexible material similar to materials used for manufacturing a speaker diaphragm soft elastomeric membrane (such as, but not limited to, silicone rubber, thermoplastic elastomers (TPE) also referred to as thermoplastic rubber, thermoplastic polyurethane (TPU), latex, vinyl, nitrile, or other flexible materials able to withstand repeated inflation and deflation at high frequencies) and the paddles and outer frames may be formed of a rigid material, for example, a hard plastic. The hard plastic material provides a nice stiff handle attached to the power handle. This enables the user to have full control of the positioning of the whole toothbrush inside the oral cavity and outside for rinse and clean. The hard plastic may be molded or formed according to technique known in the art. The material of the outer frame may have a hoop strength that, with a shear strength of the material forming the diaphragm, results in minimal lost energy while the pneumatic system pulsates the driving mechanism. By using soft elastomeric membrane material in combination with the rigid material as set forth above, inefficiencies of bladders formed for purely soft elastomer materials may be avoided. For example, bladders of purely soft elastomer materials may permit movement in directions other than the desired direction of normal to the paddles. When pressure within the bladder is increased, expansion of soft elastomer materials grows in all directions, resulting in a loss of efficiency. Accordingly, embodiments herein utilize a composite bladder design of hard, rigid materials and soft elastomeric materials to contain the lost motion and force movement in a direction for optimal efficiency. Furthermore, the cross-sectional shape of the diaphragms 513 and 523 may assist to control expansion directions in the desired direction and reduce loss of efficiencies.

The diaphragms 523 and 513, paddles 511 and 521, and rigid frames 515 and 525 may be formed by injection molding or via other methods known to the art. Diaphragms 523 and 513 can also be constructed from mylar, PVC or other sheet material that is stretched to shape or bonded together using methods known in the arts.

Since diaphragms 523 and 513 are made of flexible, elastic material, the space 550 tends to inflate and expand with positive internal pressure provided by pneumatic system, causing the surface of the driving mechanism (e.g., the paddles 511 and 521) to be pushed away from a plane that is located through the center of the diaphragms 523 and 513. The diaphragms 523 and 521 tend to deflate and contract when negative internal pressure is applied by pneumatic system, causing the paddles 511 and 521 to be drawn toward the central plane. Dental trays 412 are attached to paddles 521 and 511, respectively, and thus, share the motion of driving mechanism 420. The location of the center plane of driving mechanism 420, while included in a brush head 400 used for brushing, depends on the orientation of the brush head 400 with respect to the occlusal surfaces of the mandibular and maxillary teeth as well as the pressure being applied by the jaw muscles. As described above, a user may gently bite down on brush head 400 in order to cause the dental trays of the brush head to flex and conform to the shape of the user's dental arch.

One benefit of a driving mechanism with a single large space between the dental trays is that regardless of whether there is a "rake" in a user's bite (e.g., an imbalance in the bite pressure), the bite pressure is equalized across the dental trays by the driving mechanism. For example, a user might exert a higher bite pressure at the back of the mouth versus the front of the mouth. The pressure gradient runs down the center of bladder of the driving mechanism 420, and the bite pressure exerted by the user is distributed by the diaphragms, enabling the powered toothbrush to adapt to the variability and irregularities of the bite pressure exerted by users. Furthermore, the paddles assist to distribute the higher bite pressure across the diaphragm to evenly distribute the pressure across the entire bladder, opposed to localized pressure gradients.

Embodiments of Pneumatic System

Figure 15:
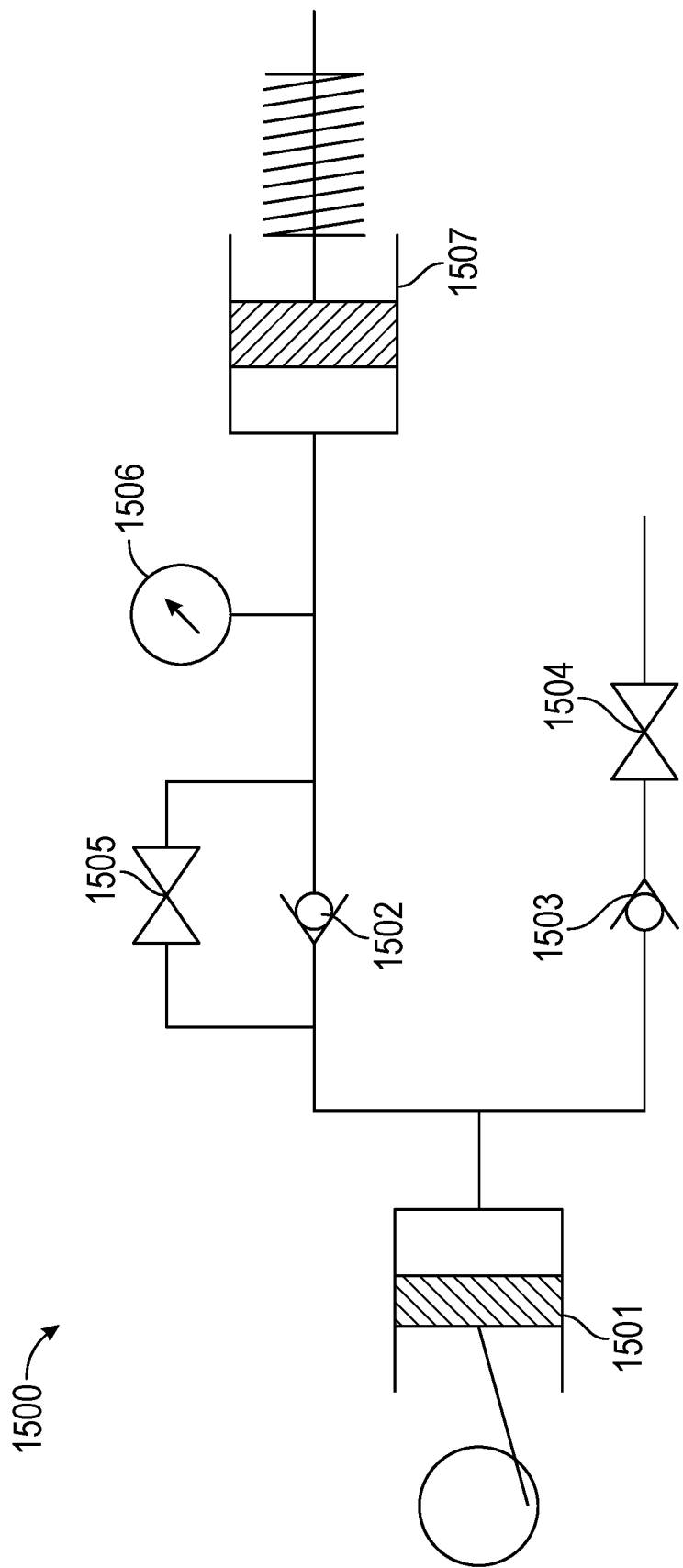
FIG. 15 illustrates a schematic diagram of a pneumatic system that may be used with the powered toothbrush of FIG. 1, according to embodiments disclosed herein.

FIG. 15 illustrates a schematic diagram of a pneumatic system 1500 that may be used to drive the driving mechanism 420, according to embodiments disclosed herein. FIG. 15 illustrates a pneumatic system that spans between the handle portion 200 and the brush head assembly 400. Pneumatic system 1500 provides for conversion of electrical energy to filament motion. For example, with reference to FIG. 1, the pneumatic system 1500 operates to oscillate the driving mechanism 420 of brush head 400 to alternatively bring the dental trays 412a and 412b together and drive the dental trays 412a and 412b apart to create a brushing motion.

The pneumatic system 1500 includes a diaphragm pump 1501 connected to an outlet check valve 1502 and an inlet check valve 1503. The outlet check valve 1503 is connected to an inlet shutoff valve 1504. The outlet check valve 1502 is connected to an outlet bypass valve 1505, a pressure transducer 1506, and the driving mechanism 1507. The diaphragm pump 1501 may be, for example, the diaphragm 207, driven by motor 204, to generate oscillating pressure gradient between diaphragm 207 and chassis lower 208 the of FIG. 2. The driving mechanism 1507 may be substantially the same as the driving mechanism 420 described above.

In operation, under control by a processing device (e.g., processing device 215 of FIG. 2), inlet shutoff valve 1503 is opened and the outlet bypass valve 1505 is closed. The diaphragm pump 1501 is operated and the inlet check valve 1503 is opened to allow fluid (e.g., gaseous or liquid fluids) to enter the system 1500 and is maintained in the pump 1501. At the same time, the outlet check valve 1502 is opened to allow fluid to enter the driving mechanism 1507 and the fluid is maintained therein. This configuration permits the pressure to build in the system 1500 to a desired level.

Once the desired level is achieved, the inlet shutoff valve 1504 is closed to isolate the system 1500 from additional pressure intake and the outlet bypass valve 1505 is opened, thereby coupling the diaphragm pump 1501 to the driving mechanism 1507. The diaphragm pump 1501 continues to operate when the outlet bypass valve 1505 is opened, which causes the driving mechanism 1507 to oscillate in sync with the diaphragm pump 1501.

Figure 16A:
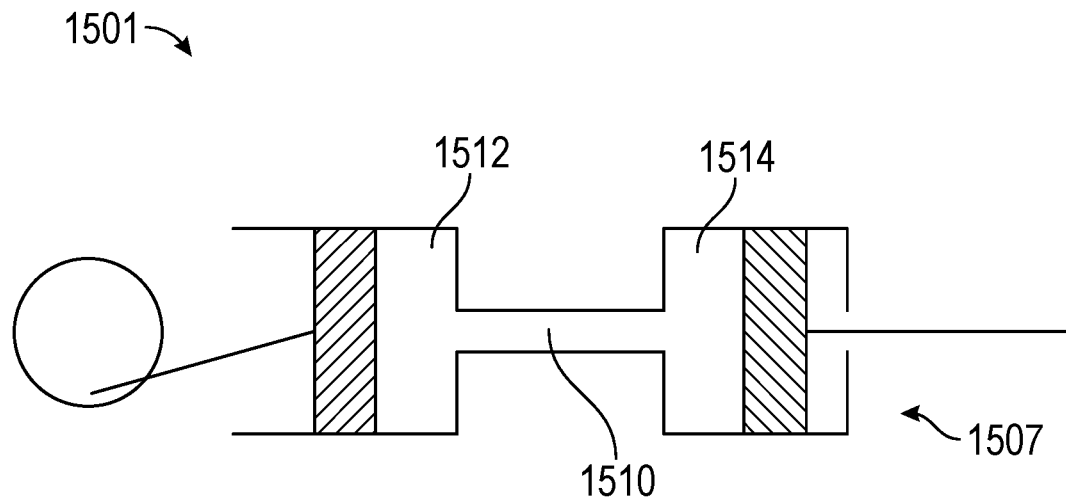
FIGS. 16A-16C illustrate multiple states of the pneumatic system of FIG.
Figure 16B:
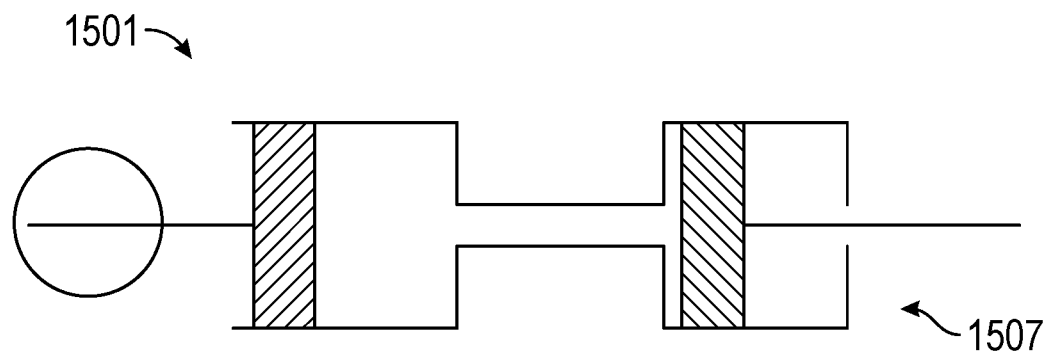
Figure 16C:
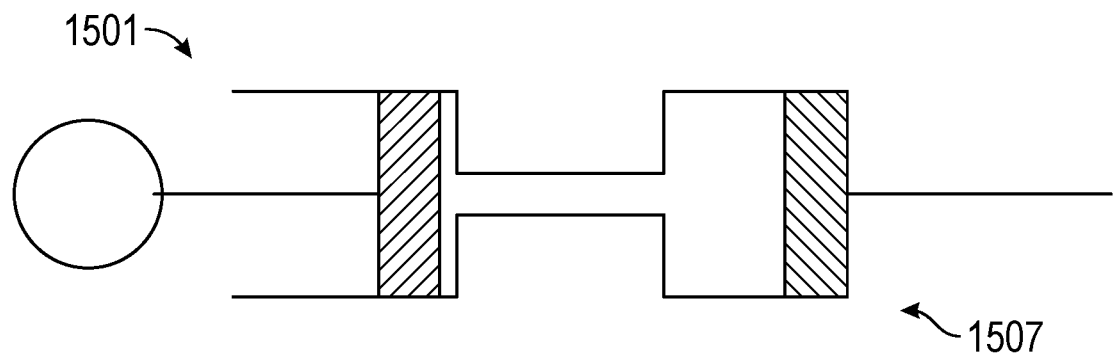

In various embodiments, the design of the driving mechanism 1507 to move the dental trays in opposite directions is ideally performed when operation of the diaphragm pump 1501 starts from a top dead center position. For example, FIGS. 16A-16C illustrate multiple states of operation of the pneumatic system 1500. FIGS. 16A-16C illustrate a simplified representation of the pneumatic system 1500, for example, the outlet check valve 1502, an inlet check valve 1503, inlet shutoff valve 1504, outlet bypass valve 1505, and a pressure transducer 1506 are grouped as element 1510 for illustrative purposes. FIG. 16A illustrates the pressure build up phase where the inlet shutoff valve 1503 is opened, the outlet bypass valve 1505 is closed, the inlet check valve 1503 is opened, and the outlet check valve 1502 is opened. Once the desired pressures are achieved, in a first state (FIG. 16B), the diaphragm pump 1501 starts at the top dead center with a maximal volume of fluid in the pump 1501 and a minimal amount of fluid in the driving mechanism 1507. This represents the top of each stroke of the pump during operation and the driving mechanism 1507 in a rest state (e.g., suction or no fluid present in driving mechanism). At a second state (FIG. 16C), the pump 1501 is at a bottom of a stroke (e.g., minimal volume of fluid in the pump) and the volume of fluid in driving mechanism is maximized. At the first state, the dental trays may be at a minimum distance apart from each other while in the second state the dental arche may be a maximum distance from each other.

Alternatively, a closed system pump can be used. When it starts, it only has the air in the system to build internal pressures. However, operation is the same as described above in connection with FIGS. 16A-C. For example, pump 1501 should start at top dead center (TDC) to enable the closed system to contain as much air as possible. Then as 1501 moves to bottom dead center (BDC), all the air in the pump is expelled to the bladder 1507. If 1507 had been at rest in a neutral position, then the first movement of the pair of dental trays 420 would be to force them apart. When the pump moves from BDC to TDC the dental trays are pulled together forcibly from the vacuum effort of the 1501 pump.

According to some embodiments, the following method may be used to ensure that the pump 1501 starts from the top dead center position. For example, the following method may ensure that when the toothbrush 100 is turned off, operation of the pump 1501 stops when the diaphragm is in the top dead center position. First, the processing device monitors the motor (e.g., motor 204) current during operation and creates a current signature for a typical full revolution (e.g., full stroke of the diaphragm). Control of the motor position is based on what current is supplied to the motor supply current. The processing device may define the current level, based on the monitoring, of when to cut power to the motor power such that top dead center is always achieved. A light emitting diode and a receiver may be provided in the handle portion 200 to detect in flight diaphragm position to define when to stop at TDC. The inlet check valve 1503 may be operated, as described above, to allow pressure build-up beginning from the top dead center position. Optionally, a pressure sensor can detect pressure build up to ensure the desired pressure levels are achieved.

Optimizing the displacement of tooth cleaning members (e.g., brush components 410a and 410b) to achieve a desired brushing motion requires balancing of the dynamic behavior of the pneumatic components of the system, including factors such as the total air volume of the system, the pressure characteristics of the pump during each stroke, the mechanical characteristics of the driving mechanism, and the flow performance of the air delivery passages and pathways.

The speed of the motor 204 affects the above mentioned parameters. The metric for the speed of the motor is revolutions per minute. According to an embodiment, a target speed of approximately 30 to 80 revolutions per second. According to some embodiments, a target speed of approximately 48-55 Hz may provide optimal results.

As described above the motor 204 causes a compression and suction stroke of the pump 204 for each revolution. According to some embodiments, the maximum positive pressure for the compression stroke falls in the range of 20 to 30 pounds per square inch (psi), and the maximum negative pressure is limited to an absolute vacuum of approximately −14.7 psi. According to some embodiments, the absolute vacuum is limited to approximately −6 to −9 psi. Thus, there is more pressure available on the compression stroke. However, as the pressure in the system increases, the volume of air pushed out decreases according to the equation of state, PV=mRT. Due to this pressure difference, there is some optimal positive average pressure that results in maximum driving mechanism deflection. According to some embodiments, a pressure control value may be included in the pneumatic system to release pressure if the pressure increases above the optimal positive average pressure. However, some positive pressure may be desired to keep a slight inflation of the driving mechanism to yield a comfortable feel in the mouth. This slight inflation may enable oscillating motion with less energy consumed.

According to an embodiment, the volume of air displaced per stroke by the pump 207 may be balanced with the volume of the air delivery component and the volume of the driving mechanism (e.g., space 505). The total per revolution deflection may be related to the volume added per stroke on the positive pressure side plus the volume subtracted from the driving mechanism on the negative pressure stroke. This volume change may also be related to the average pressure in the driving mechanism. As the average bladder pressure increases, the volume change (and correspondingly the tooth contact component displacement) in the driving mechanism for any given motor will decrease.

The bite force applied to the dental trays may add to the average pressure in the driving mechanism, which can negatively affect performance of the pneumatic system. According to some embodiments, the pneumatic system of the powered toothbrush includes a pressure control value that releases pressure from the system to mitigate pressure imparted by the user's bite pressure. There are several valve implementations (i.e. duckbill, umbrella or flapper valves) that may be suitable for inclusion in a replacement brush head such as those used in the powered toothbrush.

Embodiments of Interlocking System

Figure 17:
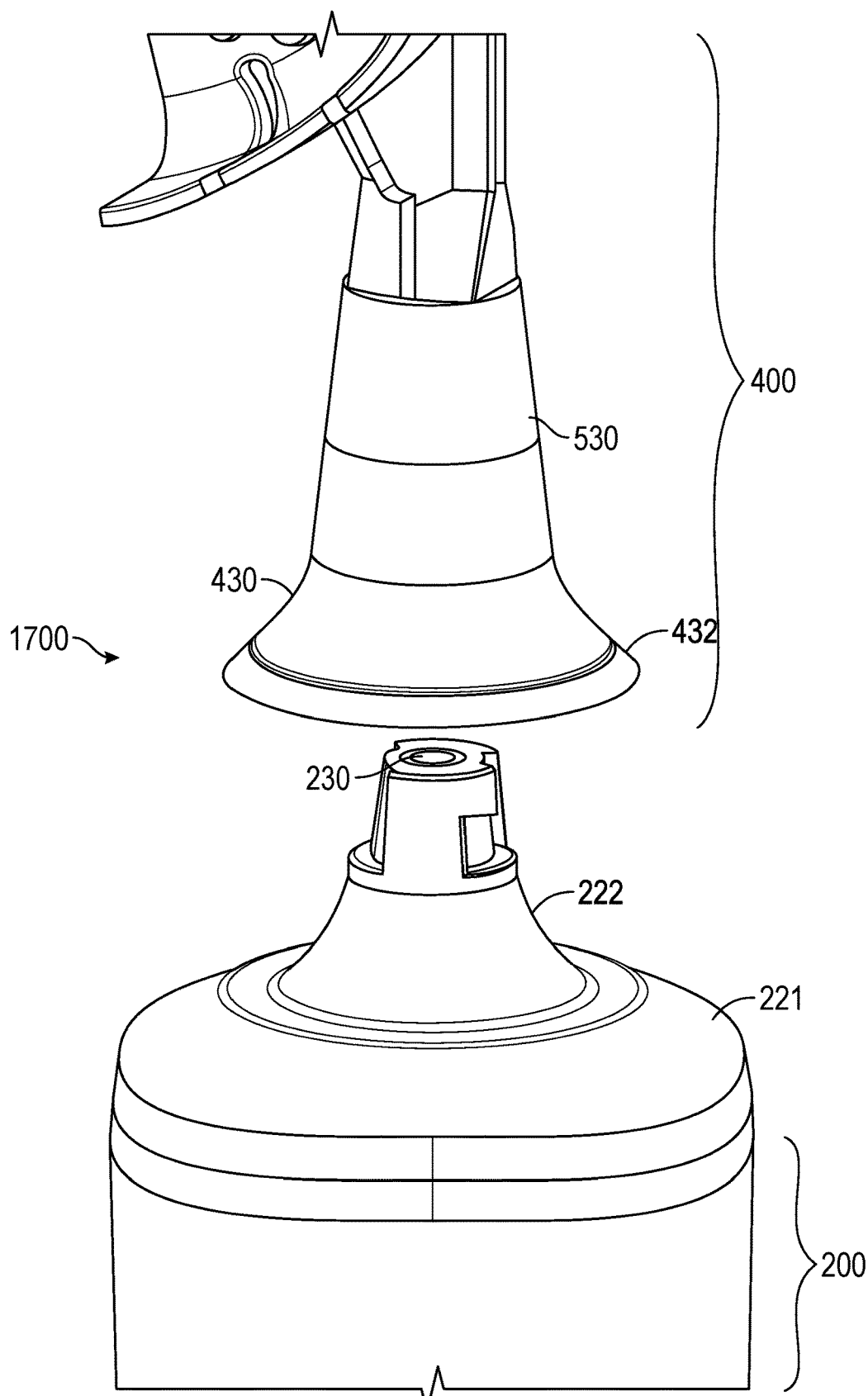
FIG. 17 illustrates an example interlocking system that may be used with the powered toothbrush of FIG. 1, according to embodiments disclosed herein.

FIG. 17 illustrates an example interlocking system that may be used with the toothbrush 100, according to embodiments disclosed herein. FIG. 17 illustrates an exploded view of the toothbrush 100, with the brush head 400 separated from the handle portion 200, thereby exposing the nosecone 222 that extends from upper cover 221. The brush head 400 shown in FIG. 17 may be substantially similar to the brush heads disclosed throughout this disclosure (e.g., FIGS. 5A-13). The brush head 400 includes the sheath 530 that extends from the driving mechanism 420. The sheath 530 is attached to the neck 430 and an identification band may be optionally provided at the bottom edge 432 of neck 430. The identification band 420 may be a component that is aesthetically colored to differentiate one brush head from another, for example, in a case where different users plan to use different brush heads with the same handle portion 200.

In various embodiments, the neck 430 of the brush head 400 is configured to interface with the nosecone 222, for example, by an inner surface of the neck 400 contacting the outer surface of the nosecone 222. The bottom edge of the neck 430 (or identification band 432 when used) may contact the upper cover 221.

In the illustrative example of FIG. 17, an interlocking system 1700 is provided between the nosecone 222 and the neck 430. The interlocking system 1700 is configured to removably couple the brush head 400 to the handle portion 200. For example, a first interlocking component (an example of which is provided in FIGS. 19A-19C) provide on the nosecone 222 that is configured to interface with a corresponding second interlocking component (an example of which is provided in FIGS. 18A-18C) of the neck 430. In some embodiments, the brush head 400 may be placed upon the nosecone 222, for example, via movement in a direction approximately parallel with the length of the handle portion 200, and then, once the brush head 400 reaches designed position relative to the nosecone 222, a rotational twisting motion along a circumferential direction may be applied to the brush head 400 that causes the first and second interlocking components to interact and lock the brush head 400 to the nosecone 222 and the handle portion 200 (for example, as shown in FIG. 20). A rotational twisting motion in the opposite circumferential direction may cause the first and second interfacing components to unlock, thereby allowed the brush head to be removed from the nosecone 222.

In some embodiments, interlocking of the first and second interlocking components may also cause the inlet 532 in the sheath 530 to be brought into an airtight seal with the outlet 230. For example, am O-ring or other sealing member (not shown) may be provided at one or more of the inlet 532 and outlet 230. When the brush head 400 is placed on the nosecone 222, the inlet 532 and outlet 230 may be brought into contact with each other. Then, upon twisting the brush head 400 to lock it into place with the nosecone, the interlocking system may pull the inlet 532 closer outlet 230, applying a greater pressure to the sealing member(s) therebetween, and providing an airtight seal between the inlet 532 and outlet 230. Providing the airtight seal may reduce pressure losses and improve efficiency of the pneumatic system, through ensuring the fluid pathway does not experience fluid loss.

Figure 18A:
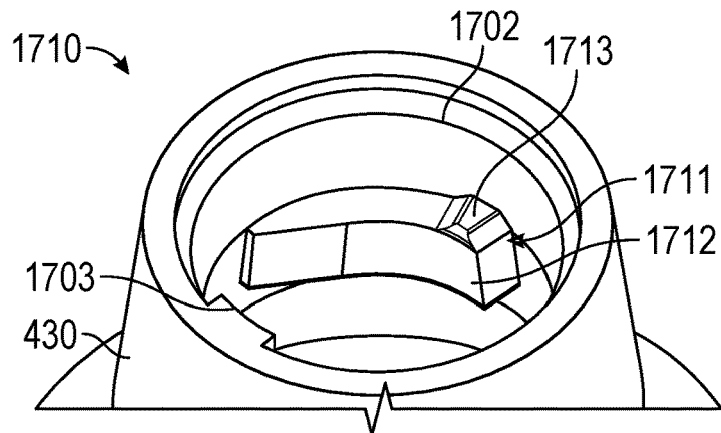
FIGS. 18A-18C illustrate an example first interlocking component of the interlocking system of FIG. 17 that may be used with a brush head assembly, according to embodiments disclosed herein.
Figure 18B:
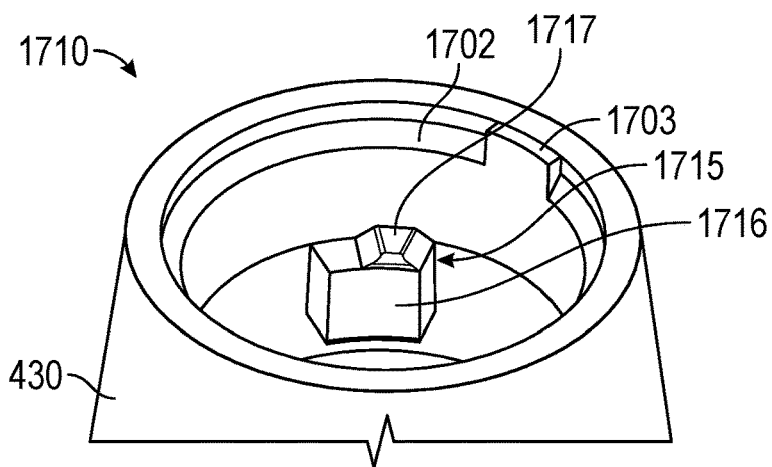
Figure 18C:
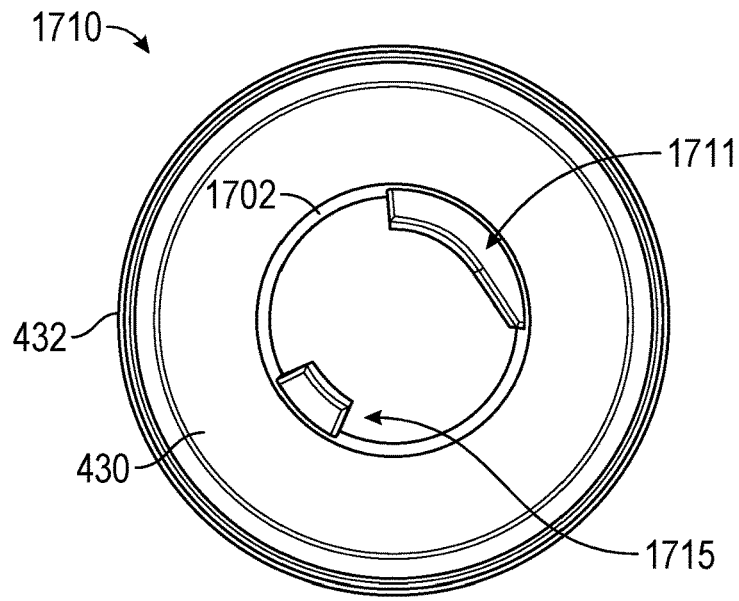

FIGS. 18A-18C illustrate an example first interlocking component of the interlocking system 1700, according to an example embodiment. FIG. 18A illustrates a perspective view of a first side of the neck 430, with the sheath 530 and rest of the brush head 400 removed. FIG. 18A depicts a view of the first side of the neck 430 from above the neck 430 and toward the handle portion 200. FIG. 18B illustrates a perspective view of a second side, opposite the first side, of the neck 430, with the sheath 530 and rest of the brush head 400 removed. FIG. 18B depicts a view of the second side of the neck 430 from above the neck 430 and toward the handle portion 200, similar to FIG. 18A. FIG. 18C illustrates a bottom up view of the neck 430 (e.g., from a position of the handle portion 200), with the handle portion 200 removed.

FIGS. 18A-18C illustrate an example second interlocking component 1710 included as part of neck 430. In the illustrative example, neck 430 has a conical opening in which the second interlocking component 1710 is formed. The example second interlocking component 1710 shown in FIGS. 18A-18C may be referred to as an internal locking component. In some embodiments, the neck 430 may be hard plastic that is molded or formed to include the internal locking members according to known techniques. In another example, the neck 430 may be formed and the internal locking component bonded to the inner surface of the neck 430.

In the example of FIGS. 18A-18C, a spacer ring 1702 may be provided adjacent to an upper edge of the neck 430 (e.g., an edge that contacts sheath 530), on which a lip 533 (see FIG. 9) of the sheath 530 may rest when assembled and function to facilitate bonding and alignment between neck 430 and sheath 530. The ring 1702 may optionally comprise a protrusion 1703 extending upward in a direction toward the sheath 530 and configured to interlock with a cutout 534 included in the lip of the sheath 530.

The internal locking component 1710 may be provided on a side of the ring 1703 opposite the protrusion 1703. The interlocking component 1710 may comprise one or more locking members, for example, a first locking member 1711 shown in FIG. 18A and a second locking member 1715 shown in FIG. 18B. The first and second locking members 1711 and 1715 are illustratively shown positioned the first side and second side of neck 430, respectively, opposite each other.

The first locking member 1711 comprises a body 1712 having a rectangular front surface facing the second locking member 1715 and a locking feature 1713. The locking feature 1713 is illustratively shown as being a raise surface having angled sides that extend to the body 1712, thereby forming a base that is wider than the raised surface as shown in FIG. 18A. The locking feature 1713 is shown positioned to an end of the body 1712. In the illustrative example, the thickness of the body 1712 (e.g., the distance that body 1712 extends from the inner surface of the neck 430 in the radial direction, as shown in FIG. 18C) progressively narrows from the end comprising the locking feature 1713 to the opposite end. This can act like a ramp or incline pane to provide sealing pressure.

Similarly, the second locking member 1715 comprises a body 1716 having a substantially square front surface facing the first locking member 1711 and a locking feature 1717. The locking feature 1717 is illustratively shown as being a raise surface having angled sides that extend to the body 1716, thereby forming a base that is wider than the raised surface as shown in FIG. 18B. The locking feature 1717 is shown positioned to an end of the body 1716. In the illustrative example, the thickness of the body 1716 (e.g., the distance that body 1716 extends from the inner surface of the neck 430 in the radial direction) is constant.

Figure 19A:
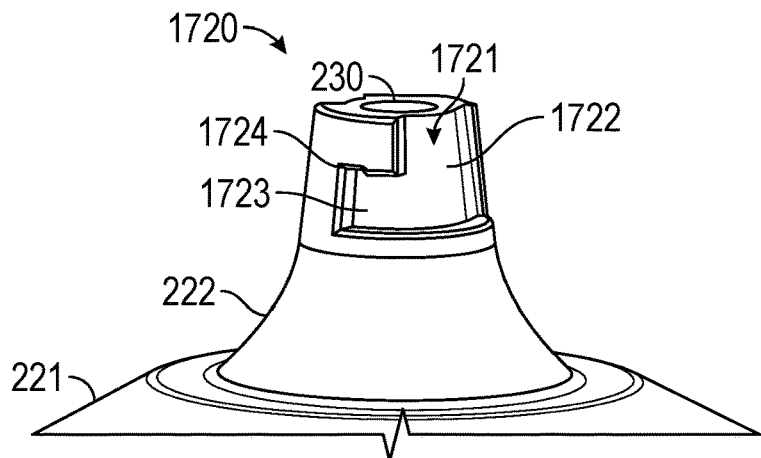
FIGS. 19A-19C illustrate an example second interlocking component of interlocking system of FIG. 17 that may be used with a handle portion of the powered toothbrush of FIG. 1, according to embodiments disclosed herein.
Figure 19B:
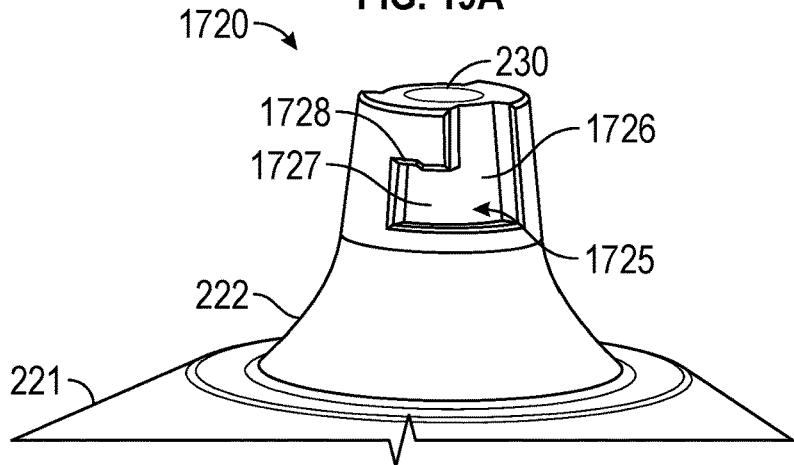
Figure 19C:
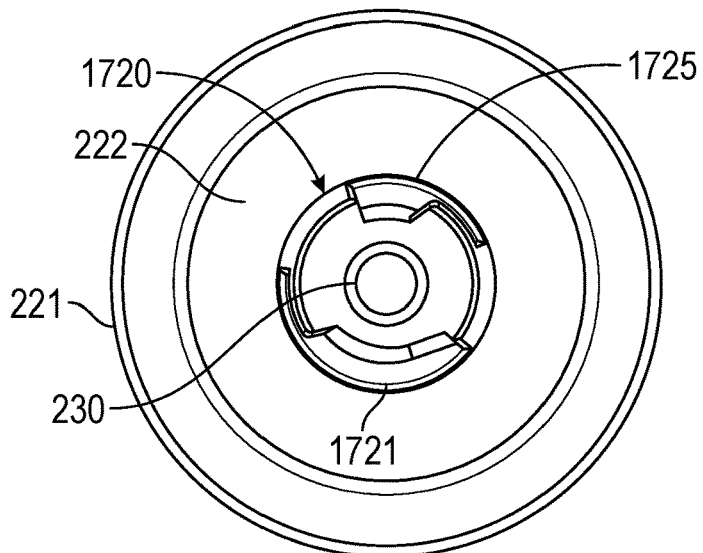
Figure 20:
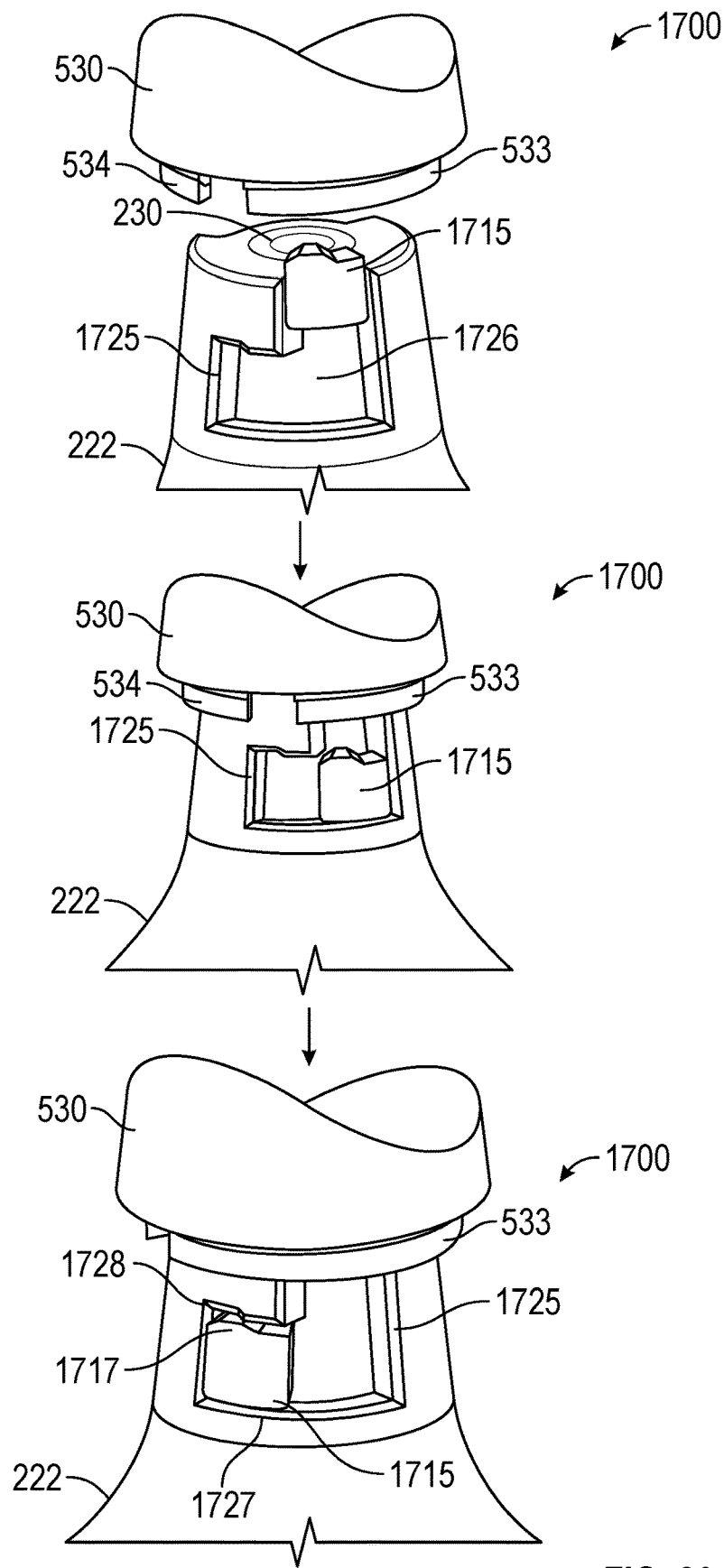
FIG. 20 illustrates an operational flow diagram of the interlocking system of FIG. 17.

FIGS. 19A-19C illustrate an example second interlocking component of interlocking system 1700, according to an example embodiment. FIG. 19A illustrates a perspective view of a first side of the nosecone 222, with the brush head 400 removed. FIG. 18B illustrates a perspective view of a second side, opposite the first side, of the nosecone 222. FIG. 19C illustrates a top down view of the nosecone 222, with the brush head 400 removed.

FIGS. 19A-19C illustrate an example first interlocking component 1720 included as part of the nosecone 222. In the illustrative example, the nosecone 222 comprises the first interlocking component 1720 disposed at an end of the nosecone 22 opposite the handle portion 200. The example first interlocking component 1720 shown in FIGS. 19A-19C may be referred to as an external locking component. In some embodiments, the nosecone 222 may be molded or formed to include the external locking member according to known techniques. In another example, the external locking member may be formed separately and bonded to the nosecone 222.

In the example of FIGS. 19A-19C, the external locking component 1720 may be provided on an outer circumference side of the nosecone 222. The external locking component 1720 may comprise one or more recesses configured to receive a locking member (e.g., locking members 1711 and/or 1715). For example, the external locking component 1720 may include a first recess 1721 shown in FIG. 19A and a second recess 1725 shown in FIG. 19B. The first and second recesses 1721 and 1725 are illustratively shown positioned on first side and second sides of nosecone 222, respectively, opposite each other.

The first recess 1721 comprises a plurality of regions configured to receive, for example, the first locking member 1711. For example, a first region 1722 may be provided that extends from the end of the nosecone 222 in the axial region from the nosecone 222 to a designed distance from the end of the nosecone 222. The first recess 1721 also includes a second region 1723 at the designed distance that extends from the first region 1722 in the circumferential direction of the nosecone 222. A locking feature 1724 is provided at an end of the second region 1723 opposite the first region 1722. The locking feature 1724 is illustratively shown as being a recess in the axial direction from the second region 1723, having angled sides that extend to the second region 1723, thereby forming a recess adapted to receive, for example, the locking feature 1713. The width of the first region 1721 in the circumferential direction may correspond to the length of the body 1713 and the height of the second region 1722 corresponds to the width of the body 1713 in the axial direction. The locking feature 1724 is adapted to receive the locking feature 1713.

Similarly, the second recess 1725 comprises a plurality of regions configured to receive, for example, the second locking member 1715. For example, a first region 1726 may be provided that extends from the end of the nosecone 222 in the axial direction from the nosecone 222 to a designed distance from the end of the nosecone 222. The second recess 1726 also includes a second region 1727 at the designed distance that extends from the first region 1726 in the circumferential direction of the nosecone 222. A locking feature 1728 is provided at an end of the second region 1727 opposite the first region 1726. The locking feature 1728 is illustratively shown as being a recess in the axial direction from the second region 1727, having angled sides that extend to the second region 1727, thereby forming a recess adapted to receive, for example, the locking feature 1717. The width of the first region 1726 in the circumferential direction may correspond to the length of the body 1716 and the height of the second region 1727 corresponds to the width of the body 1716 in the axial direction. The locking feature 1728 is adapted to receive the locking feature 1717.

For example, FIG. 20 illustrates an operational flow diagram of the interlocking system 1700. FIG. 20 illustrates three stages of movement of the interlocking system 1700. In a first state, the second interlocking component 1710 is positioned within the first interlocking component 1720; in a second state, the second interlocking component 1710 is received by the first interlocking component 1720; and in a third state, the second interlocking component 1710 interfaces with the first interlocking component 1720 to couple the sheath 530 (e.g., as part of brush head 400) to the nosecone 222 (e.g., as part of the handle portion 200).

More particularly, FIG. 20 depicts perspective views of the second side of the neck 430 having the second locking member 1715 and the second side of the nosecone 222 having the second recess 1725. For clarity, the outer structure of the neck 430 and ring 1703 have been removed, and only the second locking member 1715 and sheath 530 are depicted. However, it will be appreciated that in actuality aspects depicted in FIG. 20 are performed within the neck 430 hidden from direct viewing due to the neck 430.

In operation, as outlined above, at a first state, the second locking member 1715 is positioned over the first region 1726 of the second recess 1725. The depth of the recess 1725 in the radial direction is designed to correspond to the thickness of the body 1716 in the radial direction, thereby receiving the second locking member 171. Once aligned, lateral movement of the brush head 400 in the axial direction slides the second locking member 1715 toward the bottom edge of the first region 1726 of recess 1725. The predesigned distance (e.g., position of the bottom edge) is selected to permit the bottom edge of neck 400 contacts the nosecone 222 or upper cover 221. From the second state (e.g., where second locking member rests on the bottom surface of region 1726), a rotational twisting force may be applied to the brush head 400 (or handle portion 200) to slide the second locking member 1715 in the circumferential direction and into the second region 1727. The locking feature 1717 exerts a force on the upper surface of the recess 1727 until the locking feature 1717 is received by the locking member 1728 as shown in FIG. 20 (e.g., the third state). The pressure exerted by the locking feature 1717 is released and the locking feature 1717 interfaces with the locking feature 1728 to lock the brush head 400 in place relative to the nosecone 222, and therefore relative to the handle portion 200.

The angled sides of the locking features 1728 and 1717 may also provide for releasing the coupling of the brush head 400 to the handle portion 200. For example, the angled sides permit, upon application of adequate force in the circumferential direction, the locking feature 1717 to slide, relative to locking feature 1728, thereby exiting the locking feature 1728. The states of the second locking member 1715 relative to the second recess 1725 may then be reversed, permitting the brush head 400 to be removed from the nosecone 222.

While the above example is described with reference to the second locking member 1715 and the second recess 1725, the first locking member 1711 and the first recess 1715 undergo similar states simultaneously with the second locking member 1715 and second recess 1725, due to be formed on the same components (e.g., the neck 430 and the nosecone 222). For example, at the first state, the first locking member 1711 is positioned over the first region 1722 of the first recess 1721. Once aligned, lateral movement (e.g., due to same application of force that resulted in lateral movement of the second locking member 1715) slides the first locking member 1711 into the first region 1722 of recess 1721. From the second state (e.g., where first locking member rests on the bottom surface of region 1722), the rotational twisting force (e.g., to same application of force that resulted in rotational movement of the second locking member 1715) to slides the first locking member 1711 into the second region 1723. The locking feature 1713 is then received by the locking feature 1724 (e.g., the third state), thereby locking the brush head 400 in place relative to the nosecone 222.

While specific examples of an interlocking system are provided above, embodiments herein are not limited to only those examples. For example, any number of locking members and corresponding recesses may be utilized. That is, a single locking member may be provided that interfaces with a single recess. Similarly, three or more locking members and recess pairs may be used as desired. Furthermore, the first and second locking members (and corresponding recesses) need not be positioned on opposing sides, but may be offset at any desired angle. For example, the second locking member may be offset 30 degrees, 45 degrees, 50, degrees, 90 degrees, etc. in the circumferential direction relative to the first locking member. The first and second recesses may be similarly offset.

Additional Embodiments of Brush Head Assemblies

Figure 21A:
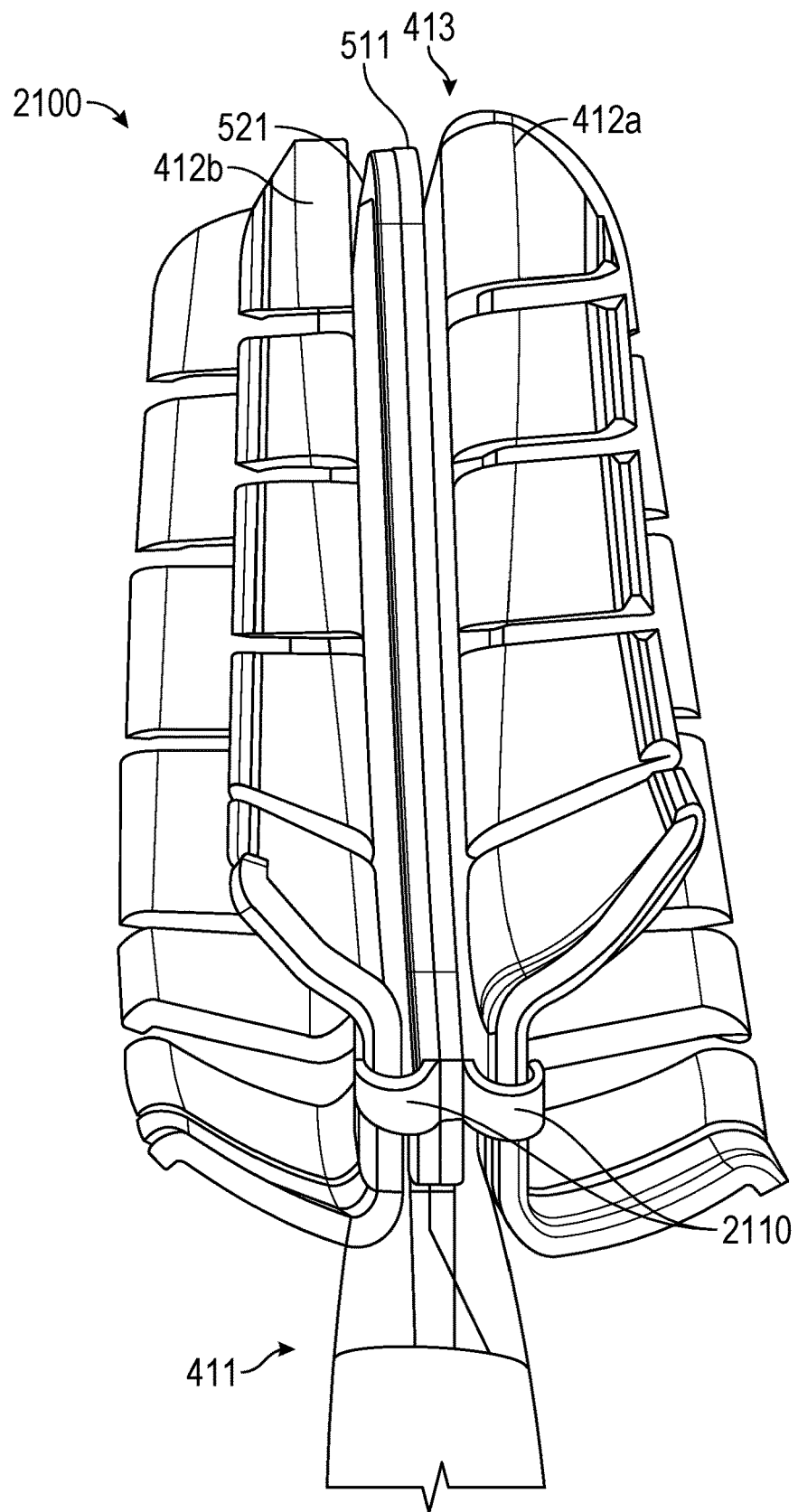
FIGS. 21A-21B illustrate another example brush head assembly that may be used with the powered toothbrush of FIG. 1, with the filament removed, according to embodiments disclosed herein.
Figure 21B:
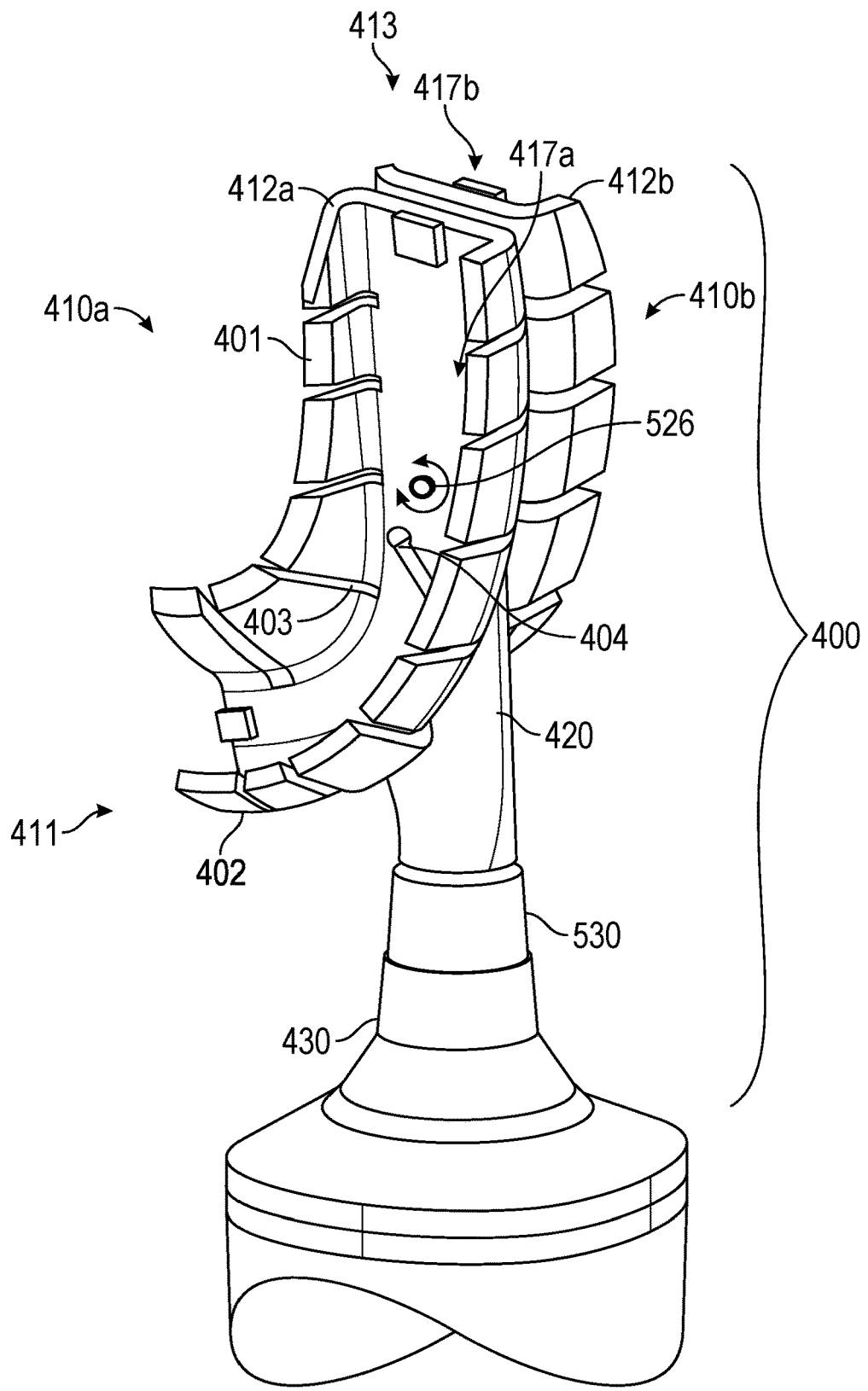

FIGS. 21A-21B illustrate another example brush head assembly that may be used with the powered toothbrush of FIG. 1, with the filament removed, according to embodiments disclosed herein. FIGS. 21A-21B illustrate brush head assembly 2100 that is substantially the same as brush head assembly 400 described above, except that brush head assembly 2100 includes arch slip joints 2110, the first of which is firmly attached to paddle 511 and hooks over the dental tray 412a. Similarly, the second shown arch slip joint is firmly attached to paddle 521 and hooks over the dental arche 412b. Alternatively, they can be firmly attached to pressure pads 523 and 513. This type of slip joint can replace the slots 607 and 605. With these type of hooks at each end of the paddles, the central pop-bead can snap in and then rotate the whole brush dental tray into place. This is a method for whole brush plate replacement at end of life while retaining the bladder assembly 420.

Figure 22:
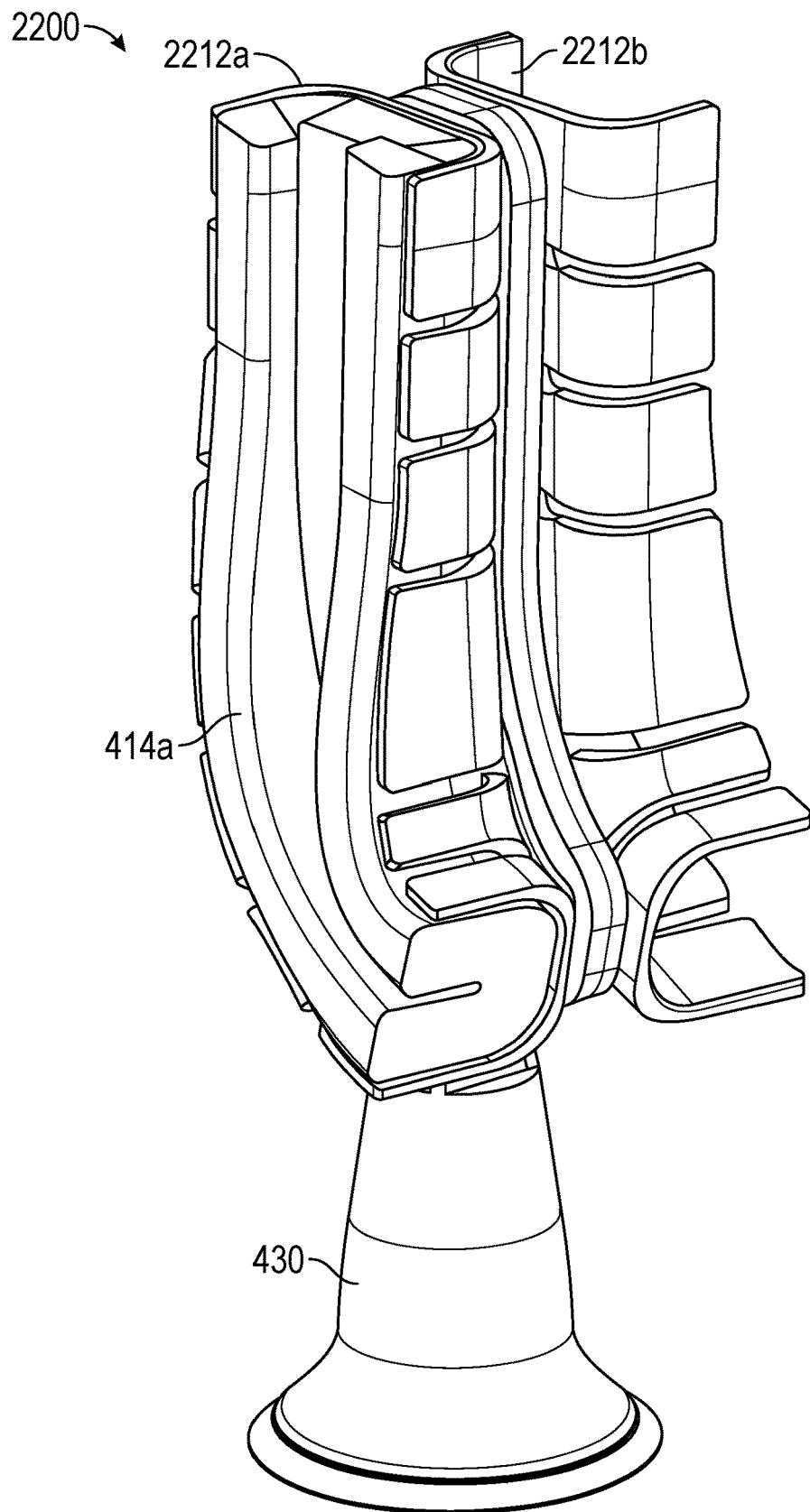
FIG. 22 illustrates another example brush head assembly that may be used with the powered toothbrush of FIG. 1, according to embodiments disclosed herein.

FIG. 22 illustrates another example brush head assembly that may be used with the powered toothbrush of FIG. 1, according to embodiments disclosed herein. FIG. 22 illustrates brush head assembly 2200 that is substantially similar to brush head assembly 400, except that brush head assembly 2200 comprises dental trays 2212a and 2212b. Dental trays 2212a and 2212b may be substantially the same as dental trays 412a and 412b, except the cross section of the dental trays 2212a and 2212b is "U"-shaped. That is, for example, when brushing one's teeth, the flexible fingers of the dental trays 2212a and 2212b are substantially perpendicular to the occlusal plane of the mouth, instead of inclined as described above.

Figure 23:
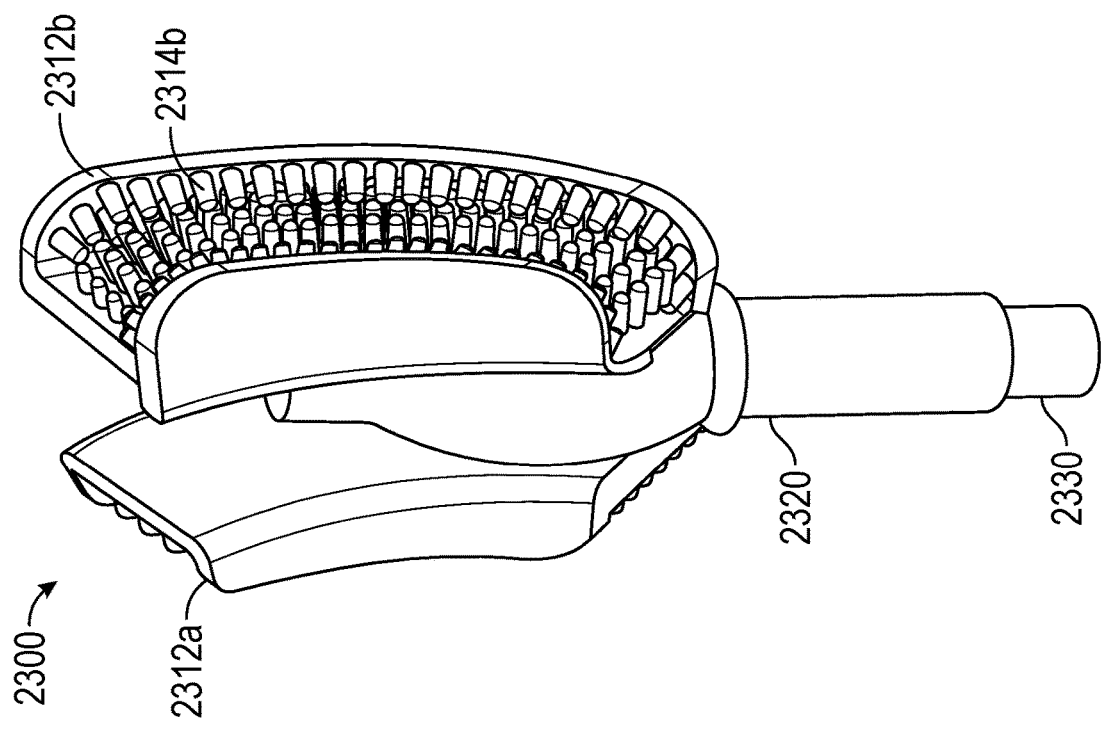

FIG. 23 illustrates an additional example of a brush head suitable for use on small children with the powered toothbrush of FIG. 1, according to embodiments disclosed herein. The assembly includes child sized dental trays 2312a and 2312b, a driving mechanism 2320 and a neck 2330 similar to that described above in connection with FIGS. 5A and 5B. Similarly, the assembly depicted in FIGS. 9 and 10 could be used with the depicted child sized dental trays. In addition, the child sized dental trays 2312a and 2312b can be constructed from soft elastomeric materials. Similarly, bristles 2314b can be made from a softer material than the material used in adult versions.

Figure 24:
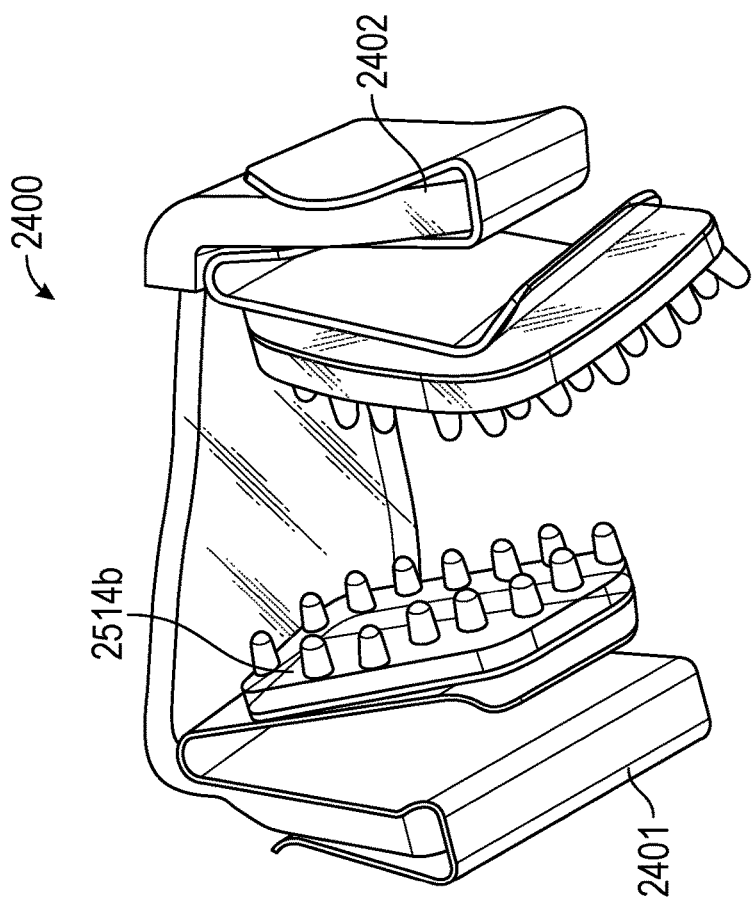
FIGS. 23 and 24 illustrate additional examples of brush heads that may be used with the powered toothbrush of FIG. 1, according to embodiments disclosed herein.

FIG. 24 illustrates a clip type arrangement 2400 for attaching bristles to a brush head frame 2402. The clip 2401 includes bristles 2514b which can be easily removed when they become worn.

Figure 25A:
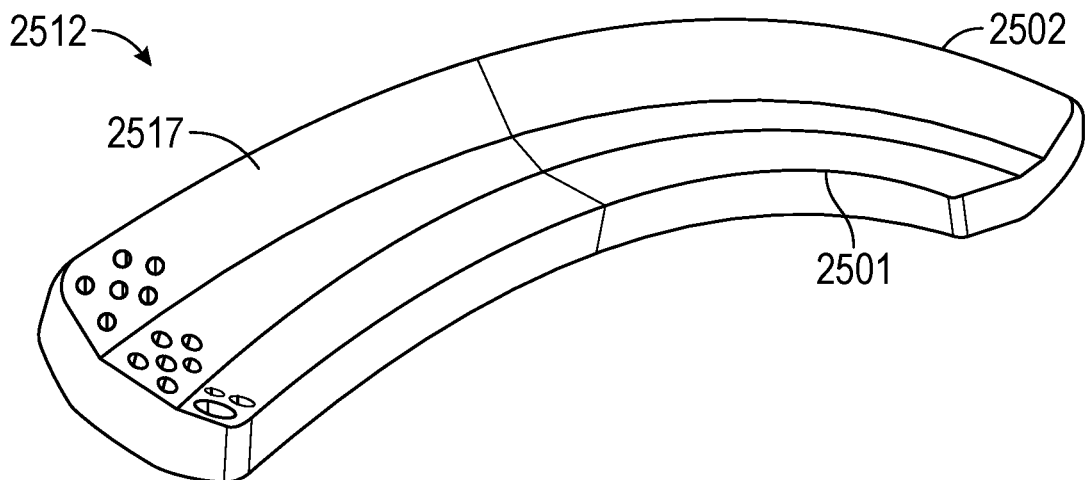
FIGS. 25A-25B illustrate schematic diagrams of an example dental tray that may be used with the brush head assembly of FIG. 4, according to an embodiment.
Figure 25B:
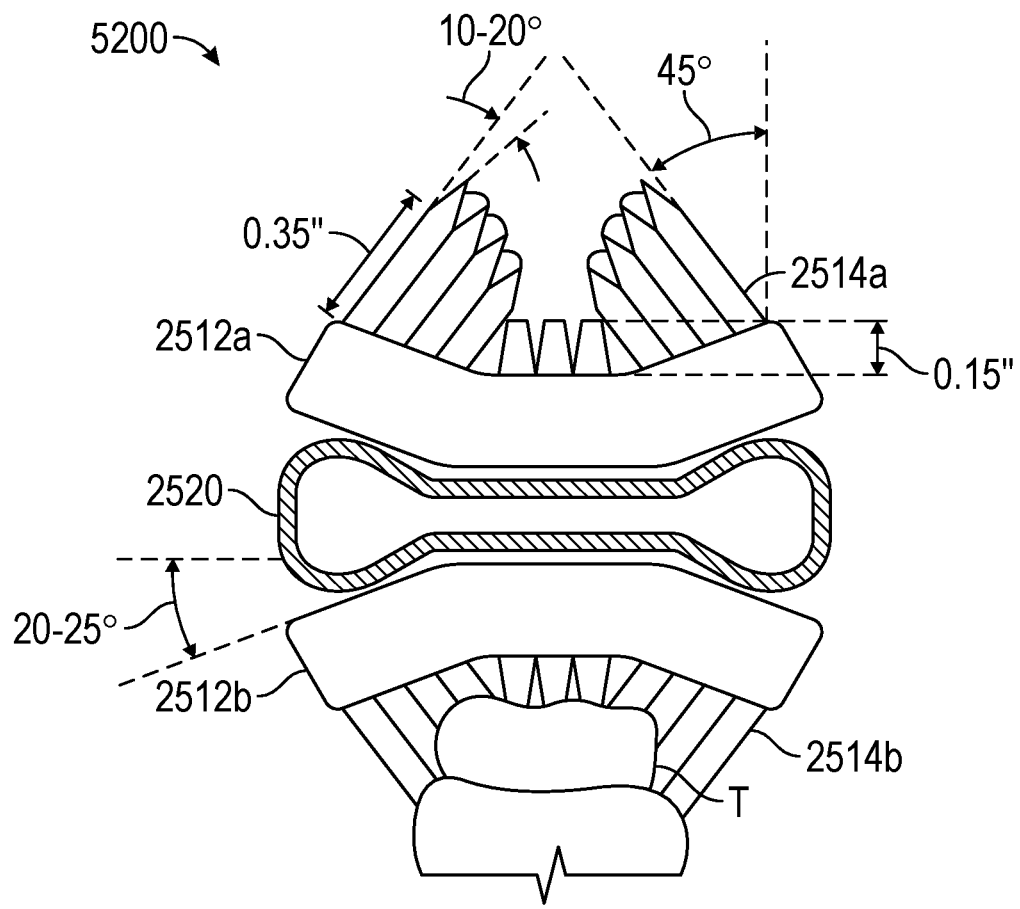

FIGS. 25A-25B illustrate diagrammatically a further example dental tray that may be used with the systems, including those depicted in FIGS. 1, 4, 5A-F and 10A and B. The dental trays 2512a and b include a first side 2501 and a second side 2502 which define the sides of a tooth channel. The inner surface 2517 contains the bristles 2514a and b. The relative shallowness of the tooth channel is compensated for by the angles of the side bristles. A driving mechanism, such as a bladder, is schematically shown as 2520. The upper and lower dental trays are connected to the bladder, e.g. such as is depicted in FIGS. 9-11 described above.

Figure 25C:
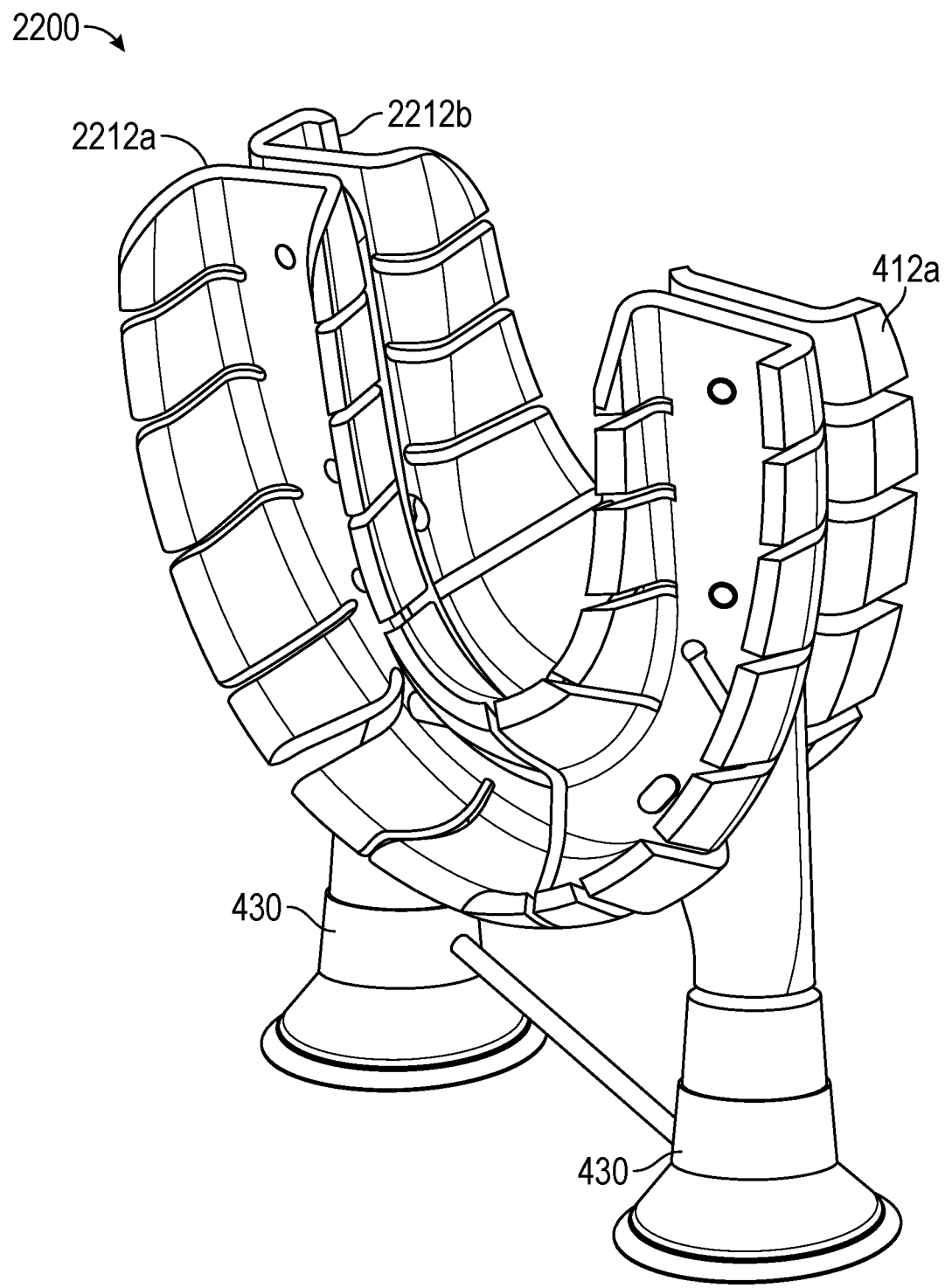
FIG. 25C illustrates a schematic diagram of another embodiment having two full arch dental trays designed to brush all of a user's teeth simultaneously.

FIG. 25C illustrates a schematic diagram of another embodiment having two full arch dental trays designed to brush all of a user's teeth simultaneously. The embodiment shown in FIG. 25C can be thought of as a pair of the half arch pairs described in all of the foregoing embodiments with the same components and functions.

Figure 26:
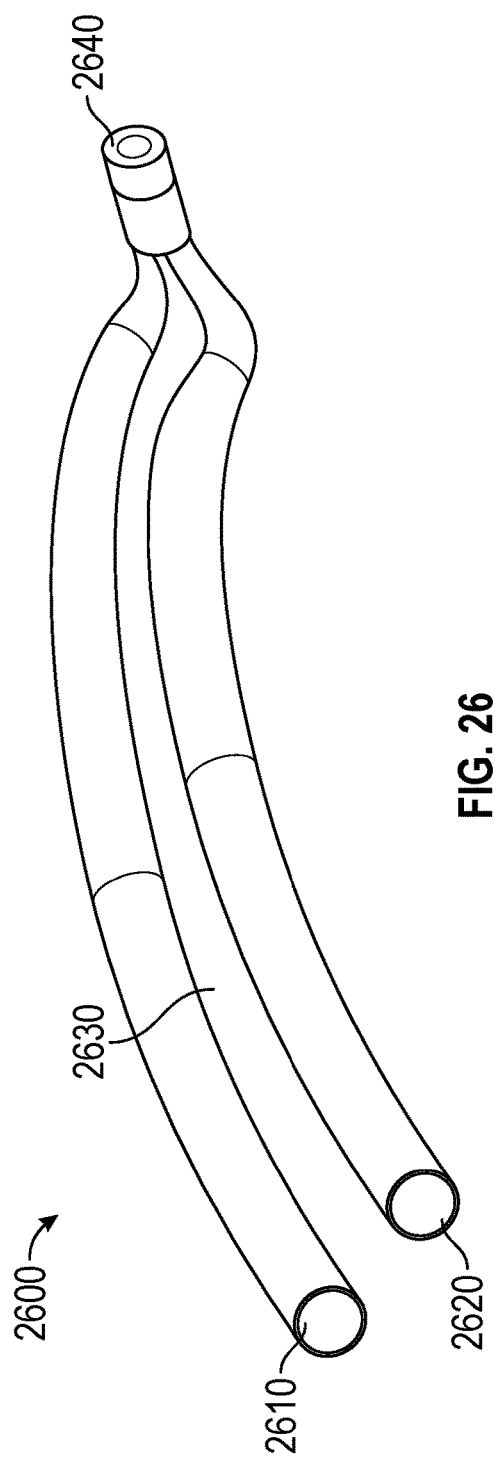
FIGS. 26 and 27 illustrate schematic diagrams of examples of driving mechanisms that may be used with the brush head of FIG. 4, according to some embodiments.
Figure 27:
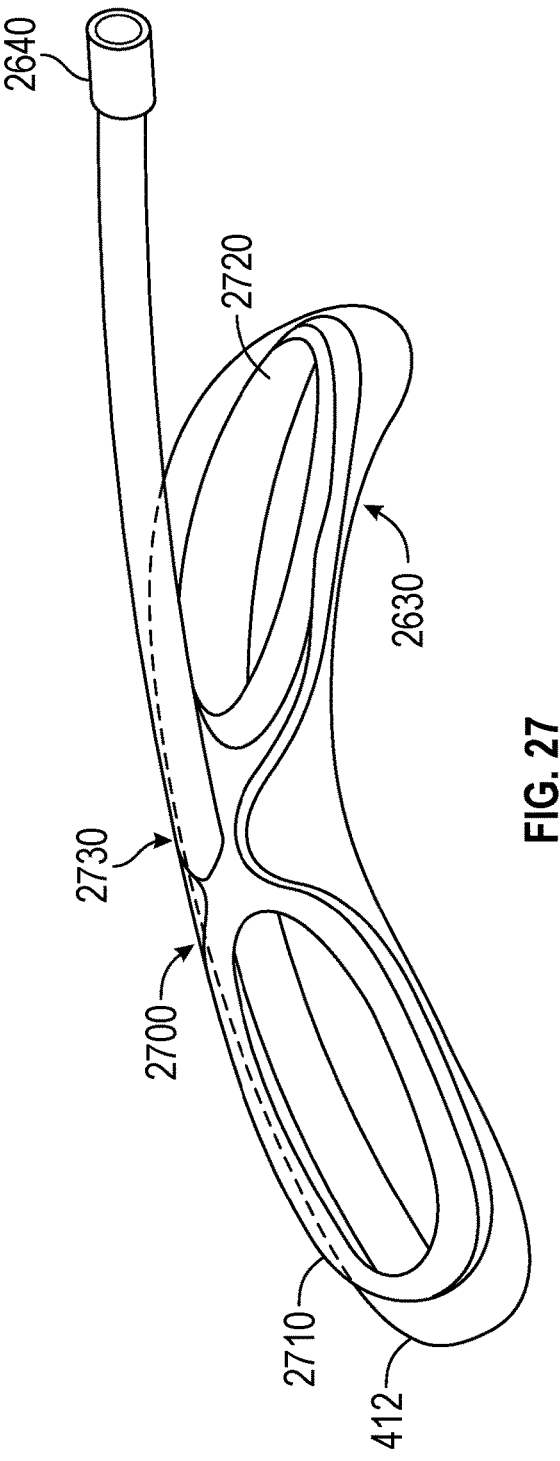

FIGS. 26 and 27 illustrate schematic diagrams of examples of driving mechanisms that may be used with the brush head of FIG. 4, according to some embodiments.

Processing Device

Figure 28:
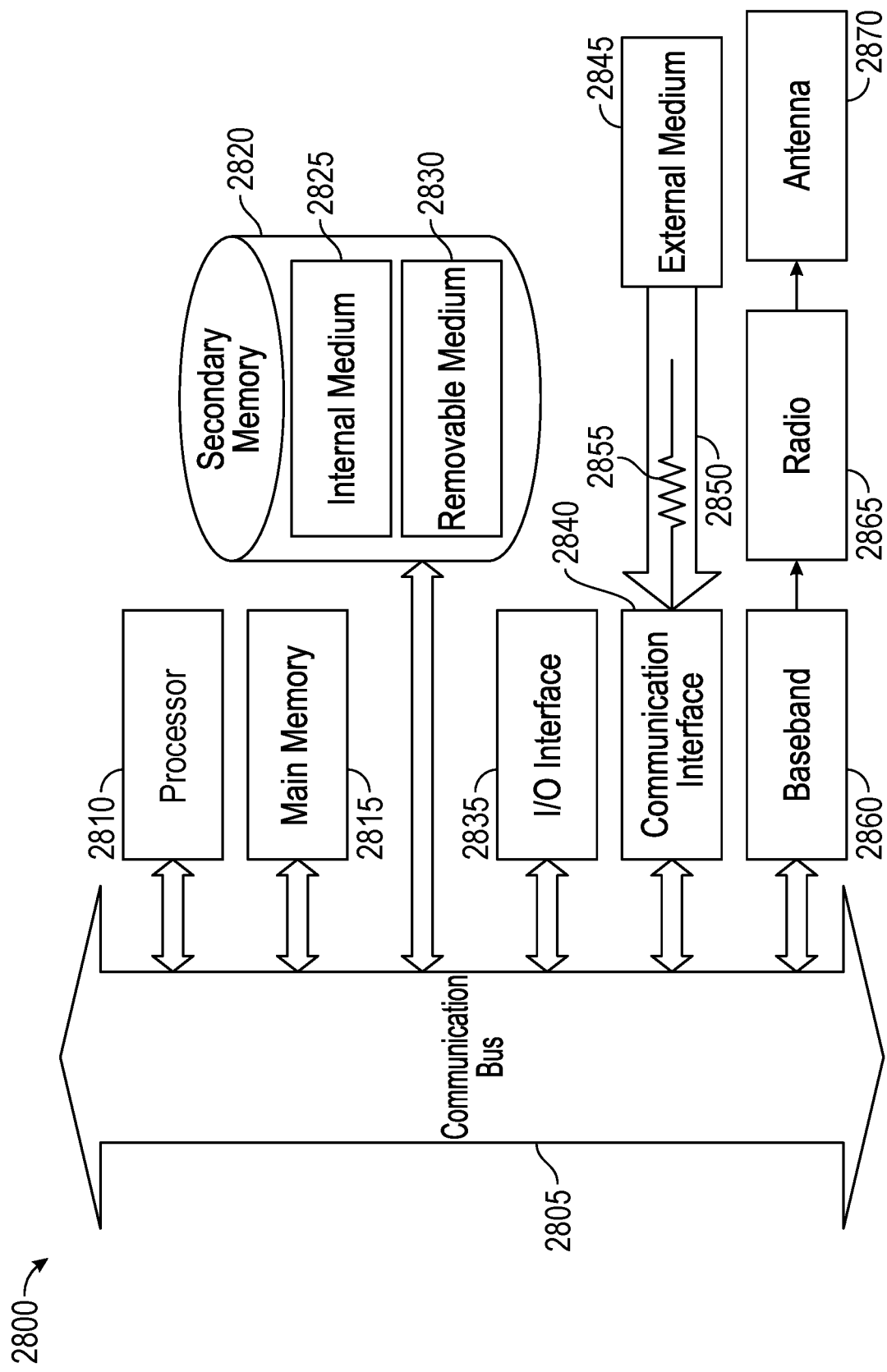
FIG. 28 is a functional block diagram illustrating an example wired or wireless processing device that may be used in connection with various embodiments described herein.

FIG. 28 is a block diagram illustrating an example wired or wireless processing device 2800 that may be used in connection with various embodiments described herein. For example, system 2800 may be implemented as the processor device 215 or as the components carried on the PCBA 210 of FIG. 2. System 2800 can be a processor-enabled device that is capable of executing instructions in the form of software and executing data communication. Other computer systems and/or architectures may be also used, as will be clear to those skilled in the art.

System 2800 preferably includes one or more processors, such as processor 2810. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), an additional microprocessor or controller for dual or multiple processor systems, or a coprocessor. Such auxiliary processors may be discrete processors or may be integrated with the processor 2810.

Processor 2810 is preferably connected to a communication bus 2805. Communication bus 2805 may include a data channel for facilitating information transfer between storage and other peripheral components of system 2800, for example, to pneumatic system 2875. Furthermore, communication bus 2805 may provide a set of signals used for communication with processor 2810, including a data bus, address bus, and control bus (not shown). Communication bus 2805 may comprise any standard or non-standard bus architecture such as, for example, bus architectures compliant with industry standard architecture (ISA), extended industry standard architecture (ELISA), Micro Channel Architecture (MCA), peripheral component interconnect (PCI) local bus, or standards promulgated by the Institute of Electrical and Electronics Engineers (IEEE) including IEEE 188 general-purpose interface bus (GPIB), IEEE 696/S-100, and the like.

Pneumatic system 2875 is substantially similar to the pneumatic systems disclosed herein, for example, in connection with FIGS. 2 and 15-16C. For example, pneumatic system 2875 may include motor 204 coupled to the diaphragm 207 via bushing 206 and eccentric 205, the fluid pathway including tube 229 and driving mechanism 420 (FIG. 2). Furthermore, the pneumatic system 2875 may also include the diaphragm pump 1501, outlet check valve 1502, inlet check valve 1503, inlet shutoff valve 1504, outlet bypass valve 1505, pressure transducer 1506, and driving mechanism 1507 (FIG. 15).

System 2800 preferably includes a main memory 2815 and may also include a secondary memory 2820. Main memory 2815 provides storage of instructions and data for programs executing on processor 2810, such as one or more of the functions of the powered toothbrush. For example, the main memory 2815 may provide storage of instructions and data for programs for executing the example methods of driving the pneumatic system 2875, as described above. It should be understood that programs stored in the memory and executed by processor 2810 may be written and/or compiled according to any suitable language, including without limitation C/C++, Java, JavaScript, Perl, Visual Basic, .NET, custom language for PIC or any microprocessor and the like. Main memory 2815 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 2820 may optionally include an internal memory 2825 and/or a removable medium 2830. Removable medium 2830 is read from and/or written to in any well-known manner. Removable storage medium 2830 may be, for example, a magnetic tape drive, a compact disc (CD) drive, a digital versatile disc (DVD) drive, other optical drive, a flash memory drive, etc.

Removable storage medium 2830 is a non-transitory computer-readable medium having stored thereon computer-executable code (e.g., disclosed software modules) and/or data. The computer software or data stored on removable storage medium 2830 is read into system 2800 for execution by processor 2810.

In alternative embodiments, secondary memory 2820 may include other similar means for allowing computer programs or other data or instructions to be loaded into system 2800. Such means may include, for example, an external storage medium 2845 and a communication interface 2840, which allows software and data to be transferred from external storage medium 2845 to system 2800. Examples of external storage medium 2845 may include an external hard disk drive, an external optical drive, an external magneto-optical drive, etc. Other examples of secondary memory 2820 may include semiconductor-based memory such as programmable read-only memory (PROM), erasable programmable read-only memory (EPROM), electrically erasable read-only memory (EEPROM), or flash memory (block-oriented memory similar to EEPROM).

System 2800 may include a communication interface 2840. Communication interface 2840 allows software and data to be transferred between system 2800 and external devices, networks, or other information sources. For example, computer software or executable code may be transferred to system 2800 from a network server via communication interface 2840. Examples of communication interface 2840 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 2800 with a network or another computing device. Communication interface 2840 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 2840 are generally in the form of electrical communication signals 2855. These signals 2855 may be provided to communication interface 2840 via a communication channel 2850. In an embodiment, communication channel 2850 may be a wired or wireless network, or any variety of other communication links. Communication channel 2850 carries signals 2855 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 2815 and/or the secondary memory 2820. Computer programs can also be received via communication interface 2840 and stored in main memory 2815 and/or secondary memory 2820. Such computer programs, when executed, enable system 2800 to perform the various functions of the disclosed embodiments, for example, control of the pneumatic system 2875.

In this description, the term "computer-readable medium" is used to refer to any non-transitory computer-readable storage media used to provide computer-executable code (e.g., software and computer programs) to system 2800. Examples of such media include main memory 2815, secondary memory 2820 (including internal memory 2825, removable medium 2830, and external storage medium 2845), and any peripheral device communicatively coupled with communication interface 2840 (including a network information server or other network device). These non-transitory computer-readable mediums are means for providing executable code, programming instructions, and software to system 2800.

In an embodiment that is implemented using software, the software may be stored on a computer-readable medium and loaded into system 2800 by way of removable medium 2830, I/O interface 2835, or communication interface 2840. In such an embodiment, the software is loaded into system 2800 in the form of electrical communication signals 2855. The software, when executed by processor 2810, preferably causes processor 2810 to perform the features and functions described in one or more of the Appendices 28-4.

In an embodiment, I/O interface 2835 provides an interface between one or more components of system 2800 and one or more input and/or output devices. In various embodiments, the I/O interface 2835 provides an interface between the components of system 2800 and one or more devices or system external to the system 2800 (e.g., devices communicating with system 2800 over a network). Other example input devices include, without limitation, switches or other touch-sensitive devices, biometric sensing devices, and the like. Examples of output devices include, without limitation, light-emitting diode (LED) displays, liquid crystal displays (LCDs), vacuum fluorescent displays (VFDs), surface-conduction electron-emitter displays (SEDs), field emission displays (FEDs), and the like. For example, the powered toothbrush may comprise a display on the handle portion 200 that displays a charge state of the battery 203 or other information pertinent to the user of the toothbrush 100.

System 2800 may also include optional wireless communication components that facilitate wireless communication over a data network. The wireless communication components may comprise an antenna system 2870, a radio system 2865, and a baseband system 2860. In system 2800, radio frequency (RF) signals are transmitted and received over the air by antenna system 2870 under the management of radio system 2865.

In one embodiment, antenna system 2870 may comprise one or more antennae and one or more multiplexors (not shown) that perform a switching function to provide antenna system 2870 with transmit and receive signal paths. In the receive path, received RF signals can be coupled from a multiplexor to a low noise amplifier (not shown) that amplifies the received RF signal and sends the amplified signal to radio system 2865.

In an alternative embodiment, radio system 2865 may comprise one or more radios that are configured to communicate over various frequencies. In an embodiment, radio system 2865 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 2865 to baseband system 2860.

Baseband system 2860 also codes digital signals for transmission and generates a baseband transmit signal that is routed to the modulator portion of radio system 2865. The modulator mixes the baseband transmit signal with an RF carrier signal generating an RF transmit signal that is routed to antenna system 2870 and may pass through a power amplifier (not shown). The power amplifier amplifies the RF transmit signal and routes it to antenna system 2870, where the signal is switched to the antenna port for transmission.

Baseband system 2860 is also communicatively coupled with processor 2810, which may be a central processing unit (CPU). Processor 2810 has access to data storage areas 2815 and 2820. Processor 2810 is preferably configured to execute instructions (i.e., computer programs, such as the disclosed example methods) that can be stored in main memory 2815 or secondary memory 2820. Computer programs can also be received from baseband processor 2860 and stored in main memory 2815 or in secondary memory 2820, or executed upon receipt. Such computer programs, when executed, enable system 2800 to perform the various functions of the disclosed embodiments. For example, data storage areas 2815 or 2820 may include various software modules.

Other Aspects

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed:

1. A power toothbrush comprising:
a first dental tray including a first set of cleaning surfaces for simultaneously cleaning multiple tooth surfaces of a first set of teeth;
a second dental tray including a second set of cleaning surfaces for simultaneously cleaning multiple tooth surfaces of a second set of teeth, the second set of teeth opposing the first set of teeth;
an inflatable bladder disposed between the first and second dental trays;
a frame retaining the bladder and wherein the inflatable bladder comprises a first membrane spanning and coupled to a first side of the frame and a second membrane spanning and coupled to a second side of the frame opposite the first membrane;
a first coupling mechanism which couples the first dental tray to a first side of the bladder; and
a second coupling mechanism which couples the second dental tray to a second side of the bladder opposite the first side of the bladder;
wherein the first coupling mechanism comprises one or more attachment members coupled to the first membrane and one or more corresponding interface openings in the first dental tray and the second coupling mechanism comprises one or more attachment members coupled to the second membrane and one or more corresponding interface openings in the second dental tray.

2. The power toothbrush of claim 1 wherein the first set of cleaning surfaces and the second set of cleaning surfaces each comprise filaments.

3. The power toothbrush of claim 1 further comprising
a first paddle interposed between the first dental tray and the inflatable bladder, the first paddle attached to the first membrane and having the one or more attachment members extending therefrom away from the bladder; and
a second paddle interposed between the second dental tray and the inflatable bladder, the second paddle attached to the second membrane and having the one or more attachment members extending therefrom away from the bladder.

4. The power toothbrush of claim 1 wherein the first set of cleaning surfaces and the second set of cleaning surfaces each comprise a fabric; and a plurality of yarn segments woven through the fabric, wherein each of the plurality of yarn segments comprises a plurality of filaments that form bristles on a first side of the fabric.

5. The power toothbrush of claim 1 further comprising
a handle portion; and
a pneumatic device disposed within the handle portion and coupled to the bladder.

6. The power toothbrush of claim 1 further comprising a neck extending from the frame and having a conical opening in an end opposite the frame and a first interlocking component located within the conical opening.

7. The power toothbrush of claim 6 further comprising
a handle portion having a base, a nose cone opposite from the base and a second interlocking component on the nose cone and interlocked with the first interlocking component; and
a pneumatic device disposed within the handle portion and coupled to the bladder via the nose cone.

8. A toothbrush head comprising:
a first dental tray including a first set of cleaning surfaces for simultaneously cleaning multiple tooth surfaces of a first set of teeth;
a second dental tray including a second set of cleaning surfaces for simultaneously cleaning multiple tooth surfaces of a second set of teeth, the second set of teeth opposing the first set of teeth;
a rigid outer frame having a first side and a second side and an opening therethrough;

a first membrane covering the opening of the rigid outer frame on the first side of the rigid outer frame;

a second membrane covering the opening of the rigid outer frame on the second side of the rigid outer frame thereby defining a space between the first membrane and the second membrane;

a first coupling mechanism coupling the first dental tray to the first membrane; and a second coupling mechanism which couples the second dental tray to the second membrane.

9. The toothbrush head of claim 8 wherein the first coupling mechanism comprises one or more gimbals which moveably couple the first membrane and the first dental tray and the second coupling mechanism comprises one or more gimbals which moveably couple the second membrane and the second dental tray.

10. The toothbrush head of claim 9 further comprising a first paddle interposed between the first dental tray and the first membrane, the first paddle attached to the first membrane and having the one or more gimbals attached thereto; and a second paddle interposed between the second dental tray and the second membrane and having the one or more gimbals attached thereto.

11. The toothbrush head of claim 10 wherein the first set of cleaning surfaces and the second set of cleaning surfaces each comprise a fabric; and a plurality of yarn segments woven through the fabric, wherein each of the plurality of yarn segments comprises a plurality of filaments that form bristles on a first side of the fabric.

12. The toothbrush head of claim 8 further comprising a neck extending from the outer rigid frame and having a conical opening in an end opposite the outer rigid frame and a first interlocking component located within the conical opening.

13. The toothbrush head of claim 8 wherein the first coupling mechanism comprises one or more attachment members coupled to the first membrane and one or more corresponding interface openings in the first dental tray and the second coupling mechanism comprises one or more attachment members coupled to the second membrane and one or more corresponding interface openings in the second dental tray.

14. The toothbrush head of claim 8 further comprising a neck extending from the outer rigid frame and having a conical opening in an end opposite the outer rigid frame and a first interlocking component located within the conical opening.

15. The toothbrush head of claim 14 further comprising a channel extending through the neck and in fluid communication with the space between the first membrane and the second membrane.

16. The power toothbrush of claim 8 wherein the first set of cleaning surfaces and the second set of cleaning surfaces each comprise bristles.

17. A toothbrush head comprising:

a first dental tray including a first plurality of flexible fingers on a first side and a second plurality of flexible fingers on a second side opposite the first side and a first plurality of cleaning surfaces on an interior side of each of the flexible fingers for simultaneously cleaning multiple tooth surfaces of a first set of teeth;

a second dental tray including a first plurality of flexible fingers on a first side of the second dental tray and a second plurality of flexible fingers on the second dental tray on a second side opposite the first side and a second plurality of cleaning surfaces on an interior side of each of the flexible fingers for simultaneously cleaning multiple tooth surfaces of a second set of teeth, the second set of teeth opposing the first set of teeth;

a rigid outer frame having a first side and a second side opposite the first side and an opening therethrough;

a first membrane covering the opening of the rigid outer frame on the first side of the rigid outer frame;

a second membrane covering the opening of the rigid outer frame on the second side of the rigid outer frame thereby defining a space between the first membrane and the second membrane;

a first coupling mechanism coupling the first dental tray to the first membrane; and a second coupling mechanism which couples the second dental tray to the second membrane.

18. The toothbrush head of claim 17 wherein the first coupling mechanism comprises one or more gimbals which moveably couple the first membrane and the first dental tray and the second coupling mechanism comprises one or more gimbals which moveably couple the second membrane and the second dental tray.

19. The toothbrush head of claim 17 further comprising a first paddle interposed between the first dental tray and the first membrane, the first paddle attached to the first membrane and having the one or more gimbals attached thereto; and a second paddle interposed between the second dental tray and the second membrane and having the one or more gimbals attached thereto.

20. The toothbrush head of claim 19 wherein the first set of cleaning surfaces and the second set of cleaning surfaces each comprise a fabric; and a plurality of yarn segments woven through the fabric, wherein each of the plurality of yarn segments comprises a plurality of filaments that form bristles on a first side of the fabric.

* * * * *